(12) United States Patent
Simkhovich et al.

(10) Patent No.: US 11,519,864 B2
(45) Date of Patent: Dec. 6, 2022

(54) SYSTEM AND METHOD FOR MONITORING STATUS OF TARGET

(71) Applicant: TECHNION RESEARCH & DEVELOPMENT FOUNDATION LIMITED, Haifa (IL)

(72) Inventors: Boris Simkhovich, Haifa (IL); Gilad Rosenblatt, Petah-Tikva (IL); Meir Orenstein, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 157 days.

(21) Appl. No.: 17/024,420

(22) Filed: Sep. 17, 2020

(65) Prior Publication Data
US 2021/0072163 A1 Mar. 11, 2021

Related U.S. Application Data

(63) Continuation-in-part of application No. PCT/IL2019/050299, filed on Mar. 18, 2019.

(30) Foreign Application Priority Data

Mar. 18, 2018 (IL) .......................... 258195

(51) Int. Cl.
*G01N 21/88* (2006.01)
*G01N 21/94* (2006.01)
*G01N 21/95* (2006.01)

(52) U.S. Cl.
CPC ......... *G01N 21/8851* (2013.01); *G01N 21/94* (2013.01); *G01N 21/9501* (2013.01); *G01N 2021/8883* (2013.01)

(58) Field of Classification Search
CPC ......... G01B 11/0641; G01N 2021/214; G01N 2021/215; G01N 2021/8883;
(Continued)

(56) References Cited

U.S. PATENT DOCUMENTS 5,166,752 A 11/1992 Spanier et al.
5,582,646 A 12/1996 Woollam et al.
(Continued)

FOREIGN PATENT DOCUMENTS

WO 2010/062150 A2 6/2010

OTHER PUBLICATIONS

Anemogiannis, et al., Determination of Guided and Leaky Modes in Lossless and Lossy Planar Multilayer Optical Waveguides: Reflection Pole Method and Wavevector Density Method, Journal of Lightwave Technology, May 1999, pp. 929-941, vol. 17, No. 5.
(Continued)

*Primary Examiner* — Tri T Ton
(74) *Attorney, Agent, or Firm* — Browdy and Neimark, PLLC

(57) ABSTRACT

A monitoring system and method are presented for use in monitoring a target. The monitoring system comprises: an input utility for receiving input data comprising measured data indicative of optical response of the target measured under predetermined conditions and comprising phase data indicative of a two-dimensional profile of full phase of the optical response of the target in a predetermined two-dimensional parametric space including a two-dimensional range in which said target exhibits phase singularity; an analyzer module for processing said measured data and extracting at least one phase singularity signature of the target characterizing the target status, the phase singularity signature being formed by a number N of phase singularity points, each corresponding to a condition that the physical
(Continued)

phase continuously accumulates a nonzero integer multiple m of 2π around said point.

26 Claims, 29 Drawing Sheets
(28 of 29 Drawing Sheet(s) Filed in Color)

(58) Field of Classification Search
CPC .... G01N 21/211; G01N 21/41; G01N 21/553; G01N 21/8851; G01N 21/94; G01N 21/9501; A47G 21/18; A47G 2400/10; G09F 2003/0272; G09F 3/02; G09F 3/10
USPC .............. 356/237.1–237.6, 239.1–239.8
See application file for complete search history.

(56) References Cited

U.S. PATENT DOCUMENTS

| | | |
|---|---|---|
| 2007/0139648 A1 | 6/2007 | Singh |
| 2016/0178516 A1 | 6/2016 | Abdulhalim |
| 2016/0363484 A1 | 12/2016 | Barak et al. |

OTHER PUBLICATIONS

Baldi, et al., Phase Unwrapping Algorithms: A Comparison, Interferometry in Speckle Light, 2000, pp. 483-490.

Coutant, et al., Plasmonic metamaterials for ultra-sensitive sensing: topological darkness, Rend. Fis. Acc. Lincei, 2015, S175-S182, 26 (suppl 2).

Kochergin, et al., Phase properties of a surface-plasmon resonance from the viewpoint of sensor applications, Quantum Electronics, 1998, pp. 444-448, 28(5).

Sreekanth, et al., Biosensing with the singular phase of an ultrathin metal-dielectric nanophotonic cavity, Nature Communications, 2018, pp. 1-8, vol. 9:369.

Wang, et al., Optical vortex metrology for nanometric speckle displacement measurement, Optics Express, Jan. 9, 2006, pp. 120-127, vol. 14, No. 1.

Yin, et al., Highly Sensitive Surface Plasmon Resonance Chemical Sensor based on Goos-Hanchen Effects, Proc. of SPIE, 2006, pp. 63240B-1-63240B-8, vol. 6324.

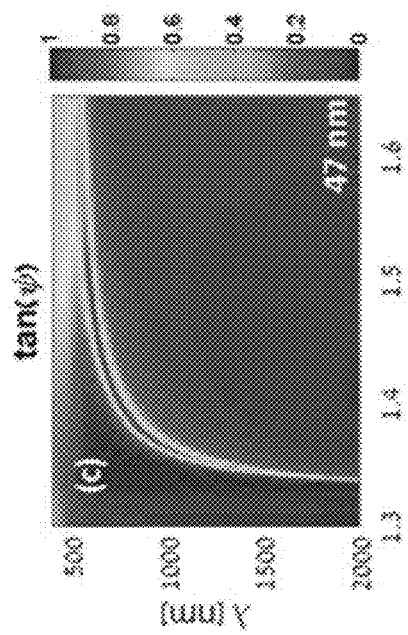
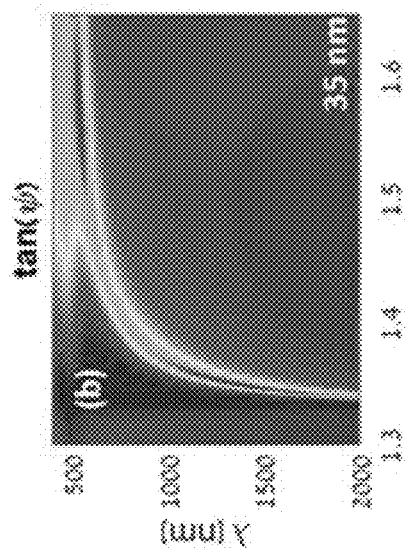
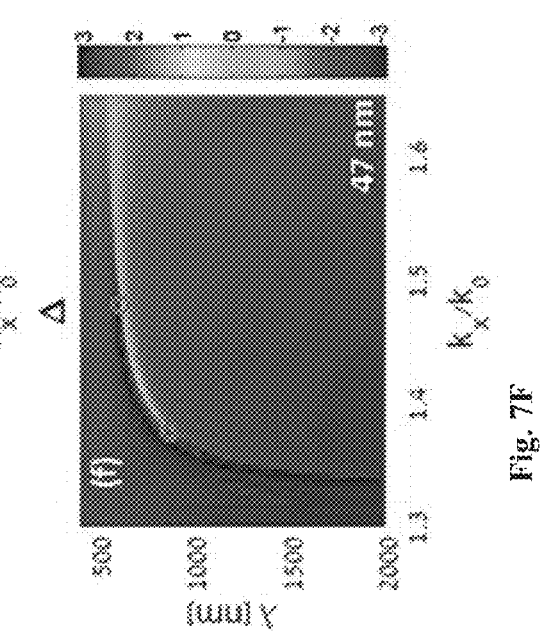
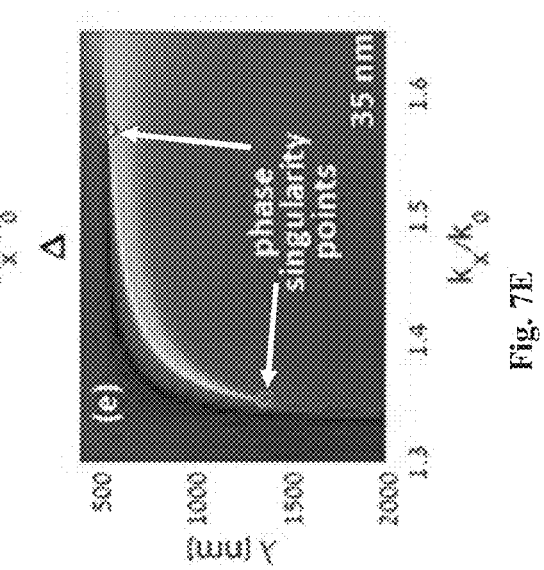
Fig. 7A  Fig. 7B  Fig. 7C
Fig. 7D  Fig. 7E  Fig. 7F

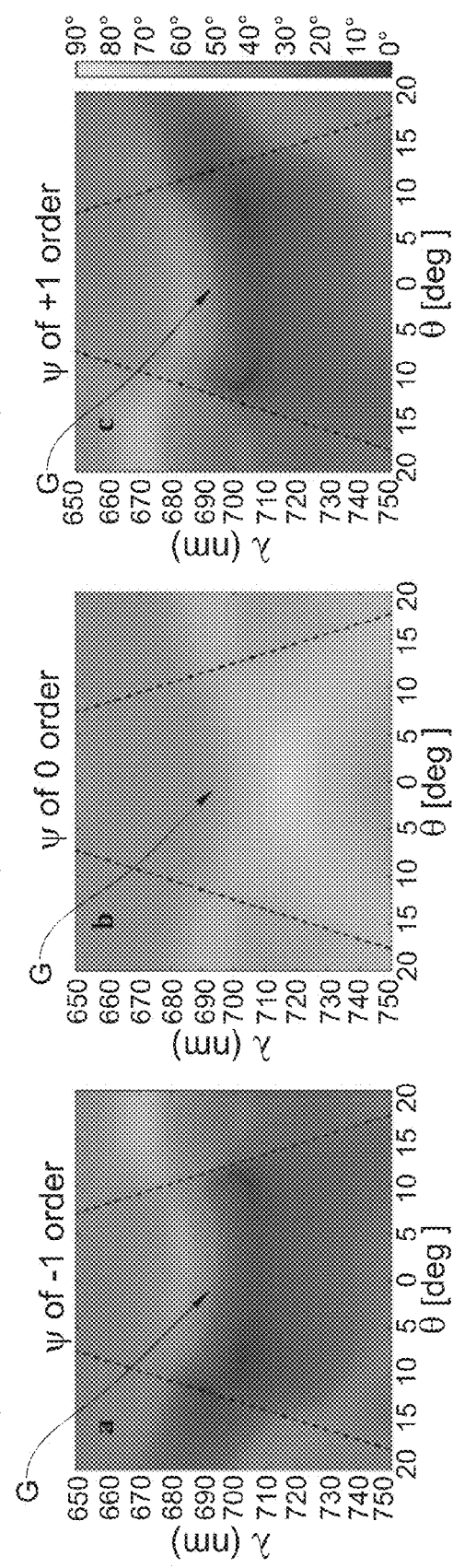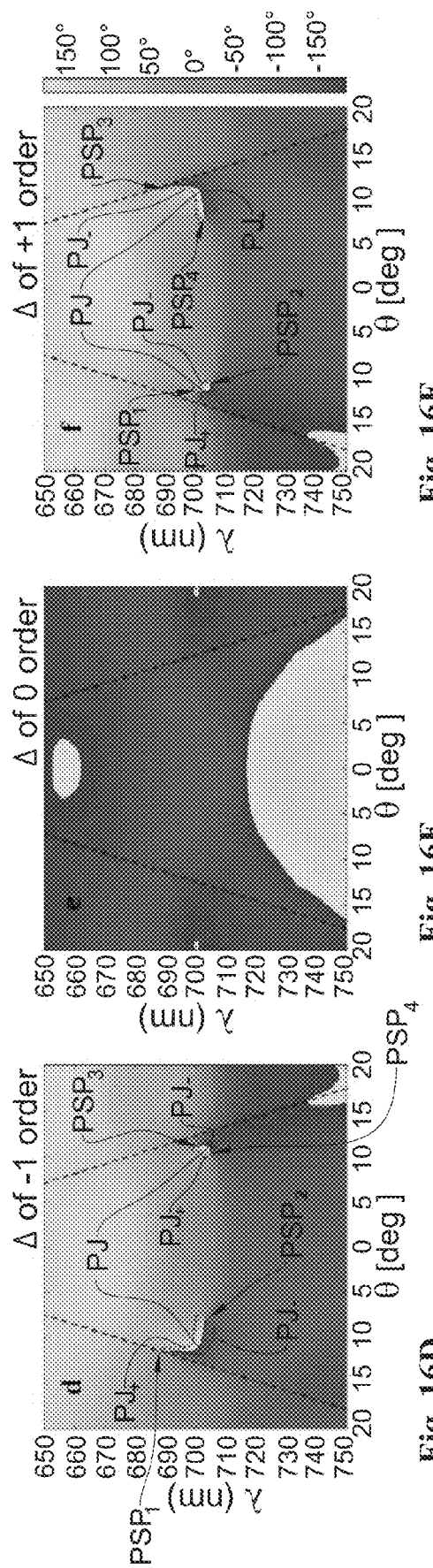
Fig. 16A  Fig. 16B  Fig. 16C
Fig. 16D  Fig. 16E  Fig. 16F

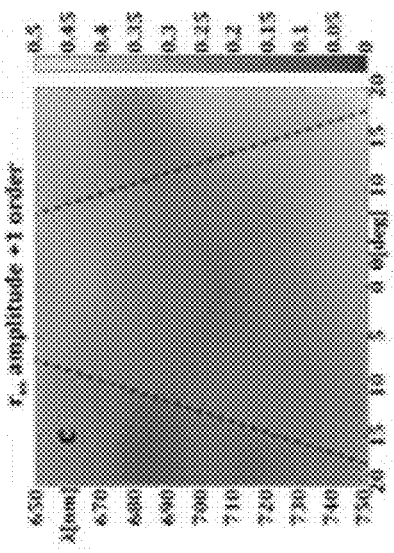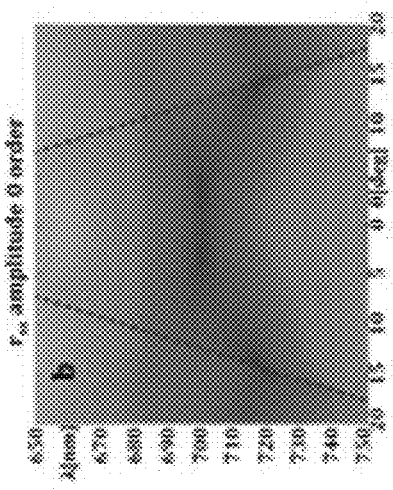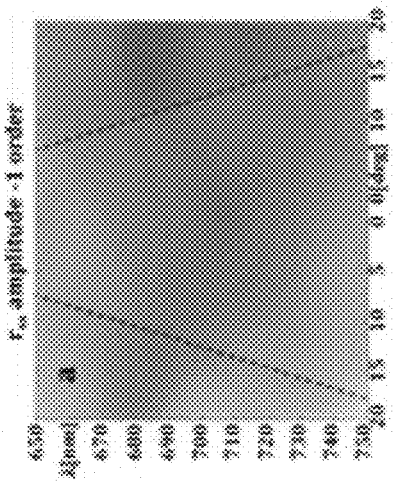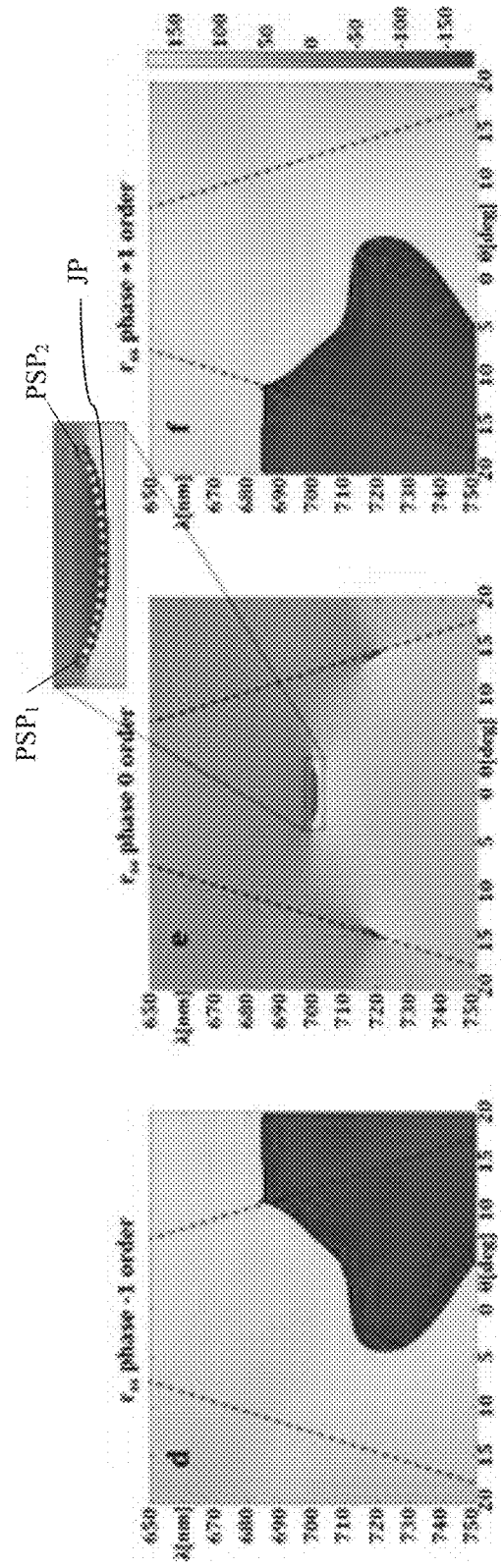

Fig. 22A
Fig. 22B
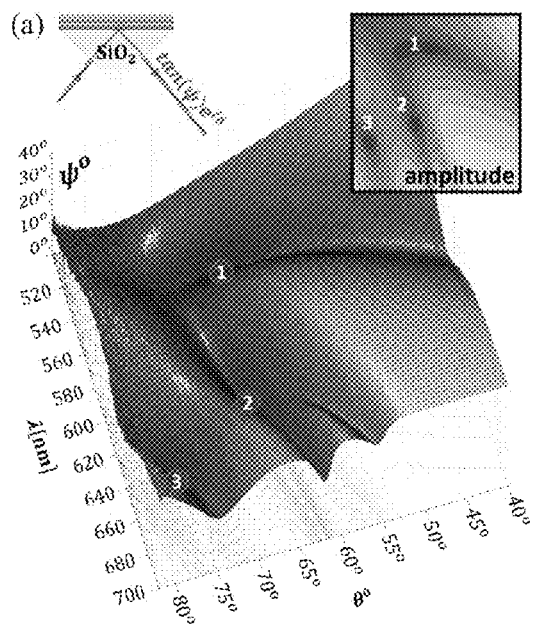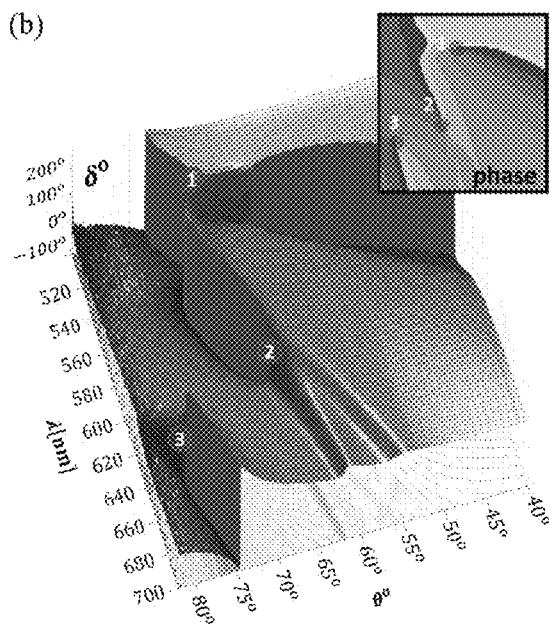
Fig. 23A
Fig. 23B
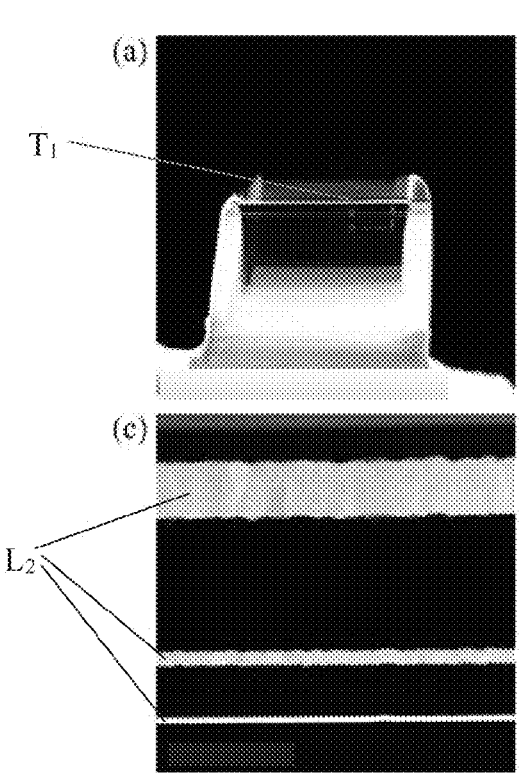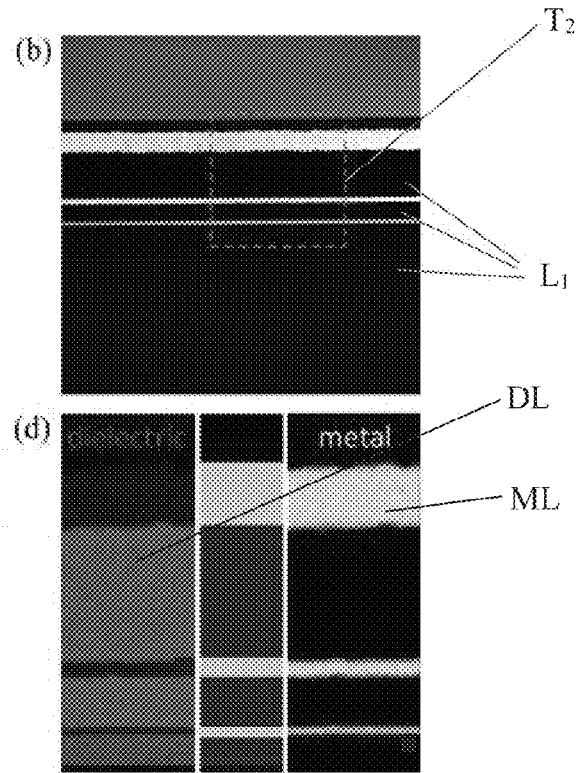
Fig. 23C
Fig. 23D

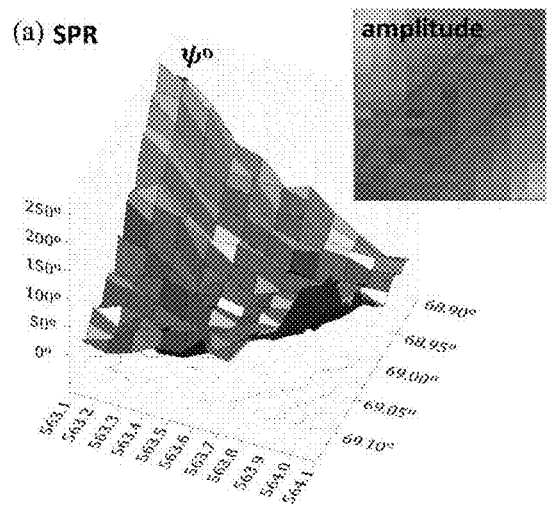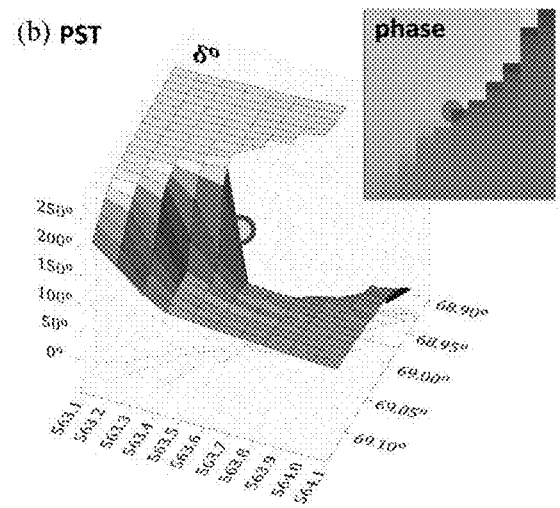
Fig. 24A                Fig. 24B
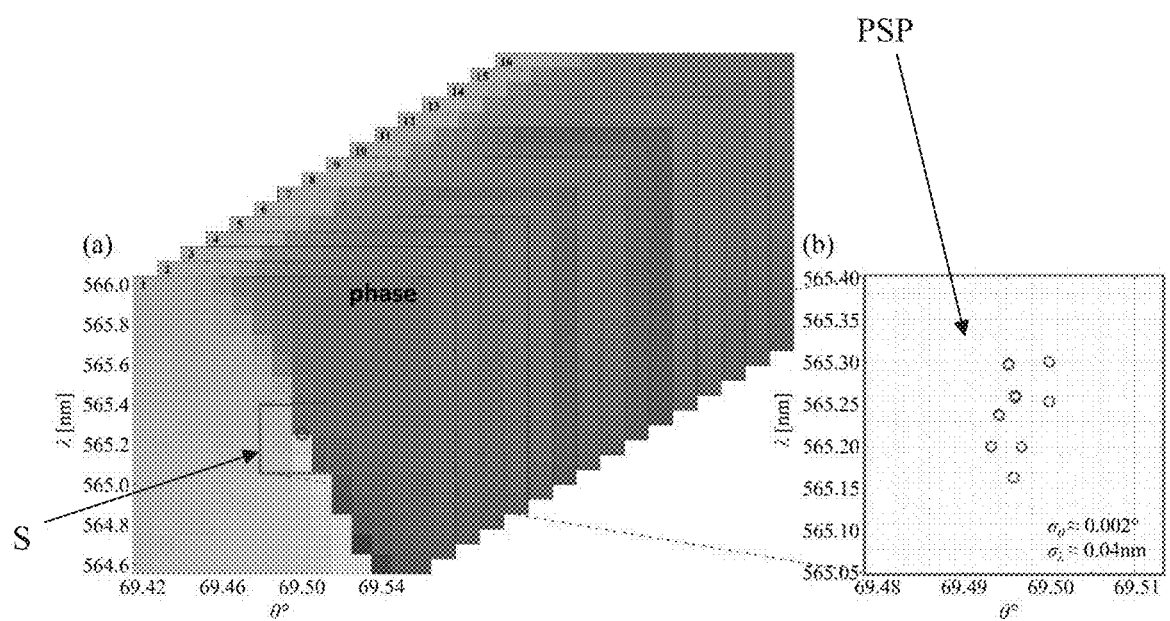
Fig. 25A                Fig. 25B Fig. 26A
Fig. 26B
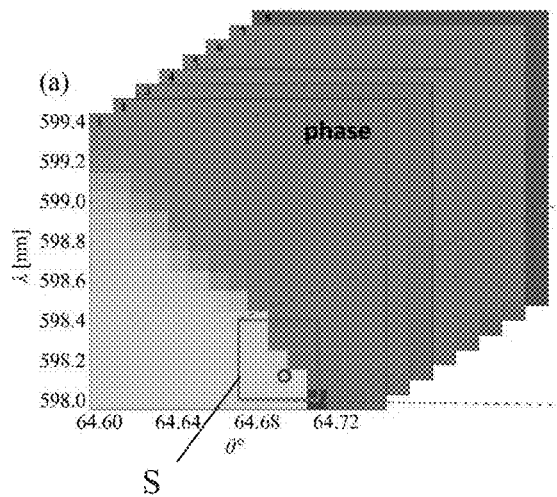
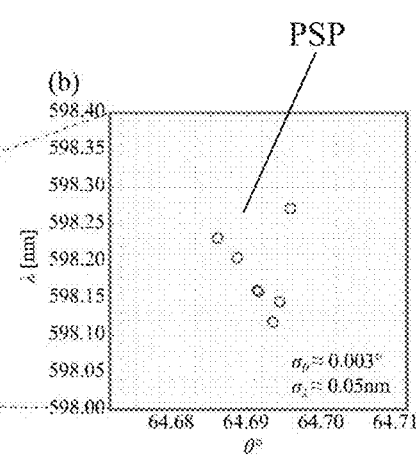
Fig. 27A
Fig. 27B
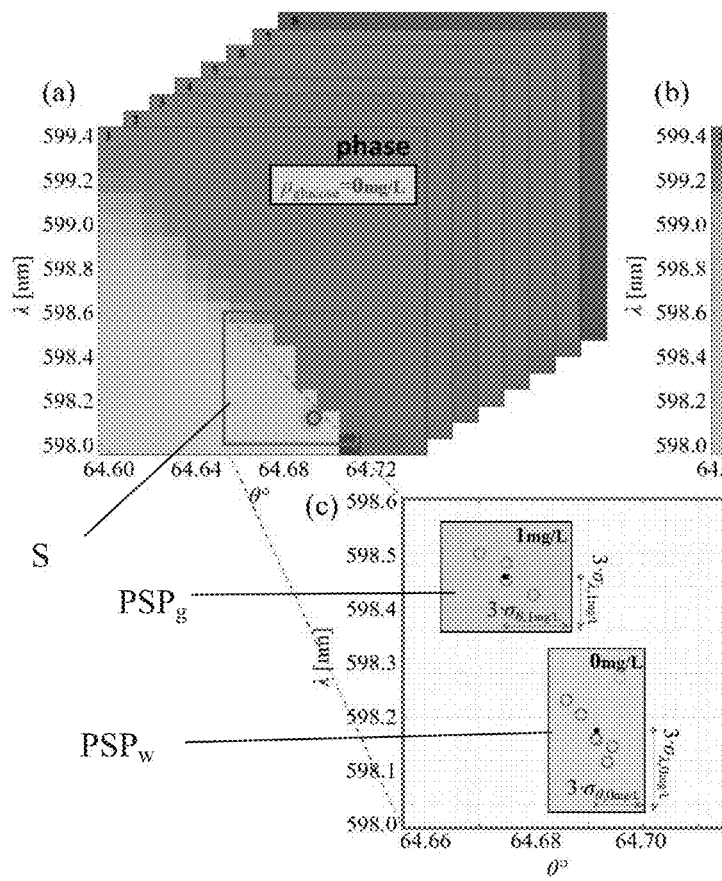
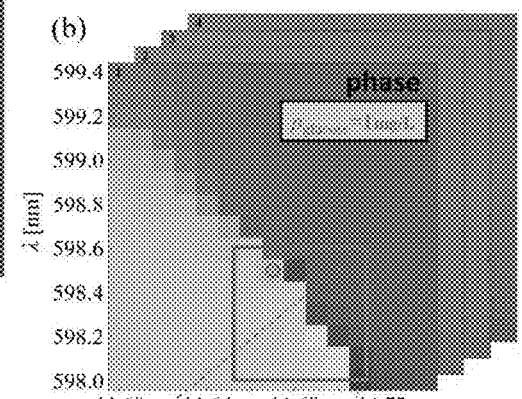
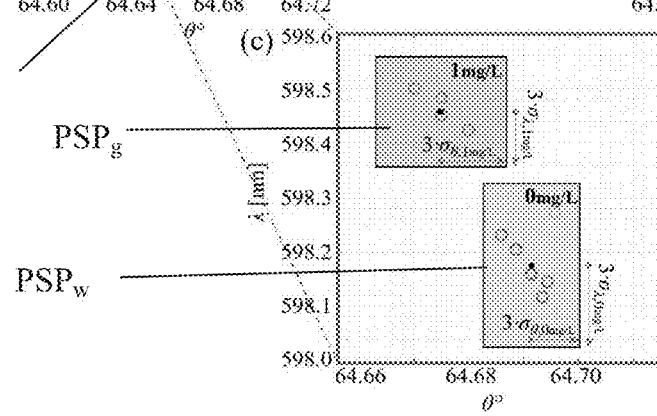
Fig. 27C Fig.31A
Fig.31B
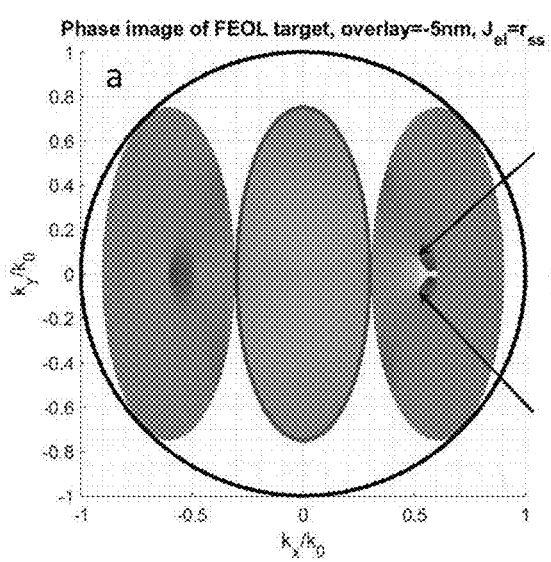
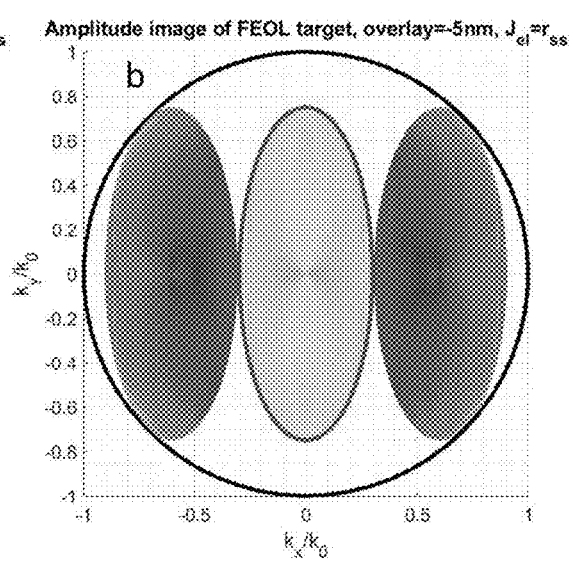
Fig. 31C
Fig. 31D
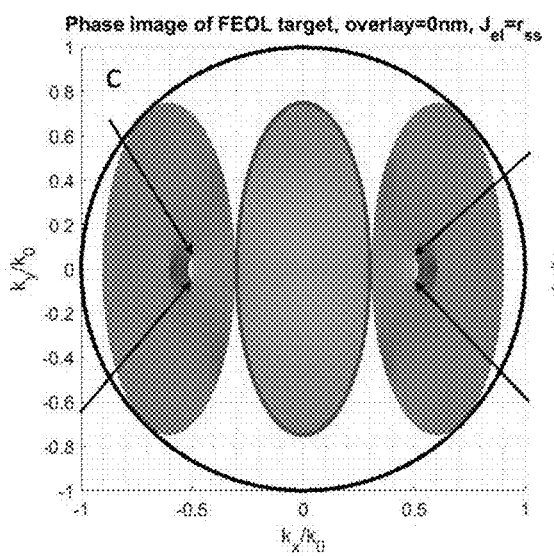
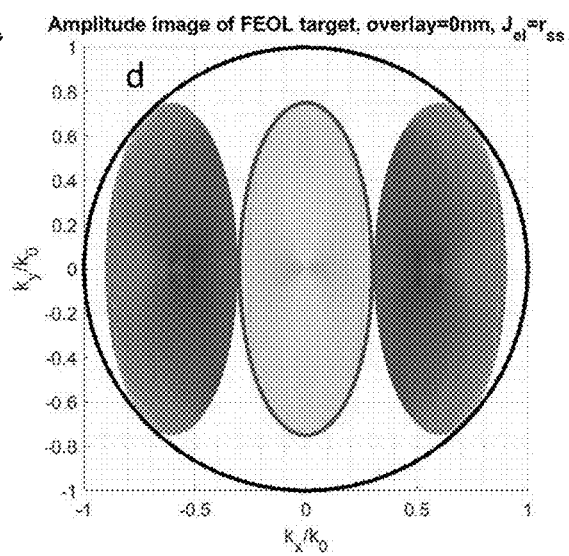

Fig. 32A
Fig. 32B
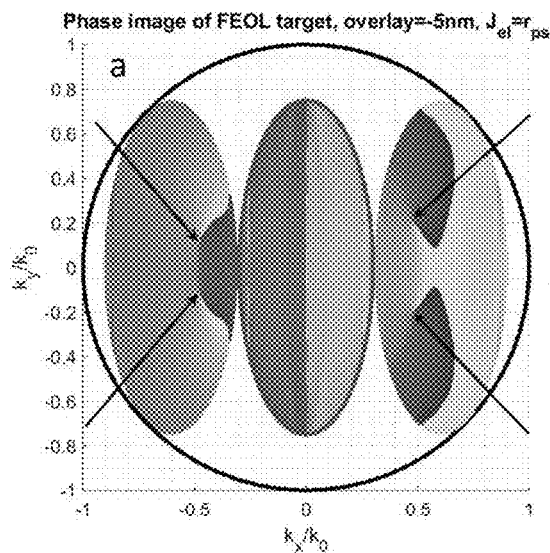 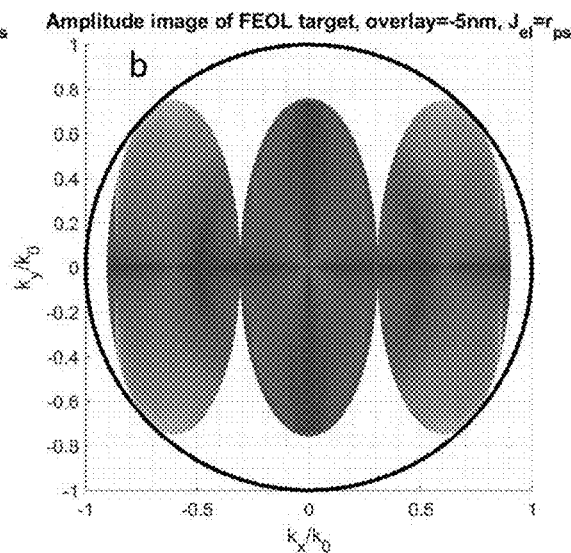
Fig. 32C
Fig. 32D
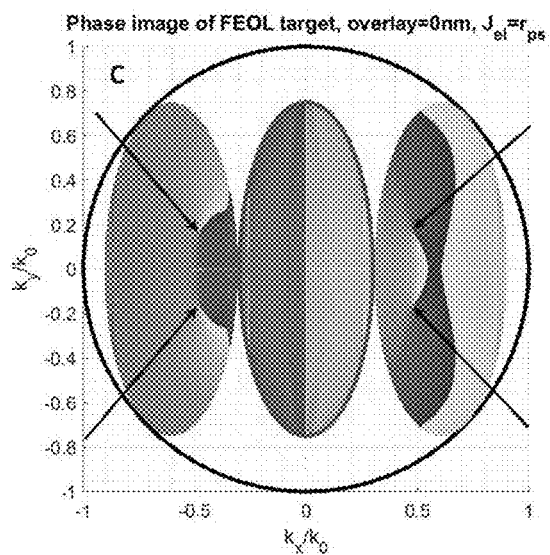 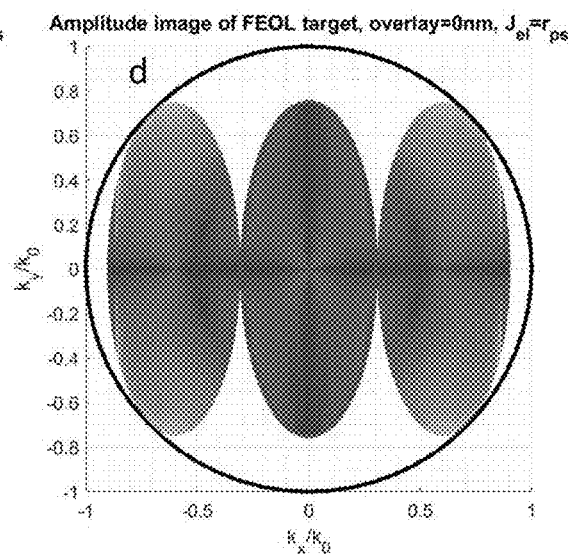

SYSTEM AND METHOD FOR MONITORING STATUS OF TARGET

The present application is a continuation-in-part of PCT/IL2019/050299, filed Mar. 18, 2019, the entire contents of which, particularly including all of the mathematical formulae set forth therein, being hereby incorporated herein by reference.

TECHNOLOGICAL FIELD

The present invention is generally in the field of optical measurement techniques, and relates to a method and system for monitoring a target to identify changes in the target's condition.

BACKGROUND

Optical interrogation of targets enables a non-destructive way to extract useful information on target parameters/conditions. Such techniques are widely used in various industrial applications, for example in inspection tools for monitoring/controlling parameter(s) and/or parameter variations of the target structure (e.g. in semiconductor industry), as well as in sensing devices for monitoring changes in target's parameter(s) caused by a change in its environment. The latter may be used for controlling the target condition or obtaining information about environment via measurements on the target, e.g. to detect foreign substance(s) via their interaction with the target.

It is generally known to extract target-related information from optical measurements performed with different measurement schemes and/or different modes/conditions of the same measurement scheme. Some of the commonly used techniques employ either angular or spectral interrogation, in which the target is illuminated at different incidence angles or wavelengths, respectively. The reflected (or transmitted) light is then used to extract information on the target. These techniques are pivotal in the arsenal of available tools for critical parameter extractions on a wide range of targets for a wide range of applications. For example, ellipsometry systems employ both spectral and angular interrogation, and are amongst the most sensitive of such methods. Ellipsometry is therefore widely used in metrology of sub-wavelength targets on silicon wafers for yield management.

Within the realm of angular and spectral optical interrogation methods, the Surface Plasmon Resonance (SPR) phenomena allows real-time sensing of environmental changes at a several hundred nanometer range of a metal surface, by tracking shifts to the condition in which a local minimum in the reflectivity occurs. SPR sensing techniques are commonly applied to biosensing of molecular interactions and protein interactions. The vast majority of commercial SPR systems employ angular interrogation at a single wavelength (with a monochromatic light source), but SPR tools that employ spectral interrogation instead also exist (illuminating at a fixed angle with a wideband light source).

Technique utilizing optical schemes for measurements using both multiple incidence angles and multiple illumination wavelengths have also been proposed, for example for use in metrology systems. The motivation behind such spectro-angular interrogation is to increase the optical sensitivity by collecting more information about the target.

GENERAL DESCRIPTION

There is a need in the art for a novel measurement technique enabling monitoring of changes in various properties/parameters of a target and its vicinity.

The present invention provides a novel approach for monitoring changes in various properties/parameters of a target and its vicinity. The technique of the invention is a phase singularity tracking (PST) technique, which utilizes measured data indicative of phase singularity point(s) or phase singularity signature(s) of the optical response of a target in a predetermined two-dimensional parametric space, for example spectro-angular parametric space. This enables monitoring of changes in target's status (e.g. changes in effective refractive index) with exceptionally high sensitivity and spatial resolution (sub-pixel resolution).

As will be described more specifically further below, a phase singularity point is actually a point defining a region around this point where a phase of the optical response in the two-dimensional parametric space (e.g. spectro-angular space; spectro-thickness space; angular-thickness space) is characterized by observable specific behavior/profile, namely a point characterized by that a physical phase of the measured optical response substantially satisfies a condition that such physical phase continuously accumulates a non-zero integer multiple m of $2\pi$ around said point. It should be noted that the term "substantially" is used herein to emphasize that such a condition actually covers also "approximate continuation" as well as "approximate $2\pi$ phase accumulation", up to experimental errors as well as pixelization errors in the spectro-angular sampling of data.

According to the invention, data indicative of a full phase map (i.e. within a $2\pi$ range, e.g. $[0, 2\pi]$; $[0.1\pi-2.1\pi]$; $\{[0,\pi]$ and $[3\pi,4\pi]\}$) of the optical response of the target in the two-dimensional parametric space is provided and processed to identify phase singularity point(s) or phase singularity signature(s) of the target, which is the characteristic of the current target status. By performing model-based analysis of the so-determined phase singularity signature, the target status can be determined. The phase singularity signature thus provides direct measure of a change in the target status.

The inventors have found that phase singularity points exist for light interacting with a target, and these points can be directly measured, as that targets can be engineered to exhibit such points. The topological nature of branch points (phase singularity points) enables to precisely identify and localize them (estimate their exact location). The inventors have shown that by tracking the movement of these precisely located phase singularity points one can detect changes in the target with very high sensitivity.

The present invention, in its one broad aspect, provides a novel monitoring system for use in monitoring a target, said monitoring system being configured for data communication with a measured data provider and comprising:

an input utility for receiving input data comprising measured data indicative of optical response of the target measured under predetermined conditions, the measured data comprising phase data indicative of a two-dimensional profile of full phase of the optical response of the target in a predetermined two-dimensional parametric space;

an analyzer module configured and operable for processing said measured data and extracting at least one phase singularity signature of the target characterizing the target status, the phase singularity signature being formed by a number N of phase singularity points, each corresponding to a condition that the physical phase continuously accumulates a nonzero integer multiple m of $2\pi$ around said point; and an output utility configured and operable to generate output data indicative of said at least one phase singularity signature of the target characterizing the status of the target.

The system may include a mapping module configured and operable to receive the measured data indicative of/corresponding to the optical response of the target and generate map data comprising the phase data indicative of the profile of said full phase of the optical response of the target in the two-dimensional (2D) parametric space. As mentioned above, and will be described more specifically below, such two-dimensional parametric space may be spectro-angular space of multiple wavelengths and angles of incidence of illumination to cause said optical response; spectro-thickness space of multiple wavelengths of illumination and varying thickness of the target; angular-thickness space of multiple angles of incidence of illumination and varying thickness of the target; angular-angular space for a single wavelength or a wavelength band of illumination, in a pupil plane (Fourier plane) of the target (i.e. various elevation and azimuth incidence angles in the Fourier plane).

Also, the system may include a modeling module configured and operable for applying a model based processing to said data indicative of the at least one phase singularity signature and generating data indicative of the status of the target, thereby providing a direct measure of value(s) or change of value(s) of one or more parameters associated with at least one of the target and environment in a vicinity of the target.

The measured data used in the present invention is obtained by using predetermined measurement conditions enabling detection of the optical response of the target in the predetermined 2D parametric space (e.g. spectro-angular phase measurements), characterized by an accessible range of such two parameters (e.g. wavelengths and angles of the accessible spectro-angular range). As will be described further below, the measurements are applied to a target, which is designed to exhibit phase singularity at the accessible 2D parametric range. As described above, a phase singularity point is a point defining a region around it of the specific behavior/profile of the phase of the optical response in the given 2D parametric space. The phase singularity point is identified in the optical response as a point around which the physical phase of the measured optical response continuously accumulates a nonzero integer multiple m of $2\pi$ around said point (i.e. substantially satisfies/meets a condition of the continuous accumulation of a nonzero integer multiple m of $2\pi$ around said point).

The measured 2D phase singularity signatures, and especially the locations of phase singularity points, allow convenient visual representation to a user, who can gain, from observation of a change in the phase singularity signature and/or movement of phase singularity point(s), valuable information about the change in one or more parameters associated with at least one of the target and environment in the vicinity of the target.

It should be noted that in the description below a target having a phase singularity point is at times referred to as a target having optical beam reflection going to zero at some point within the accessible 2D parametric (e.g. spectro-angular) range. It should, however, be understood that this effect should not be confused with the general zero reflections or minimal reflections conditions, because such zero reflection or minimal reflection point does not necessarily occur at the exact angular-spectral point, where the phase singularity occurs. Therefore, in order to identify the phase singularity point(s)/signature(s), the full phase map data of the measured optical response (as described above) should be analyzed to find each point around which the physical phase of the measured optical response continuously accumulates a nonzero integer multiple m of $2\pi$ around such point.

In some cases, a search for phase singularity points may utilize a preliminary procedure based on finding a zero or minimal reflectance point and then search for exact phase singularity point position by full phase measurements.

The mapping module may be configured and operable to generate the full phase profile of the optical response of the target within a $2\pi$ range. The analyzer module may be configured and operable to process numeric phase representation of the measured physical phase over the relevant 2D parametric space, to identify first order ($|m|=1$) and higher order ($|m|\geq 2$) phase singularity points. For example, the analyzer module determines continuous changes of the physical phase by the nonzero integer multiple of $2\pi$.

The data indicative of the status of the target may comprise effective refractive index data associated with at least one property of the target and/or environment in a vicinity of the target. The effective refractive index data is indicative of at least one of the following: refractive index; refractive index change; one or more properties of the target and/or environment in the vicinity of the target being in a relation with the refractive index or refractive index change.

For example, the phase singularity point location may be used for determination of an unknown parameter of the target and/or environment in the vicinity of the target. Considering, for example a multilayer target structure, the top layer of the target may be of an unknown thickness and known refraction index, e.g. such a situation occurs in sputtering of a known material on the target. In this case, the unknown thickness can be determined from the singularity point location by utilizing Fresnel equations and standard transfer matrix formalism (see for example "*Determination of guided and leaky modes in lossless and lossy planar multilayer optical waveguides: reflection pole method and wavevector density method*", E. Anemogiannis et al., Journal of Lightwave Technology, Volume: 17 Issue 5.

The target status data may include data indicative of a change in one or more structural parameters of the target caused by one or more processes being applied to the target. This may, for example, be a change in critical dimensions of the pattern on the target, e.g. undergoing patterning process, which can be used for controlling the patterning process. According to another example, the target status data may include data indicative of a change in one or more properties of the target caused by one or more environmental conditions in the vicinity of the target, such as temperature and/or pressure field, as well as mechanical forces. According to yet another example, the target status data may comprise indication to a change in one or more conditions of the target caused by interaction of the target with foreign substances.

The monitoring system of the invention may be installed in a separate device configured to be in data communication with a measured data provider. The latter may be a measurement system (e.g. a memory of the measurement system) performing one or more measurement sessions on the target and generating the measured data; or an external storage device to which the monitoring system has access and in which the measured data is stored. In yet another example, the monitoring system may include or may be integral with a measurement system.

The measurement system includes an optical system operable configured and operable for performing measurements under predetermined conditions, for example for illuminating the target with multiple incident angles and multiple wavelengths, and a detector device for detecting the optical response of the target under said conditions, and generating the measured data. The measurement system may be configured and operable in a scan mode or in a snapshot mode.

In some embodiments, the optical system is configured to perform ellipsometric measurements. This may be a typical ellipsometric system (i.e. performing polarization-based measurements), which is further modified for illuminating (exciting) the target with multiple incident angles and multiple wavelengths in a scan or snapshot mode and detect the angular-spectral optical response of the target. In other words, the measurement system preferably utilizes spectro-angular illumination, i.e. both angular and spectral interrogation simultaneously, wherein the detected signal is the reflected/transmitted light phase and intensity.

The target being measured is designed to exhibit phase singularity at accessible 2D parametric range (e.g. spectro-angular range), i.e. having one or more points within the accessible range of the measurement system, i.e. where the physical phase of the measured optical response of the target continuously accumulates a nonzero integer multiple m of $2\pi$ around each of said points (e.g. a point of optical beam reflection going to zero or near zero, provided it is characterized by the above-described phase change/variation behavior around said point).

The target may be single- or multi-layer structure, with patterned or not surface and/or inner layer/s. Generally, the variety of possible targets include planar layered waveguides with or without coupling elements (prism); waveguides of cylindrical symmetry, e.g. optical fibers; and waveguides coupled to a resonant molecule(s) and/or nanoparticle(s), typically attributed to Fano resonance system, etc.

For example, the target could be a flat layered target, patterned in one or more directions with effective building blocks that satisfy a zero effective permittivity condition, meaning that each such block comprises/is formed by material inclusions (e.g. metals and dielectrics) whose dimensions are designed such that block acts as an effective medium whose real part of the effective (averaged) permittivity is zero for electromagnetic waves propagating in one or more directions. The effective building blocks could be replicated in any direction of the target with different scaling factors at each repetition.

The designed targets could be enclosed by layers or padding blocks that do not conserve the zero permittivity condition. The number of such effective layers or building blocks forming the target depends on an optimization process, aimed at bringing a phase singularity signature to an accessible 2D range of the 2D parametric space (e.g. spectro-angular range) located near a coalescence of at least two modes. It should be noted that the term "modes" used herein refers also to "zeros" of the field amplitude reflection coefficient, and not just the poles. For example, the coalescence demonstrated by the inventors involves such "zeros".

Another example could be a flat target that is patterned in two dimensions, such as to fabricate effective target layers that include or are formed by building blocks with zero effective permittivity in one or more directions. Specifically, the inventors have found that repeating the same building block but scaled in a geometrical dimension in a single target is highly efficient in achieving control over multiple phase singularities near a coalescence of modes (as described above). The scaling provides an additional degree of freedoms for target design that does not change the effective permittivity of the building blocks.

Considering for example the use of the target as a sensing element for sensing one or more foreign substances in the vicinity of the target, its surface is also appropriately configured (e.g. modified) for interacting (chemically and/or physically binding) with the substance(s) to be detected.

The measurement and monitoring system detects and tracks excitable phase singularities from a target (e.g. spectro-angular phase singularity point(s) in light scattered from the target in response to illumination; preferably light reflected from the target). These phase singularities provide a measurable quantity which allows exceptionally high sensitivity and resolution measurements of changes in effective refractive index.

Thus, according to another broad aspect of the present invention, it provides a measurement system for use in monitoring status of a target, the measurement system comprising: an optical system configured for performing one or more ellipsometric, and/or polarimetric, and/or interferometric measurements on the target using illumination with multiple different wavelengths of incident light and multiple different angles of incidence, a detection system for detecting one or more optical responses of the target to said illumination and generating measured data indicative of a profile of at least a full phase of the optical response of the target in an angular-wavelength parametric space; and a control system configured as the above-described monitoring system.

The invention also provides a sensing system for identifying one or more predetermined substances, said sensing system comprising a sensing unit comprising one or more targets, each target being configured to exhibit phase singularity at accessible 2D range and having a surface configured for interacting with said one or more substances; and the monitoring system operating in said 2D range.

The invention also provides an automatic optical inspection system for monitoring one or more properties of targets, the inspection system comprising the above-described monitoring system operable with a predetermined 2D range at which the targets exhibit phase singularity, and a processor unit for processing the status data, and generating data indicative of one or more structural parameters of the target being inspected.

The invention, in its yet further broad aspect provides a method for use in monitoring a target to determine a status of the target. The method comprises: providing measured data indicative of optical response of the target measured under predetermined measurement conditions within a predetermined 2D parametric space; processing the measured data and creating map data including phase data indicative of a full phase of the optical response of the target in said parametric space; analyzing the phase data and extracting a phase singularity signature of the target by identifying in said phase data one or more phase singularity points in said parametric space, each being determined as a point in said phase data characterized by that a physical phase of the measured optical response continuously accumulates a nonzero integer multiple m of $2\pi$ around said point; applying model-based processing to the phase singularity signature and determining data indicative of a status of the target.

In some cases (i.e., for some targets, such as for example targets made of lossy dielectric), the phase singularity point (s) is moving along a curved trajectory in the spectro-angular space as a function of incident light polarization. Therefore, incident light polarization is an additional degree of freedom utilized for both optimization of phase singularity point(s) location, and the ability to have a sequence of closely packed phase singularity points as a function of incident polarization. Following the curve, which a phase singularity follows as a function of polarization, effectively means multiple phase singularity point measurement and allows to track more target and/or its vicinity parameters with extreme sensitivity.

As described above, the target status data obtainable by the technique of the present invention may be advantageously used in various applications. This includes inter alia identification of a change in critical dimensions of a pattern on the target, which can be used for controlling the patterning process applied to the target (e.g. semiconductor wafer), identification of a change in one or more properties of the target caused by one or more environmental conditions in the vicinity of the target (e.g. temperature and/or pressure field), mechanical forces, interaction of the target with foreign substances.

The phase singularity tracking technique of the present invention provides valuable information indicative of different critical dimensions (CD) of a target, fabricated by photolithography or any other nano-fabrication process. The information can be inferred by phase singularity tracking technology in different production steps, including masking, etching, CVD, light exposure, stepper steps, and others. Such information is critical for production yield management.

The monitoring system that performs phase singularity tracking can be a standalone machine or integrated into production line devices. For example, it can be integrated into a stepper machine. Phase singularity tracking can provide accurate information with high sensitivity that is indicative of the overlay between fabricated features, for example, the overlay between gratings fabricated in different layers or fabricated by separate steps of a multi-patterning photolithography process within the same layer.

By a proper design of a scatterometry target (e.g. adjusting the patterned features' shape and size, as well as period of the pattern), multiple phase singularity points (phase singularity signature) can be designed in an accessible 2D range of the parametric space (e.g. spectro-angular range) and be jointly used for CD monitoring. Both, the reflected and the transmitted diffraction orders of patterned targets can be made to possess a phase singularity signatures that can be utilized for CD target monitoring. The zero-th and $1^{st}$ diffraction orders are more advantageous for phase singularity tracking, because of the stronger signal and better accessibility for both the illumination and the light collection paths/channels. By utilizing the diffraction orders of patterned targets, and the $1^{st}$ diffraction order in particular, phase singularity tracking is capable of monitoring overlay information in one and two directions from a single target. It can be realized by a specialized design of a scatterometry overlay target or on-site (using the fabricated device as the target), provided that the target exhibits phase singularity signatures in the spectro-angular range accessible with a detection tool (measurement system).

Phase singularity tracking with anisotropic targets can be based on acquisition of a full phase map derived from the phase difference between an electric field component which was scattered from an anisotropic target that possesses a phase singularity signature and another reference field that does not exhibit phase singularity signature at the same point.

Examples for a target CD in all the above include side wall angle, width, thickness, overlay, etc. Examples of nano-fabrication processes in all the above include etching, masking, deposition (e.g., chemical vapor deposition), polishing (e.g., chemical mechanical polishing), sputtering, ion implantation, etc.

As will be described more specifically further below, the approach of the present invention based on phase singularity tracking technology provides for using only a single scatterometry target to monitor CD parameters such as overlay between features fabricated in a multi-patterning process. A single scatterometry target is able to provide overlay information after each multi-patterning step, or provide all the overlay information at the end of a multi-patterning process, if it is also being patterned at each such multi-patterning step. At each such step, another grating is added to the top layer of the scatterometry target, which redistributes the phase singularity signatures in the spectro-angular range accessible to measurement.

It should be noted that the sensitivity and movement of each phase singularity as a function of various target parameters is generally unique. Therefore, by observing and tracking multiple phase singularity signatures in the target, multiple target parameters can be measured. Additionally, a sequential measurement of the scatterometry target after each multi-patterning step allows for minimizing the number of unknown parameters, thereby reducing the complexity of the phase singularity tracking process.

It should be understood that the phase singularity tracking (PST) technique of the present invention is fundamentally different from the phase-sensitive techniques. The latter are based on monitoring changes in a target by measuring variations in a phase parameter, relying on a large local derivative at a fixed working point to achieve high sensitivity. More specifically, according to the phase-sensitive techniques, a sensor measures a change in an output signal $S_{out}$ as a function of a change in an input signal $S_{in}$. This change is typically continuous in that small changes to the input produce small changes to the output. Hence, in order to optimize for precision, sensors are often designed to operate at a working point defined as the coordinate in a parameter space at which the raw sensitivity given by the local derivative $dS_{out}/dS_{in}$ is maximized. Accordingly, at the working point coordinate, small changes to the input produce the largest possible local changes to the output.

The PST technique of the present invention utilizes the global topological structure of the phase designed into a target to locate discrete phase singularity points with extreme precision and noise robustness, and track their movement to convert extreme precision to greater sensitivity. More specifically, PST tracks the location of a discrete set of points having a nonzero 'topological charge' in a 2D parametric phase space, namely, the phase singularity (PS) points appearing in 2D phase map (e.g. spectro-angular phase map) attained by measuring the phase parameter (e.g. ellipsometry phase parameter $\Delta$) over the full $2\pi$ range. The integer value of 'charge' associated with each PS point is defined as the multiple of $2\pi$ accumulated when encircling that point in phase space once in a pre-defined orientation.

For example, monitoring the ellipsometry phase parameter of a target as a function of illumination wavelength $\lambda$ and incidence angle $\theta$, the output of the phase-sensitive measurement technique is the phase value variation, $\delta\Delta$, at a working point, WP, at different times t1 and t2:

$$\text{Output} \triangleq \delta\Delta = \Delta_{t2}(\lambda_{WP}, \theta_{WP}) - \Delta_{t1}(\lambda_{WP}, \theta_{WP})$$

In contrast, the output for a PST measurement technique that tracks the coordinate values of an evolving phase singularity point is:

$$\text{Output} \triangleq \delta\lambda = \lambda_{PS,t2} - \lambda_{PS,t1} \text{ and } \delta\theta = \theta_{PS,t2} - \theta_{PS,t1}$$

where $\lambda_{PS,t1}$, $\theta_{PS,t1}$ and $\lambda_{PS,t2}$, $\theta_{PS,t2}$ correspond to the spectro-angular coordinates of a tracked phase singularity point in the ellipsometry phase parameter $\Delta$ at different times t1 and t2, respectively.

In order to produce any output, the PST technique of the present invention first solves a discrete detection problem of whether there are any points with a nonzero topological charge (PS points) within the measured raw phase map. Then, the technique performs a two-step process: a composition of a PS detection step ($f_{PS}$) followed by a point tracking step ($f_T$). In other words, the output of the PST measurement technique, $O_{PST}$, as a function of input I, is determined as:

$$O_{PST}(I) = (f_T \circ f_{PS})(I) = f_T(f_{PS}(I))$$

The detection step identifies and estimates the location of a discrete set of N (N≥1) phase singularity points:

$$f_{PS}(I) = \{x_{PS_n}(I)\}_{n=1}^{N(I)} = \{x \in \text{phase space} | \text{topological charge at } x \text{ is nonzero for input } I\},$$

and the tracking step monitors movements of these points to produce the sensor output, such as the location of a particular PS point, all PS points, or the difference between two such points:

$$f_T(\{x_{PS_n}(I)\}_{n=1}^{N(I)}) = x_{PS_1}, f_T(\{x_{PS_n}(I)\}_{n=1}^{N(I)}) = \{x_{PS_n}\}_{n=1}^{N_{PS}}, f_T(\{x_{PS_n}(I)\}_{n=1}^{N(I)}) = x_{PS_2} - x_{PS_1}, \ldots$$

The detection step decodes topological information from the entire/full phase map and converts it into a precise sub-pixel estimation for the location of a discrete set of PS points. To this end, the raw phase map data is processed to identify and localize one or more phase singularity points in a measured full 2D phase map (e.g. spectro-angular phase map) utilizing the global topological structure of the phase designed into the target. Specifically, phase singularity is a global topological property whose existence and location is encoded into the topological structure of the full phase map as a whole: any path encircling a PS point, even if passing far from it, communicates this information in the nonzero integer multiple of $2\pi$ the phase accumulates following that path (topological charge). This global topological information is decoded to be able to localize PS points to extreme precision.

The tracking step translates high precision in locating the PS points to raw sensitivity to changes in the target, sustained over a wide dynamic range. Locating the PS points at high precision, provides for higher sensitivity in sensing the changes. The dynamic range is as wide as the 2D region over which the measurement is performed. This can be wider than the region typically used to track a minimum in reflectance. By tracking the movement of the PS points, the degree of precision with which their location is estimated in each iteration translates to the smallest change in the target that can be detected. The PST technique maintains this optimal sensitivity as the target evolves for as long as PS points remain within the measured 2D parametric range.

The PST technique is capable of simultaneously tracking multiple PS points in the measured 2D parametric range, to access additional information and further increase raw sensitivity (compared to local phase variation techniques). For example, tracking the difference between two PS points can increase the raw sensitivity because their relative movement can be larger than their separate rates of movement.

The PST technique is robust to uncorrelated noise, various target fabrication issues, and illumination with a finite bandwidth. Since PST detects a global property of the phase, correlated noise in the phase map is averaged out in the process of estimating the location of PS points, producing a precise noise robust estimation. This is unlike estimations based on local phase variations that are sensitive to noise at the working point. Moreover, since a branch point in the phase (PS) is a topological feature, its existence perseveres continuous deformations to experimental conditions. That is, deformations to the phase map resulting from surface roughness and fabrication error in layer thickness, or from illumination with a beam of finite spectral/angular bandwidth rather than a plane wave. In those cases, PST technique still detects PS points, even if slightly shifted, thus maintaining optimal performance. In contrast, phase variation techniques that rely on zero reflection working point suffer some performance degradation since a zero reflection point cannot be exactly realized, and is replaced with a near-zero reflection dip, so the optimal working point suffers a decrease in the slope of the phase affecting sensitivity.

It should also be understood that according to the PST measurement technique, the phase over its full range is to be resolved, as the partial-range phase cannot exhibit branch points (PS points). Moreover, PST measurement are performed over the 2D parametric domain to detect topological structure.

For the PST technique of the present invention, the measurement device and target can be designed such that the phase is measured over a 2D parametric space, e.g. spectral-angular space, or other 2D parameter spaces. If the phase exhibits phase singularity points over such 2D parametric spaces, the PST process can be used as described above for a given application. The inventors have shown that patterned targets and standard objectives can be used to obtain phase singularity points over a 2D angular space. Also, the inventors have shown that targets with thickness variation in one direction can be employed, and that direction can be used as one of two dimensions over which to measure the phase (where the remaining dimension can be angular or spectral).

The phase parameter extracted from measurement may be the ellipsometry phase $\Delta$, or an interferometry phase such as the relative phase between light reflected from a target and a reference beam. There is an additional phase parameter that may be extracted. One can measure the Stokes parameters with polarimetry, and extract the azimuth angle $2\psi$ at the point on the Poincare sphere that corresponds to the polarization state of light. This angle $2\psi$ can exhibit a topological structure with branch points, around which the azimuth rotates by $2\pi$ in the measured 2D optical parameter space. Hence, one can employ polarimetry to characterize the state of light reflected from a target to extract this azimuth angle, and use it for PST. This azimuth parameter can be tracked over a 2D angular parameter space.

For the ellipsometry phase measurement, the light incident on the target is usually polarized. However, since one can perform PST on other phase parameters, like the azimuth angle $2\psi$ extracted from the measured Stokes parameters that are well defined even for partially polarized light, the incident light need not be fully polarized. As long as the target induces a degree of polarization, the azimuth $2\psi$ can be extracted using standard polarimetry from reflected light. Hence the system can even use unpolarized light illumination.

BRIEF DESCRIPTION OF THE DRAWINGS

The patent or application file contains at least one drawing executed in color. Copies of this patent or patent application publication with color drawings will be provided by the Office upon request and payment of the necessary fee.

In order to better understand the subject matter that is disclosed herein and to exemplify how it may be carried out in practice, embodiments will now be described, by way of non-limiting example only, with reference to the accompanying drawings, in which:

FIGS. 7a-7f show simulation results of how the slab geometry target parameters can be tuned, wherein FIGS. 7a-c represent the amplitude of ellipsometrically measured quantity $\rho = \tan(\psi)e^{i\Delta} = r_{pp}/r_{ss}$; and FIGS. 7d-7f represent the ellipsometrically measured phase $\Delta$, showing phase singularity points;

FIGS. 15a-f, 16a-f, 17a-f and 18a-f illustrate various simulation results corresponding to the measurements scheme of FIG. 14 performed on the front-end-of-line (FEOL) target of FIG. 12;

FIGS. 22a-b illustrated experimental data for sensor chips that exhibit multiple phase singularities in an accessible spectro-angular range, with one of the singularities near a coalescence of modes;

FIGS. 23a-d show mainly TEM characterization of the multi-PST sensor chip

FIGS. 24a-b illustrate experimental results of the PST technique of the invention obtained using an experimental liquid cell setup, as compared to standard Surface Plasmon Resonance (SPR) type detection;

FIGS. 25a-b show the overall performance analysis for the experimental liquid cell system illustrating subpixel resolution for phase singularity detection;

FIGS. 26a-b show the overall performance analysis for the experimental flow cell system;

FIGS. 27a-c and FIG. 28a-b show two separate experimental data for PST detection of trace amounts (as low as 0.5 mg/L) of D-glucose in a water solution;

FIGS. 29a and 29c show the phase and FIGS. 29b and 29d show the amplitude of the $r_{pp}$ element of Jones matrices, presented as a function of incidence angle;

FIGS. 31a-d and FIGS. 32a-d show the FEOL type target simulation results for the phase and amplitude of $r_{ss}$ Jones matrix element response with PS points in the phase maps, and $r_{ps}$ Jones matrix element response with PS points in the phase maps, respectively, shown as a function of incidence angle;

DETAILED DESCRIPTION OF EMBODIMENTS

Figure 1:
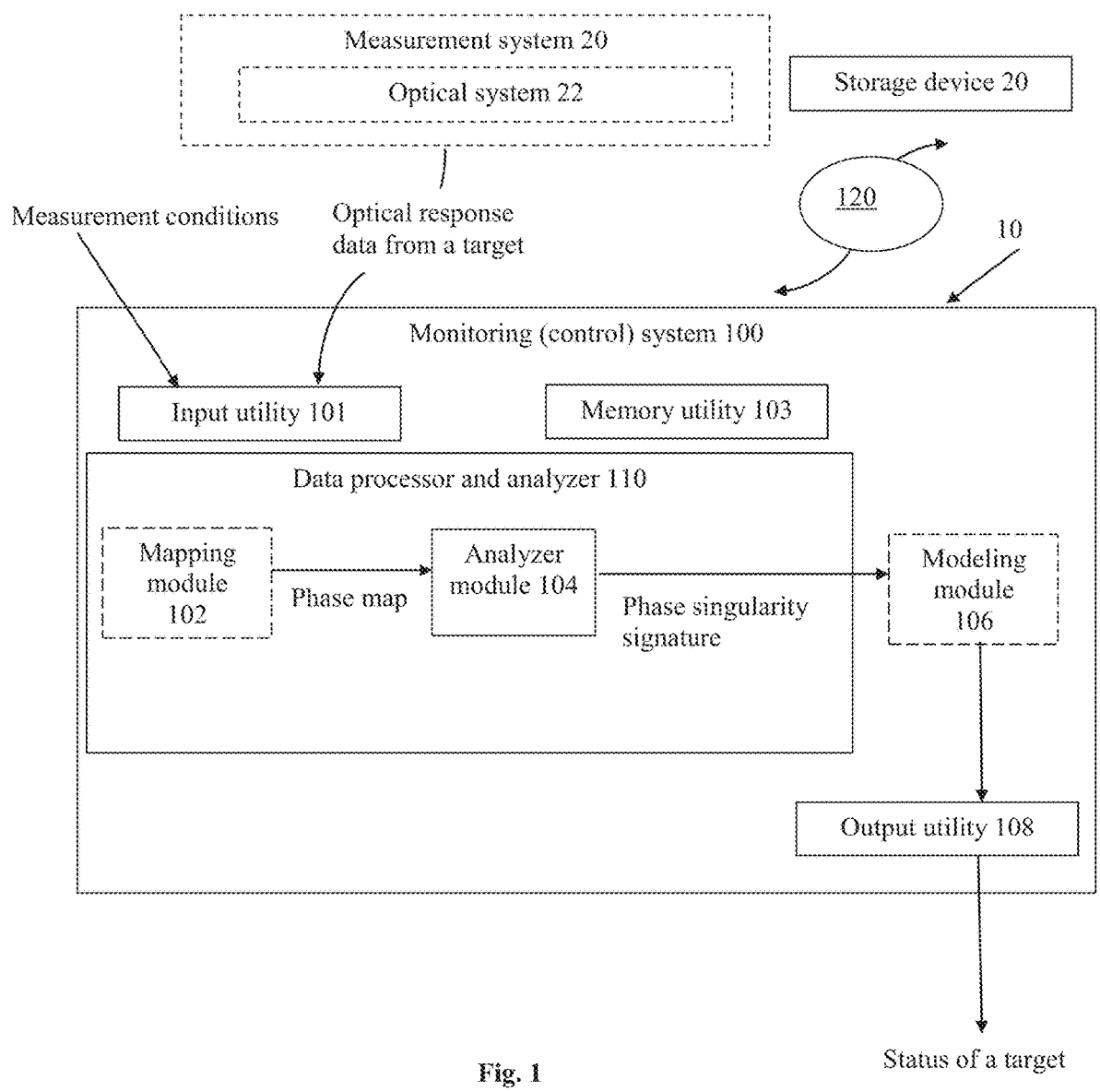
FIG. 1 is a schematic block diagram of the monitoring system of the present invention.

Reference is made to FIG. 1, illustrating, by way of a block diagram a monitoring system 10 of the present invention. The monitoring system 10 includes a control unit/system 100 which is configured as a computer system including inter alia data input and output utilities 101 and 108, memory 103, and data processor and analyzer 110.

The monitoring system 10 is configured and operable for monitoring a target to determine a status of the target. As described above, the status of the target includes one or more of the following data: a change in one or more structural parameters of the target caused by one or more processes/stimuli being applied to the target; a change in one or more properties of the target caused by one or more environmental conditions in the vicinity of the target; application of mechanical forces; a change in one or more conditions of the target caused by interaction of the target with one or more foreign substances. As also described above, the data indicative of the status of the target may be used for controlling the parameters/properties of the target itself, for example to classify the target, or may be used for controlling/monitoring external conditions affecting the status of the target.

The control system 100 is configured for receiving input data including optical measured data indicative of an optical response of the target to incident illumination obtained in one or more measurements sessions performed on the target under certain measurement conditions. To this end, the control unit 100 may be configured for connection to a measured data provider 20 via wires or wireless data communication using one or more known communication techniques and protocols. Hence, it should be understood, although not specifically shown, that the control unit may be equipped with a suitable communication port.

The measured data provider 20 may be an optical measurement device itself, and the data processing and analyzing may thus be implemented in a so-called on-line mode. Alternatively or additionally, such measured data provider 20 may include a storage device (e.g. that of the measurement device or an external storage device 20 where the measured data is stored and to which the control unit has access (e.g. via a communication network 120) in which case the data processing is performed in an off-line mode. For example, the data about the measurement conditions may be preset data stored in the storage device to be used in the measurements and the measured data (optical response data) is generated by the measurement device and communicated to the control unit.

The measured data includes phase data indicative of a two-dimensional profile of a full phase of the optical response of the target in a predetermined two-dimensional parametric space, e.g. an angular-spectral parametric space. The data processor and analyzer 110 includes an analyzer module 104 which is configured and operable to process the phase data and extract at least one phase singularity signature of the target which characterizes the target status.

The phase singularity signature is formed by one or more phase singularity points in the angular-spectral parametric space. Each phase singularity point is identified as a point in the phase map around which a physical phase of the measured optical response continuously accumulates a nonzero integer multiple m of $2\pi$, up to experimental errors and pixelization errors in the 2D parametric space sampling of the data. As explained above, a phase singularity point is a point in the phase map which substantially satisfies/meets a condition that a physical phase of the measured optical response around this point continuously accumulates a nonzero integer multiple m of $2\pi$, up to experimental errors and pixelization errors in the spectro-angular sampling of the data. Data indicative of the so-determined phase singularity signature is output via the output utility. The latter may include a graphical user interface displaying the phase plots clearly showing the one or more phase singularity points.

The system 100 may further include as its constructional part a mapping module 102; and may include or be associated with (connectable to) a modeling module 106. The mapping module 102 is configured and operable for receiving optical response data and data about measurement conditions used for obtaining the optical response data, analyzing the received data and generating map data indicative of the profile of the full phase of the optical response in the respective parametric space.

In this connection, it should be understood that raw measured data typically also includes a set of intensity measurements, and thus the received measured data would be indicative of both the intensity and phase map data indicative of intensity and phase map of the target in the certain, e.g. angular-wavelength, parametric space. However, for the purposes of the present invention, in its broadest scope, for the measured data to be processed and analyzed in order to determine/monitor the status of the target, it is sufficient that such data enables to identify/create only the phase map data.

The analyzer module 104 is configured and operable for processing the phase map data and identifying one or more phase singularity points in said parametric space. The modeling module 106 is configured and operable for applying a model based processing to the one or more phase singularity points and generating data indicative of the status of the target.

In this connection, the following should be noted. The inventors have found that the phase singularity point provides a direct measure of one or more parameters/conditions of the target; this may be for example effective refractive index data associated with at least one property of the target and/or environment in a vicinity of the target. The effective refractive index data includes or is indicative of the refractive index itself; and/or the refractive index change; and/or one or more properties of the target and/or environment in the vicinity of the target being in a relation (known or that to be determined) with the refractive index or refractive index change.

More specifically, properties of the target and/or environment in the vicinity of the target comprise one or many of the following examples: refractive index of one or many media constituents comprising the target and/or environment in the vicinity of the target and/or media generated as a result of investigated chemical reaction, temperature of the target and/or environment in the vicinity of the target, pressure within the target and/or environment in the vicinity of the target, one or many of the target layer thicknesses, one or many of the target critical parameters (two dimensional and/or three dimensional target geometry parameters), one or many overlay displacements between layers in a multilayer target structure, density/s of a specific atom/s and/or molecule/s (within a target and/or within environment in the vicinity of the target) in gas and/or liquid and/or solid host reference media.

As described above, the target has a specially designed structure exhibiting phase singularity (i.e. the measured optical response of the structure within the accessible range of the predetermined 2D parametric space has one or more point characterized by that a physical phase of the measured optical response continuously accumulates a nonzero integer multiple m of $2\pi$ around such point) to exhibit phase singularity at the accessible range. The target's feature(s), e.g. geometrical and/or material composition features, and/or environment feature(s) in the vicinity of the target might be modified during the measurement process by additional layer/s, precipitation of atom/s and/or molecules, temperature, pressure, or other chemical reaction causing a measurable change in the refraction index (erosion, charging, van der wales force experience, etc.).

With regard to the phase singularity point, the following should be understood. In principle, a phase singularity point in the relevant parametric space (e.g. the angular-spectral range) is a point characterized by that the physical phase of the electromagnetic wave being measured continuously changes by a nonzero integer multiple of $2\pi$ (m$2\pi$, m being integer $|m|\geq 1$)) around the singularity point. In this connection, it should be understood that what is actually measured in the optical response data is the numeric range of the phase. The analyzer module 104 applies to the phase map data, a phase singularity location extraction algorithm, by processing the numeric phase representation of the measured physical phase over the parametric space, to identify first order (($|m|=1$) and higher order ($|m|\geq 2$) phase singularity points.

For example, considering a phase singularity of order 2 (m=2), and going around this point in a circle in the parametric space for the specific choice of branch for the numeric phase that ranges from 0.1-$2.1\pi$, the phase would change from $0.1\pi$ to $2.1\pi$ in part of the round trip, then abruptly jump from $2.1\pi$ to $0.1\pi$ because $2.1\pi$ in the physical phase is represented by $0.1\pi$ in the numeric phase, then again continuously accumulate another $2\pi$ as the round trip loop closes. The physical phase accumulated $4\pi$ continuously, but its single-branch numeric phase representation has made two continues changes from $0.1\pi$ to $2.1\pi$, with a $2\pi$ jump in between. Thus, going around the phase singularity point in the parametric space, the physical phase continuously accumulates a nonzero integer multiple of $2\pi$. It can be $4\pi$ or $-6\pi$, but not 0. The phase singularity location extraction algorithm processes the numeric phase representation of the measured physical phase over the parametric space, and identifies the cases of higher order phase singularities, independently of the branch cut chosen for the numeric phase. This will be described more specifically further below.

Turning back to FIG. 1, the measurement device may be configured for applying illumination to the target with multiple different angles of incidence and multiple different wavelengths of incident light and detect optical response of the illuminated region in transmission and/or reflection mode, where the optical response is the function of the angle and wavelengths used. It should be understood that multiple-angles and multiple-wavelengths measurements (as well as any other examples of such 2D parametric space, as will be described below) may generally be performed in scan and/or snapshot mode. As will be described further below, the invention also provides a novel measurement system enabling to perform imaging of such 2D parametric space data on a pixel matrix/camera (e.g., CCD, EMCCD) in a single shot.

Figure 2:
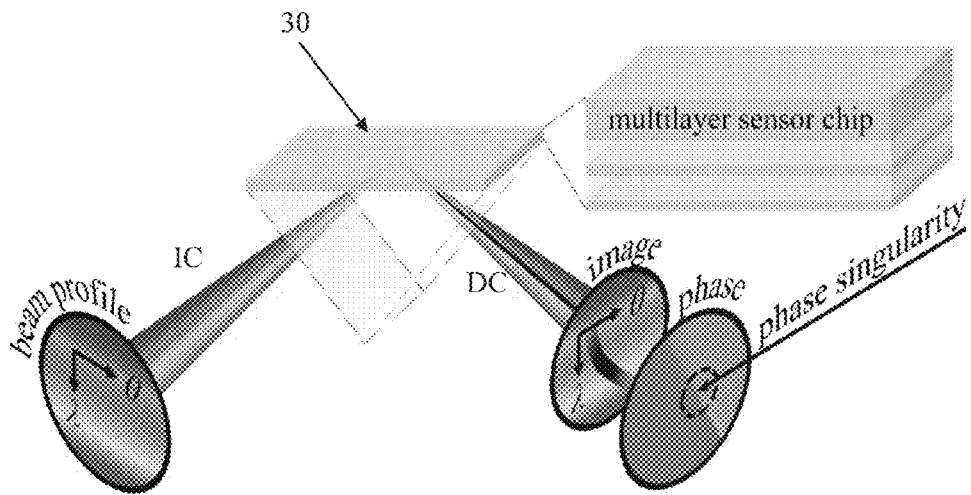
FIG. 2 is a schematic illustration of the principles of measurement scheme according to the invention for determining phase singularity signature.

FIG. 2 schematically exemplifies the main principles of the measurement scheme for obtaining data indicative of the phase map. In this non-limiting example, a spectro-angular parametric space is considered. As shown, incident light is directed along illumination channel IC onto a target 30 (e.g. a multi-layer sensor chip) located in a measurement plane, and light response of the illuminated region on the target propagates along a detection channel DC and is imaged onto a pixel matrix of a detector. It should be understood that although this schematic illustration shows the measurements in reflection mode, the same principles can be used for transmission mode measurements. The measurement conditions are such that illumination applied to the target includes multiple different angles $\theta$ of incidence within a certain angular range and multiple different wavelengths $\lambda$ within a predetermined wavelength range. In other words, the illumination has an angular-spectral beam profile. The output of the detector (measured data) is indicative of the intensity and phase of the detected light as a function of the multiple angles and wavelengths, i.e. includes the optical response parameter(s)' variation in the angular-spectral parametric space presenting a phase map data or intensity and phase map data. This map data is then processed to identify the phase singularity point as defined above and clearly illustrated in the figure.

Figure 3:
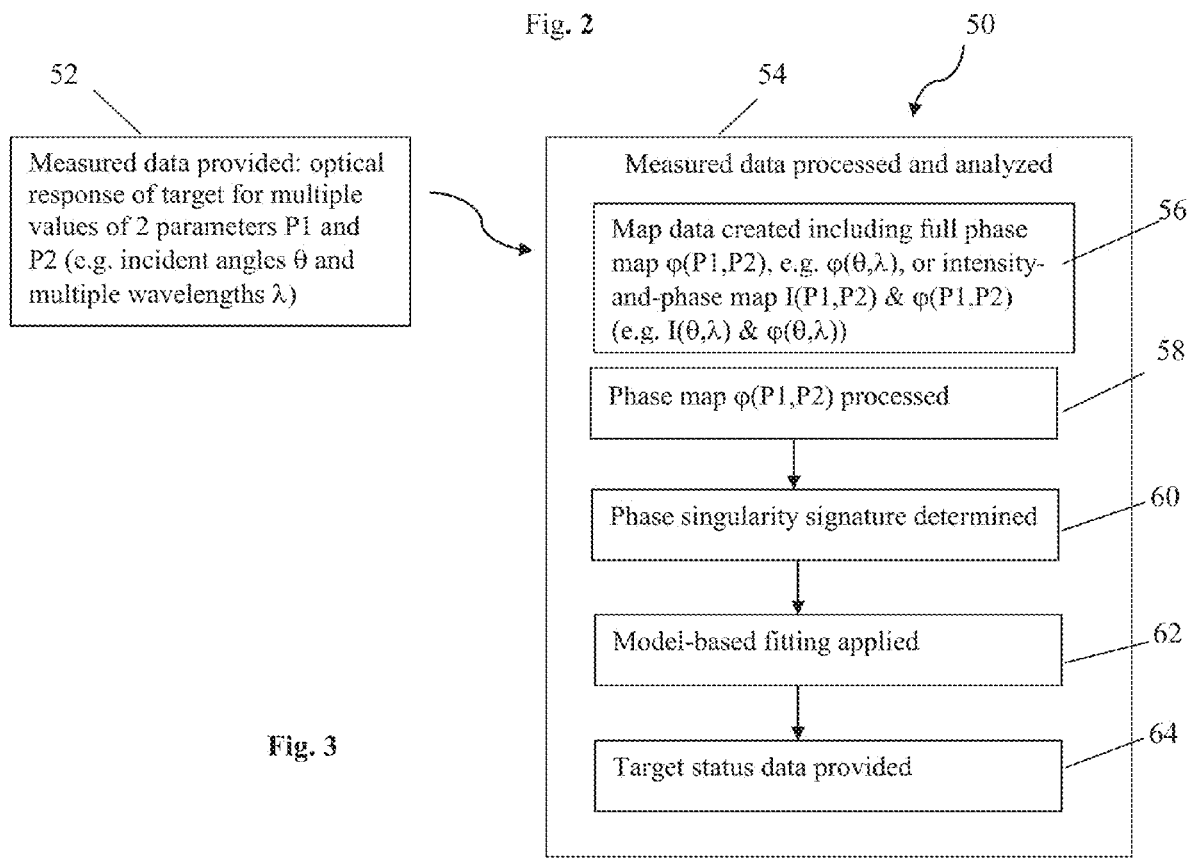
FIG. 3 is a flow diagram of an example of the monitoring method of the invention.

Reference is made to FIG. 3 exemplifying a flow diagram 50 of an example of a method of the invention for monitoring a target to determine its status. The measured data is provided/received (step 52) and then processed (step 54). The processing of the measured data includes creation of map data (step 56) which includes either phase map data $\varphi(P1,P2)$ (e.g. $\varphi(\theta,\lambda)$), i.e. variation of phase (phase profile) in the optical response of the target as function of 2 parameters P1, P2, e.g. wavelength and angle of incidence of illumination; or typically both the phase map data $\varphi(P1,P2)$ and the intensity map data $I(P1,P2)$. Then, the phase map data $\varphi(P1,P2)$ is further analyzed (step 58) to identify/determine phase singularity points or phase singularity signature (step 60). The latter further undergoes model-based fitting procedure (step 62) to determine the property of the target (step 62).

Either the phase singularity location or parameter fitting over the range (e.g. spectra-angular range) of the 2D parametric space including phase singularity is/are used to extract one or many of the corresponding effective refractive index parameters. The parameters extraction is either based on their known analytical behavior or on reference study performed under known conditions and used as a calibration model (e.g. one can perform a set of experiments with known concentrations of an analyte, study the behavior of phase singularity and build a model used for extraction of unknown concentration/s).

As described above, the phase singularity point is identified as a point characterized by that the physical phase of detected light continuously changes by a nonzero integer multiple m of $2\pi$ around the singularity point. In this connection, it should be noted that in phase measurements, due to unavoidable measurement error, the extraction of phase near the region where it jumps $2\pi$ preferably utilizes an unwrapping algorithm, to prevent the situation that the measurement error falsely adds $2\pi$ to the extracted phase. Various examples of such algorithms could be found in the following reference: "*Phase Unwrapping Algorithms: A Comparison*", Antonio Baldi et al., Department of Mechanical Engineering, University of Cagliari, Italy; Interferometry in Speckle Light; Springer-Verlag Berlin Heidelberg 2000. This publication is incorporated herein by reference for a non-limiting example of unwrapping feature (when used) of the phase singularity extraction algorithm.

After unwrapping the measured data, it can be fitted (e.g. by regression) to an analytically calculated signal (theoretical or modeled data) with fitting parameters representing the anticipated change in the optical waveguide structure (effective refractive index). Analytical solutions can be stored in a library and used in the fitting procedure to arrive to best fit solution. The search can be optimized to be faster using any known suitable expert system features, e.g. self-learning algorithms.

The inventors have used, as a non-limiting example of sub-pixel phase singularity location determination, an approach used in optical vortex metrology, in which intensity signals are numerically converted into complex functions with vortexes. While the technique of the invention deals with measurement of true phase of the field, this approach generates the phase numerically and refer to it as pseudophase. An exemplary algorithm for phase singularity sub-pixel reconstruction (and therefore sub-pixel tracking) is described in section 2.2 of the following reference "*Optical vortex metrology for nanometric speckle displacement measurement*", Wei Wang et al., Optics Express, Vol. 14, Issue 1, pp. 120-127 (2006), which is also incorporated herein by reference. Allowing sub-pixel phase singularity tracking, allows more sensitive measurement of the effective refractive index.

For example, phase data can be obtained using an interferometric measurement scheme. The principles of interferometric measurements and various possible configurations of interferometric measurement scheme are known per se and need not be specifically described, except to note that in such measurements two optical beams interfere on the detector.

In some embodiments, the measurement scheme utilizes the principles of ellipsometric measurements. Ellipsometric scheme provides for measuring changes in the polarization of light caused by interaction with (reflection from/transmission through) the target. These changes, characterized as amplitude and phase changes, are very sensitive to the thickness and optical properties of the target (e.g. multiple layers in the target structure).

Figure 4:
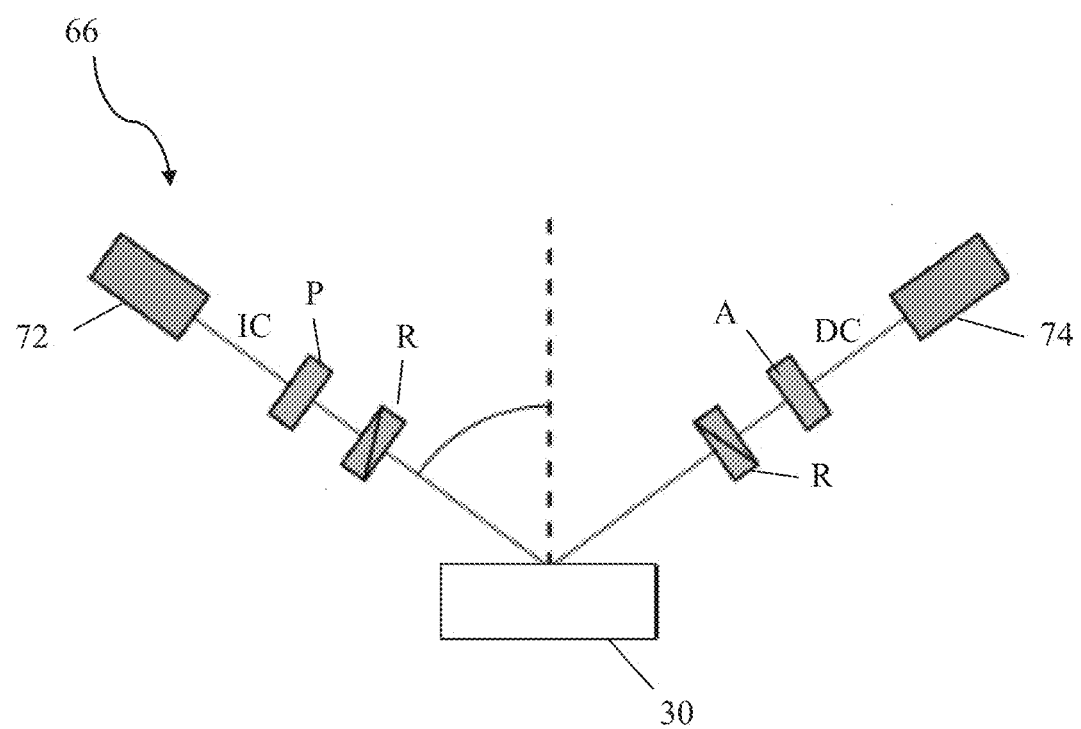
FIG. 4 schematically illustrates an ellipsometric measurement scheme.

A typical ellipsometric measurement scheme 66 is illustrated in FIG. 4. Incident light is directed from a light source 72 along an illumination channel IC onto a target 30 and light reflected from the target 30 propagates along a detection channel DC onto a detector 74. The illumination has a certain polarization, e.g. the illumination channel includes a polarizer assembly, formed by a polarizer which filters light of a specific polarization (typically, produces linearly polarized light) and allows its propagation to the target and compensator (retarder, quarter wave plate) R which induces a polarization change by phase delay between linear polarizations aligned to fast and slow retarder axes and placed between the polarizer P and the target; and a second polarizer (corresponding analyzer) A is provided in the detection channel DC.

For the purposes of the invention, in the example of spectro-angular parametric space, the ellipsometry-based optical scheme is modified to provide illumination with multiple angles of incidence and multiple wavelength and detect corresponding optical response of the target. This is in order to obtain measured data containing information about the intensity and phase profiles in the detected optical response as functions of the wavelengths and incident angles of illumination, i.e. phase profile in the angular-spectral parametric space.

Reference is made to FIGS. 5A-5D exemplifying the technique of the present invention applied to a specific target 30 in the form of a gold film layer of thickness d=44 nm. In these non-limiting examples, the spectro-angular parametric space is considered.

Figure 5A:
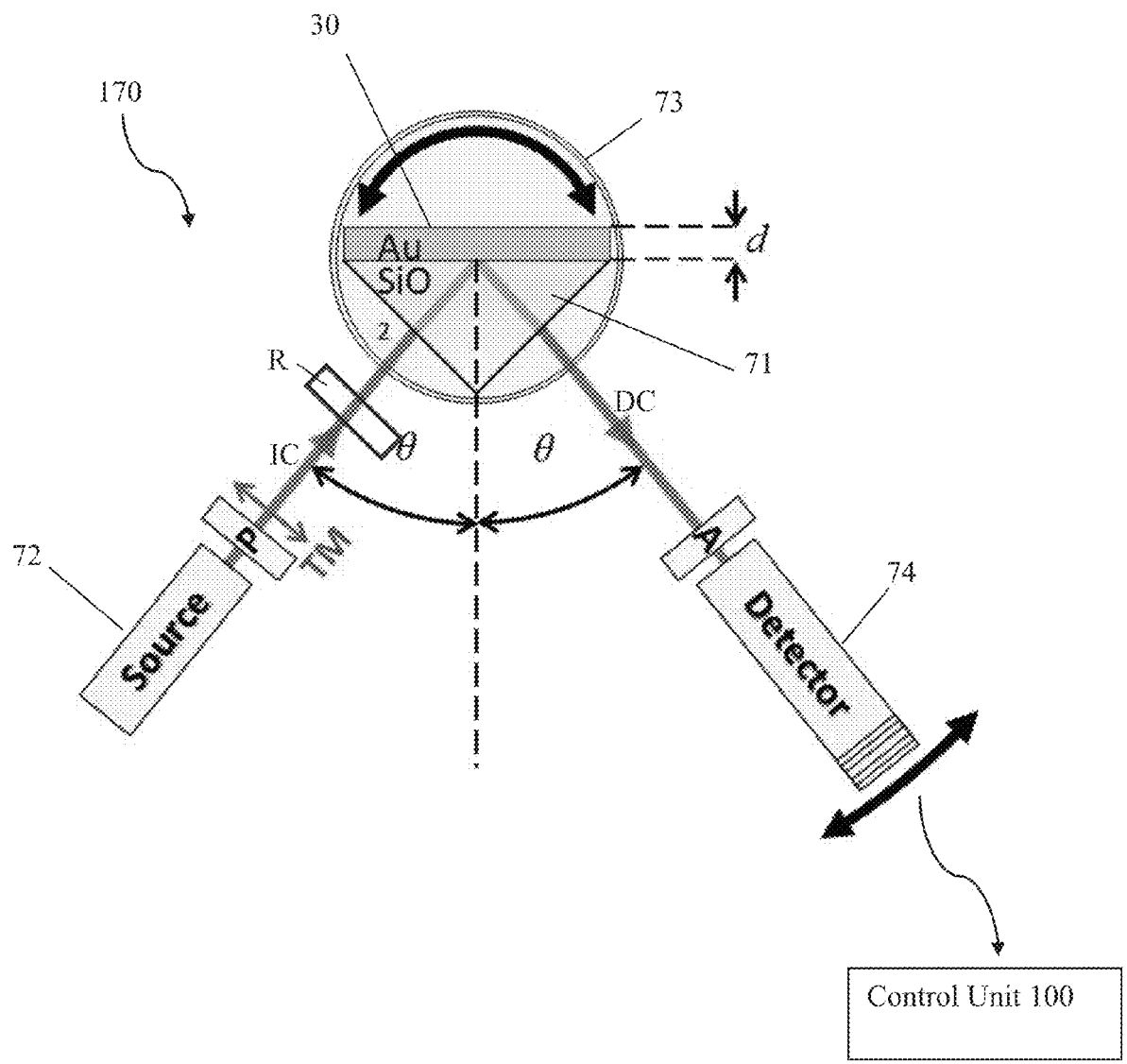
FIG. 5A exemplifies a modified ellipsometric measurement scheme/system of the invention for measuring a target in the form of a 44 nm gold film layer using interrogation via a coupling prism.

FIG. 5A exemplifies the modified ellipsometric optical scheme 170, which is generally similar to optical scheme which is described above with reference to FIG. 4. To facilitate understanding, the same reference numbers are used to identify components functionally similar in the systems of FIGS. 4 and 5A. As shown in FIG. 5A, in this example, the target is interrogated using a $SiO_2$ coupling prism 71 allowing higher than in air light wave vector interrogation, and the target is located on a rotating stage 73 to implement interrogation by multiple angles, and a detection arm/channel/device is located on a separate rotating stage. The output of the detector (data indicative of measured reflectance) is received and processed by the control 100 configured and operable as described above.

Figure 5B:
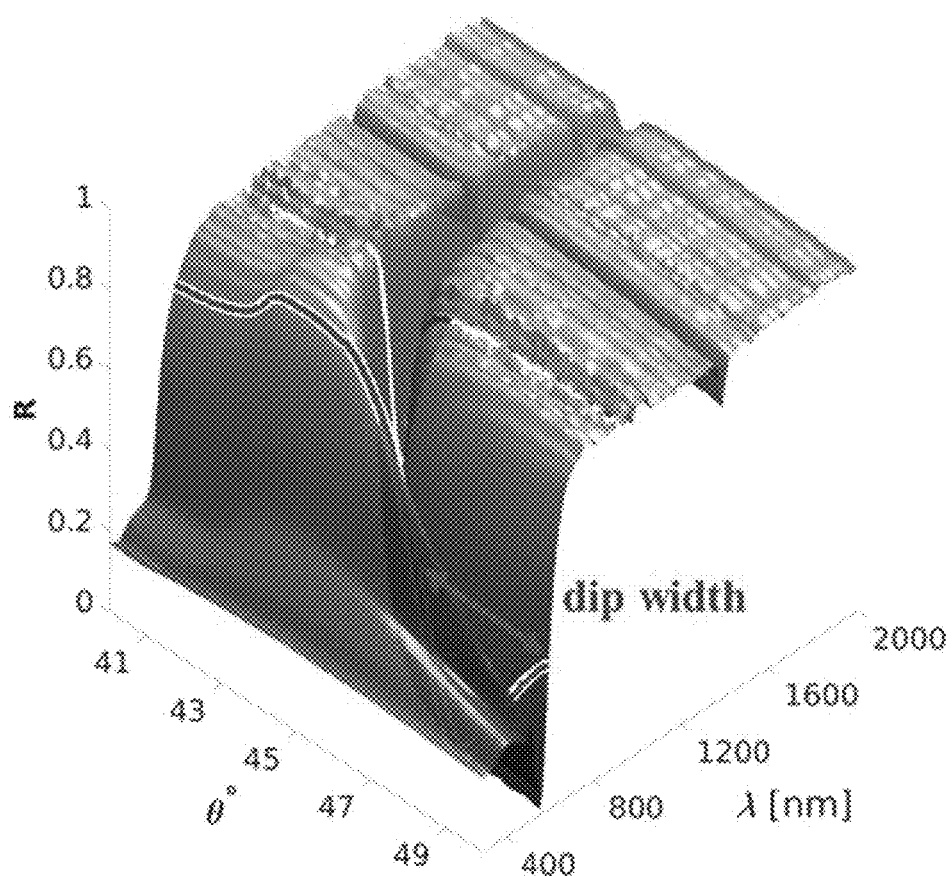
FIG. 5B shows measured intensity map in spectro-angular parametric space for transverse-magnetic (TM) incident light, obtainable by the system of FIG. 5A.
Figure 5C:
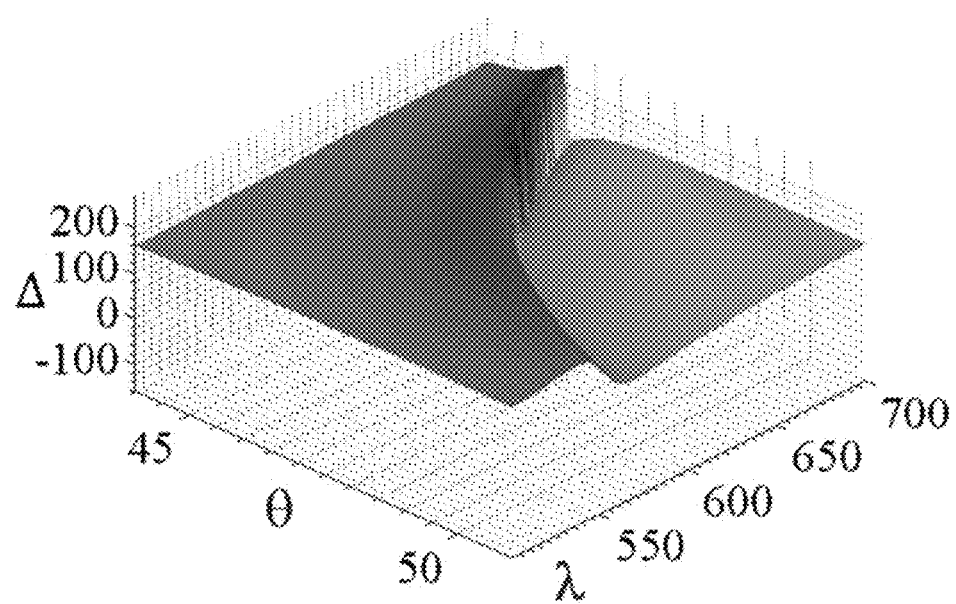
FIG. 5C shows the phase map of the measured target sampled in reduced spectro-angular parametric space.
Figure 5D:
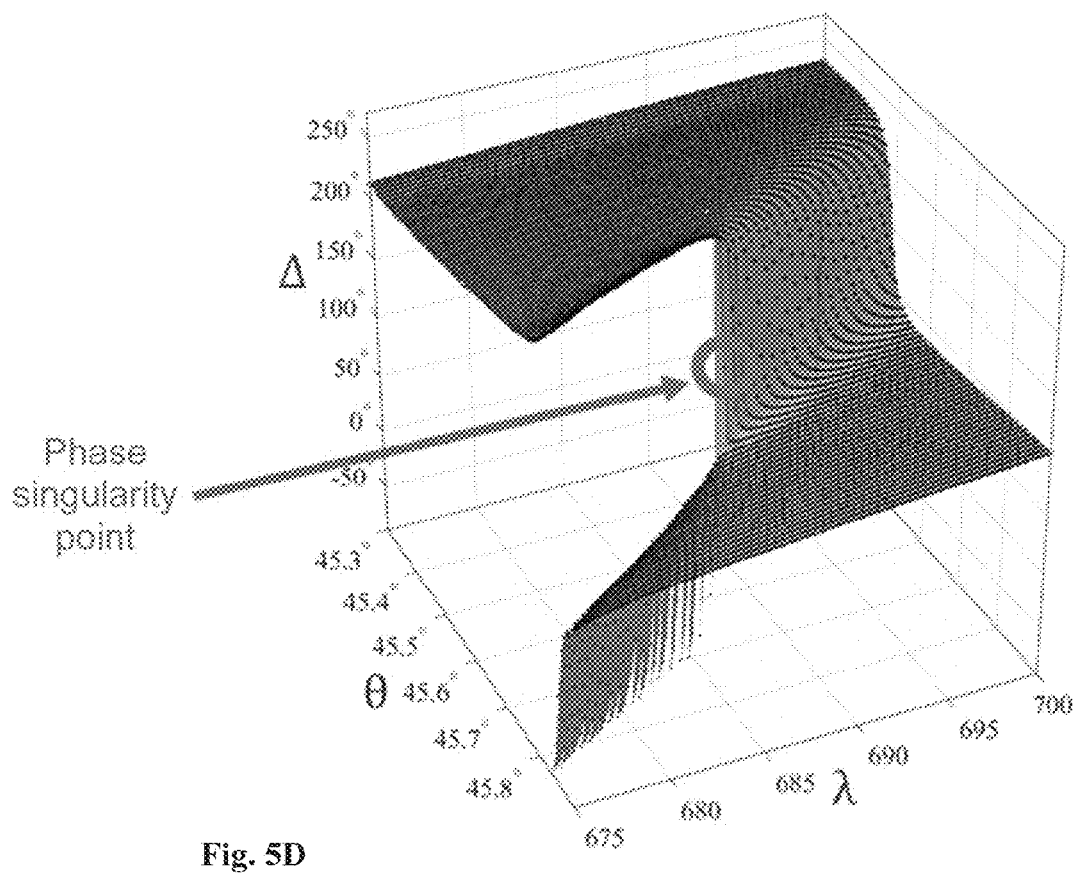
FIG. 5D shows the highly zoomed-in phase map of the target sampled in reduced spectro-angular parametric space to allocate the phase singularity point with higher precision.

FIG. 5B shows the measured reflectance in spectro-angular parametric space (i.e. intensity map $I(\theta,\lambda)$) for transverse-magnetic (TM) incident light. FIG. 5C shows the phase map of the measured target, sampled in reduced spectro-angular parametric space, and FIG. 5D shows the highly zoomed-in phase map of the target, sampled in reduced spectro-angular parametric space to allocate the phase singularity point with higher precision.

For example, a set of a few intensity snapshot measurements is performed using modulated polarization state of illumination and/or modulated polarization state of collection path optical elements. These measurements are used to determine for each point within the snapshot the amplitude and phase of the ratio between the transverse magnetic (TM) and transverse electric (TE) reflected beams, while the TM reflected beam experiences a phase singularity.

With regard to target configuration suitable to be used with the present invention, the following should be noted. Considering those applications of the invention where monitoring of a change in the target's status is used to inspect the target environment, i.e. the target is a part of a sensing system, the target's configuration/modeling is a part of the system design. In some other applications of the invention, where monitoring of a change of the target's status is used in order to detect a change in the target structure (e.g. overlay measurements), for example for the process control purposes, the measurement system is to be designed to be able to detect phase singularity conditions for a given target. In both situations, whether the target is given or is to be modeled, the accessible range of the 2D parametric space (e.g. spectro-angular range) is to be considered/selected.

The following are some specific non-limiting examples of the target modeling and design procedure, as well as some examples of suitable target types.

As described above, the measurements in the 2D parametric space used in the present invention requires a target designed to experience one or more phase singularity points within the accessible range of said 2D parametric space, e.g. spectro-angular range. The target design should preferably optimize the initial and anticipated final positions of the phase singularity(ies), such that both points are as distant as possible from each other but remain within the accessible range. The design typically utilizes a simulation model of the target, used to optimize the media (material properties) and geometry parameters of the target (e.g., metals, dielectrics, layer thickness, and/or patterned layer pitch/CD parameters). In this connection, it should be noted that the final phase singularity location is subject to prior knowledge of the tested change within the target and/or the surrounding environment.

The types of targets suitable for measurements in 2D parametric space, such as spectro-angular space, spectro-thickness space, angular-thickness space, include planar layered waveguides with or without a coupling prism; waveguides of cylindrical symmetry, e.g. optical fibers; such waveguides functionalized by patterning (e.g. for overlay and CD metrology applications); such waveguides coupled to a resonant molecule/s and/or nanoparticle/s (typically such targets are attributed to Fano resonance systems). The characteristic property for a valid target is to exhibit phase singularity point/s in one of the fields scattered from it within the far-field accessible range. Some targets meet this condition for near-field excitation.

Thus, the invention provides for the use of such targets for phase singularity point acquisition and their sequential use for detection. In this connection, it should be understood that far-field excitation is an excitation by light propagating in free space. This is contrary to secondary light source positioned near the target and therefore coupling the light in the near-field (like exciting optical fiber tip at a few hundreds of nanometers from a waveguide, e.g. Near-field scanning optical microscope (NSOM)).

It should be noted that in the field of optical fibers, free-propagating or near-field vortex beams, and "far-field speckle inspection", spatial vortices are known and heavily studied. Those vortices are often identified with zero intensity points in the spatial domain. Despite some similarities, those spatial vortices exist in the physical coordinate space, and should be distinguished from phase singularity points occurring in 2D parametric space utilized in the present invention. To illustrate the difference, spatial vortices refer to vortices in the field when one takes a snapshot of the field in 2D (x-y) physical space, whereas e.g. spectro-angular vortices exist in the sampled field data at one physical point taken over many measurements that span a range of wavelengths and incidence angles.

Considering a planar layered (un-patterned) waveguide, Fresnel equations and Transfer Matrix Method (the known technique used in optics and acoustics to analyze the propagation of electromagnetic or acoustic waves through a stratified medium) provide a convenient target numerical model. The model parameters comprise the number, order, thicknesses, and permittivity of the composing layers, and the surrounding optical media properties (the substrate and superstrate). The model-based target design typically requires prior knowledge of the tested change within the target or its vicinity, and optimization over selected parameters (e.g. waveguide parameters) for the order and number of layers, their composing optical media, and their thickness. The same or similar model used for target design is also suitable for fitting of the measured data (e.g., a regression fit) by parametric modeling over the tested parameters.

Considering a patterned multilayer target, it has no analytic solution, and requires more complex numerical calculation techniques. For periodically patterned targets, a fast and reliable technique could be the known Rotating Coupled Wave Approximation (RCWA). RCWA solvers are commercially available and can be efficiently used for such target modeling.

Figure 6:
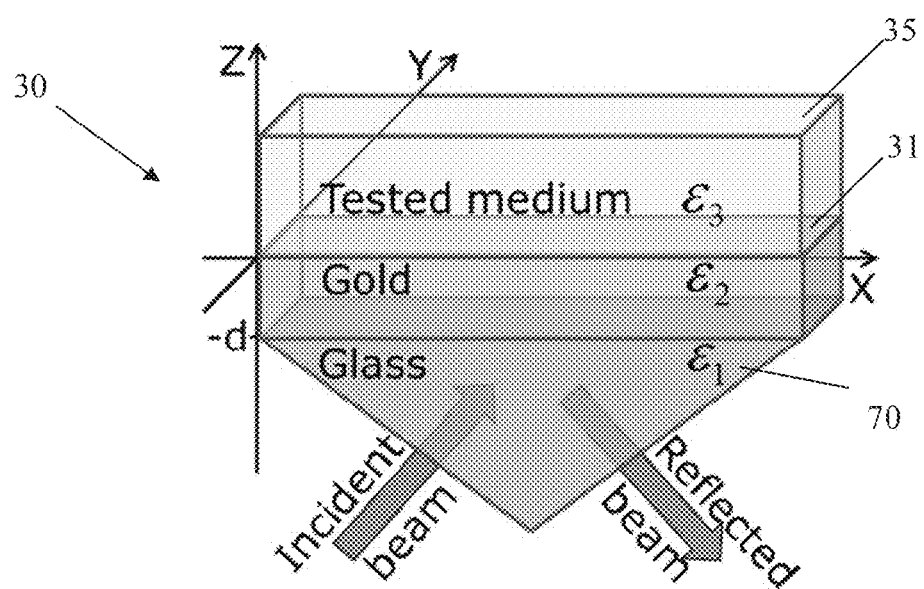
FIG. 6 exemplifies a target having a slab geometry, which is practical value for SPR biosensing applications.

Referring to FIG. 6, there is shown a specific, not limiting, example of a target having a slab geometry, which is of high practical value for SPR biosensing applications. The target 30 includes a gold layer 31 fabricated atop of a coupling glass prism 70. The target 30 can be utilized for sensing an analyte concentration dissolved in a tested liquid media 35 above the gold layer 31, by illuminating the layer 31 via the prism 70 and detecting reflection from the layer 31. In this, relatively simple case, the reflection coefficient for an incident plane wave is determined as:

$$r_{123} = \frac{r_{12} + r_{23}e^{-2ik_{z,2}d}}{1 + r_{12} + r_{23}e^{-2ik_{z,2}d}}, \quad (1)$$

where d is the metal (gold layer) thickness, $k_{z,2}$ is the z component of the wave vector transmitted to the gold layer, and $r_{mn}$ follows the below presented Fresnel equations (the s and p subscripts indicate transvers electric and transvers magnetic field polarizations respectively; the subscripts m and n indicate the medium of incidence and the scattering medium, respectively; $\varepsilon$ is the electric permittivity; and $\mu$ is the magnetic permeability, jointly shaping the dispersion relation of the medium $k_{z,j}^2 + k_{x,j}^2 = k_0^2 \varepsilon_j \mu_j$):

$$r_{mn,s} = \frac{k_{z,m}/\mu_m - k_{z,n}/\mu_n}{k_{z,m}/\mu_m + k_{z,n}/\mu_n}, \quad r_{mn,p} = \frac{k_{z,m}/\varepsilon_m - k_{z,n}/\varepsilon_n}{k_{z,m}/\varepsilon_m + k_{z,n}/\varepsilon_n}, \quad (2)$$

For the case the tested medium is water-based, so that the refractive index is around 1.33, the target structure 30, formed by the right-angle prism 70 made of the optical glass N-SF$_{11}$ (or LASF$_9$) covered by the gold layer 31, provides convenient measurement conditions. Namely, it is suitable for a wide wavelength range of 400-2000 nm, and phase singularity points fall within a practically convenient angular range of ±20 degrees around the normal incidence to the entrance prism facet.

As a function of the concentration of an analyte with known optical properties (refractive index), the liquid media 35 in contact with the gold layer 31 acquires an effective refractive index change, shifting the phase singularity of the structure, formed by target-and-analyte, in the spectro-angular range. As the accessible range of wavelengths and angles is relatively wide, the target design can optimize the position of phase singularity point to maximize the optical difference (refraction index) between the analyte and water-based medium.

The target design is executed by numerically evaluating Eq. (1) as a function of thickness of the gold layer 31. The numerator equal to zero indicates the position of phase singularity point(s). Considering only a real-valued spectro-angular range, the numerator experiences one or many phase singularity points, and those positions are unique for every gold layer thickness, and is therefore tunable.

An example of such tuning is illustrated in FIGS. 7a-7f. These figures show simulation results of the gold slab configuration as a function of its thickness, tangential wave vector component $k_x$ (equivalent to incident angle) and wavelength. Here, FIGS. 7a-c represent the amplitude of ellipsometrically measured quantity $\rho = \tan(\psi) = e^{i\Delta} = r_{pp}/r_{ss}$; and FIGS. 7d-7f represent the ellipsometrically measured phase $\Delta$, with phase singularity points being indicated by circles. The calculations are performed utilizing the Transfer Matrix Method. The method provides results equivalent to what is predicted by Eqs. (1) above for the slab geometry target. It should however be understood that this technique can also be easily extended to any multilayer target and is suitable for further fitting of unknown parameters.

The results are represented in a quantity typically measured in ellipsometry, $\rho = \tan(\omega) e^{i\Delta}$, a complex function defined as a ratio between TM and TE reflection coefficients $\rho = r_{pp}/r_{ss}$ (double subscript accounts for incident and reflected polarizations which could be mixed for anisotropic target, as will be described more specifically further below. The amplitude and phase of $\rho$ are represented for different gold layer thicknesses (20-60 nm) sandwiched between N-SF$_{11}$ glass and water ($n_{water}$=1.33). As can be seen from FIGS. 7d-7f, the initial phase singularity point position is tunable to any wavelength within the wavelength range of 400-2000 nm. As every phase singularity point position provides information about two parameters, the additional phase singularity point could be utilized for more fitting parameters and/or for system noise reduction.

It should be noted that, although the present specific example refers to the ellipsometrically measured quantity $\rho = r_{pp}/r_{ss}$ and the studied phase singularity points occurs in TM polarization, the technique of the present invention is not limited to this example, and the principles of the invention are applicable also to targets designed to experience phase singularity in other polarizations. As an example, reflection from a slab of lossy dielectric on glass substrate experiences spectro-angular phase singularity points in any polarization, including TM, TE and circular polarizations. Such a Fabry-Perot resonator could be made of a silicone layer of 150 nm thickness atop of silicone dioxide substrate. Silicone has considerable losses below 1100 nm wavelength, and within the wavelength range of 400-1200 nm the slab geometry experiences spectro-angular phase singularity points at any linear polarization. For a TE polarization phase singularity point the theoretical value of the quantity $\rho$ diverges due to $r_{ss}=0$, which in practice means its local maximum. Therefore, a different quantity (e.g. inverse of $\rho$ or a different ratio between two polarizations) might be more suitable for measurements of phase singularity points occurring in TE or other polarizations.

The technique of the present invention, described above, provides fast and reliable optical phase singularity tracking. The inventors have found that such phase singularity exists when light is coupled to some special field solutions of the target configuration (e.g. Brewster plasmons).

For example, tracking a phase singularity in the spectro-angular domain provides superior optical sensitivity and resolution due to its topological character. This singularity point moves in the 2D parametric space image as the optical property(ies) of the target change (e.g., due to some interaction occurring at its vicinity that changes the local refractive index). Moreover, with appropriate calibration, additional parameters such as the phase singularity movement direction provide additional information about the change the target undergoes (change of the target status).

Thus, the present invention provides a novel measurement technique according to which two-parameter (e.g. spectro-angular) interrogation (illumination) is applied to a target, and the phase of and optical response (reflected beam) is measured. This combination allows rapid detection of unique phase features that can be applied for exceptionally high optical sensitivity and resolution in detection in a cost effective and robust manner. While phase measurements are eventually based on intensity measurements, the phase signature obtained by the technique of the invention allows improved optical sensitivity, due to the physical phenomenon measured in the technique of the invention (a phase singularity), which cannot be observed by a simple intensity measurement.

In the simplest example, the phase singularity point (determined as described above) allows for using the respective wavelength and angle parameters for direct measure (model-based measure) of the refractive index of the target.

The so-measured phase singularity signature undergoes model-based processing using one or more models describing a relation between target parameter(s)/property(ies) and phase singularity signatures. The model parameters are varied to find a best fit between the measured phase singularity signature and the modeled data, and determine the required parameter(s) from the best fit condition.

Figure 8:
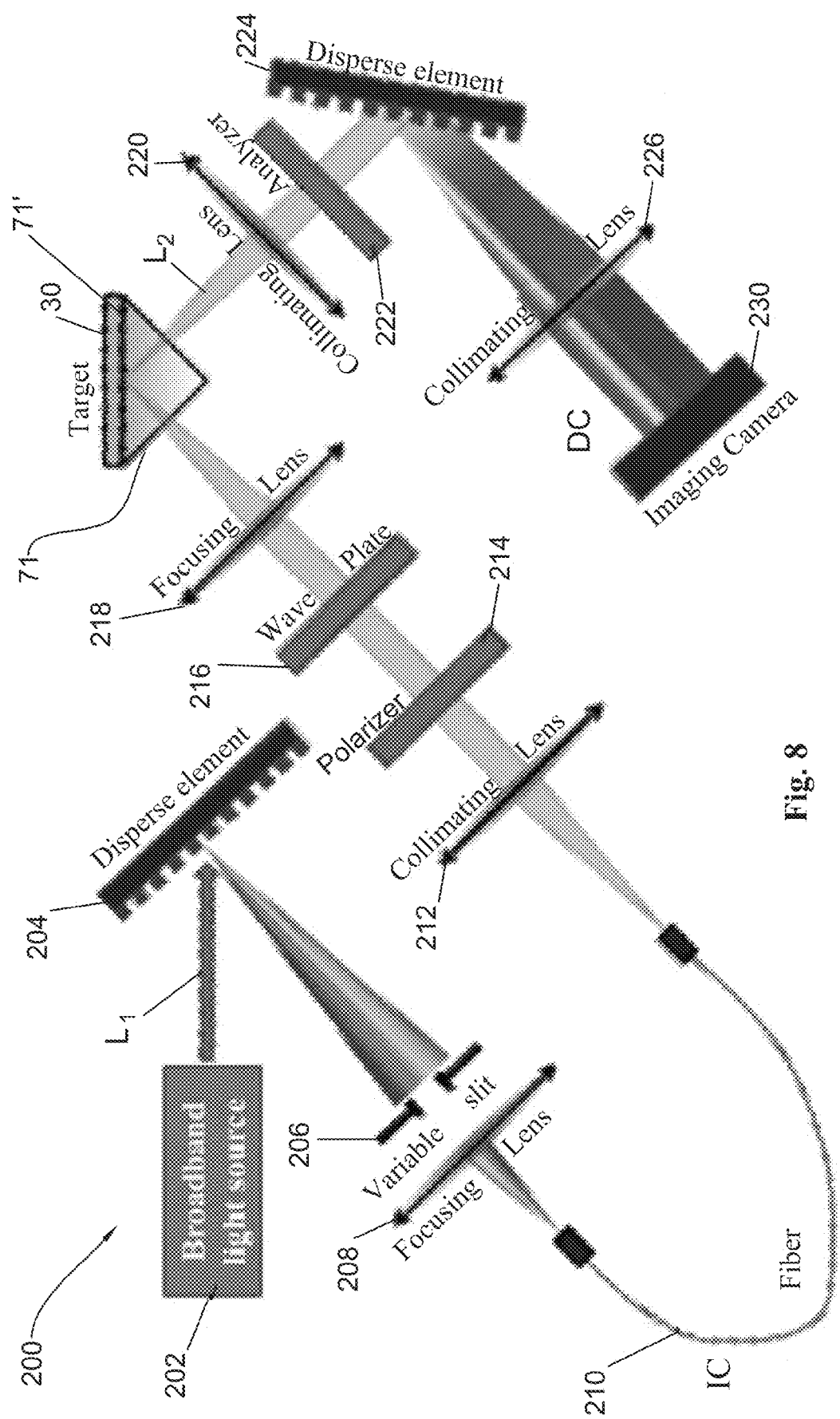
FIG. 8 is a schematic illustration of a measurement system according to the invention configured for implementing the measurement scheme of FIG. 2 and perform imaging of spectro-angular data on a pixel matrix in a single shot.

As indicated above, the invention also provides a novel measurement scheme for measuring the phase profile in the optical response of the target (reflected or transmitted light), simultaneously (with no scanning) for a range of illumination wavelengths and incidence angles (spectro-angular interrogation). In this connection, reference is made to FIG. 8 schematically illustrating an example of such measurement system 200.

The system includes a light source device 202 (e.g. Xenon lamp, or a white LED) to produce a light beam $L_1$ with a range of wavelengths. Generally, the light source device may include a broadband light emitter and appropriate spectral filter at the output thereof. Further provided in the system 200 is light directing optical arrangement configured for directing the light beam $L_1$ along the illumination channel IC and focusing the light beam onto a measurement spot in a measurement plane and directing light beam $L_2$ returned from the measurement spot along the detection channel DC to be imaged onto the pixel matrix 228 of a detector.

In this connection, it should be understood, and is already noted above, that for the purposes of the present invention, the spectro-angular phase measurements are characterized by the accessible range of wavelengths and angles (accessible spectro-angular range). An operational wavelength range of a light source used in the measurement system might limit the available wavelengths. Using a broadband light source (like Xenon lamp, having operational wavelength range of 200-2000 nm), the constraint typically comes from the wavelength range of a detector (camera) used in the system. For example, silicone CCD cameras have a 300-1100 nm wavelength range, which determines the accessible range of wavelengths for a system having other properly designed optical components (with a broad wavelength operation range).

The light directing optical arrangement includes a monochromator 204 (using either optical dispersion in a prism or diffraction using a diffraction grating) located downstream of the light source device (in a direction of illuminating light propagation through the system). The monochromator 204 spatially separates the light components of different wavelengths and spreads them around a predefined center wavelength, depending on the application. The monochromator typically has a mechanism for directing the selected wavelengths to a variable slit 206 that determines the interrogation/illumination wavelength range. The light directing optical arrangement also includes a polarization assembly configured to controllably vary polarization state of light in the illumination channel IC, and controllably vary polarization of the returned light in the detection channel DC to decompose varying polarization of the returned light into different polarization states, for example linear polarization.

More specifically, the light beam $L_1$ is focused by focusing optics 208 and coupled into a fiber 210, and subsequently coupled out by a collimation lens 212 at the fiber end. The collimated light beam then successively interacts (passes through) an automatic rotating polarizer 214, an automatic rotating waveplate 216, and a focusing lens 218. The latter focuses the so-produced polarized light beam onto the target 30. The target 30 may be a prism coated by a stratified configuration, a fabricated wafer, or any other target of interest. The scattered beam $L_2$ (reflected or transmitted) from the target then passes through a collimation lens 220 and an automatic rotating analyzer 222 and interacts with a dispersive element 224 (e.g., grating) which spatially separates different wavelengths in the beam $L_2$. The spatially separated light components pass through a collimation lens 226 and are imaged onto a pixel matrix/camera 230 (e.g., CCD, EMCCD) in a single shot.

It should also be understood that the accessible angle range is defined by the optical system design, and mainly depends on focusing and collimating lenses (218, 220) for a given target design 30, and also depends on the target design. For example, in the system configuration exemplified in FIG. 8, where the target is interrogated via a coupling prism 71, the accessible range of angles is centered around normal incidence to the entry short prism facets 71'. In such a geometry, the practically useful range is typically span ±20° around the normal to the short facet (thought it can be expanded by tight focusing lens 218).

Thus, the system 200 provides a two-dimensional intensity image (spectro-angular image data) on a camera in a single shot as a function of polarizer, waveplate, and analyzer orientations. As in standard ellipsometry, the phase can then be extracted from a set of a few intensity measurements at each pixel, rapidly providing an image of the phase over the two-dimensional spectro-angular space. Such spectro-angular optical phase acquisition device that simultaneously captures multi-angle and multi-wavelength information imprinted into the phase of diffracted light from a target, can provide unique acquisition speeds for spectro-angular data (as opposed to scanning techniques), and can make such measurements much more cost effective.

In the following, a unified modeling formalism for the measurement system and the properly designed target is more specifically described, allowing extraction from measured signals the target reflection amplitude and phase information in a two-dimensional parametric space. Although such unified modeling formalism for the measurement system and the properly designed target is described herein below for the spectro-angular parametric space, it should be understood that the principles of the invention are not limited to this parametric space, and the technique of the present invention applied to other types of parametric spaces will be exemplified further below.

The phase extraction in the context of the present invention actually refers to phase difference (variation) measurement. As the phase itself is practically not a physical measure, the phase difference is measurable, providing phase information with respect to some reference. For example, in interferometry two beams interfere to provide phase difference information between the two beams. On the other hand, the invention can utilize ellipsometry technique, in which phase difference information is extracted from reflectance information over two (typically) orthogonal polarizations.

Figure 9:
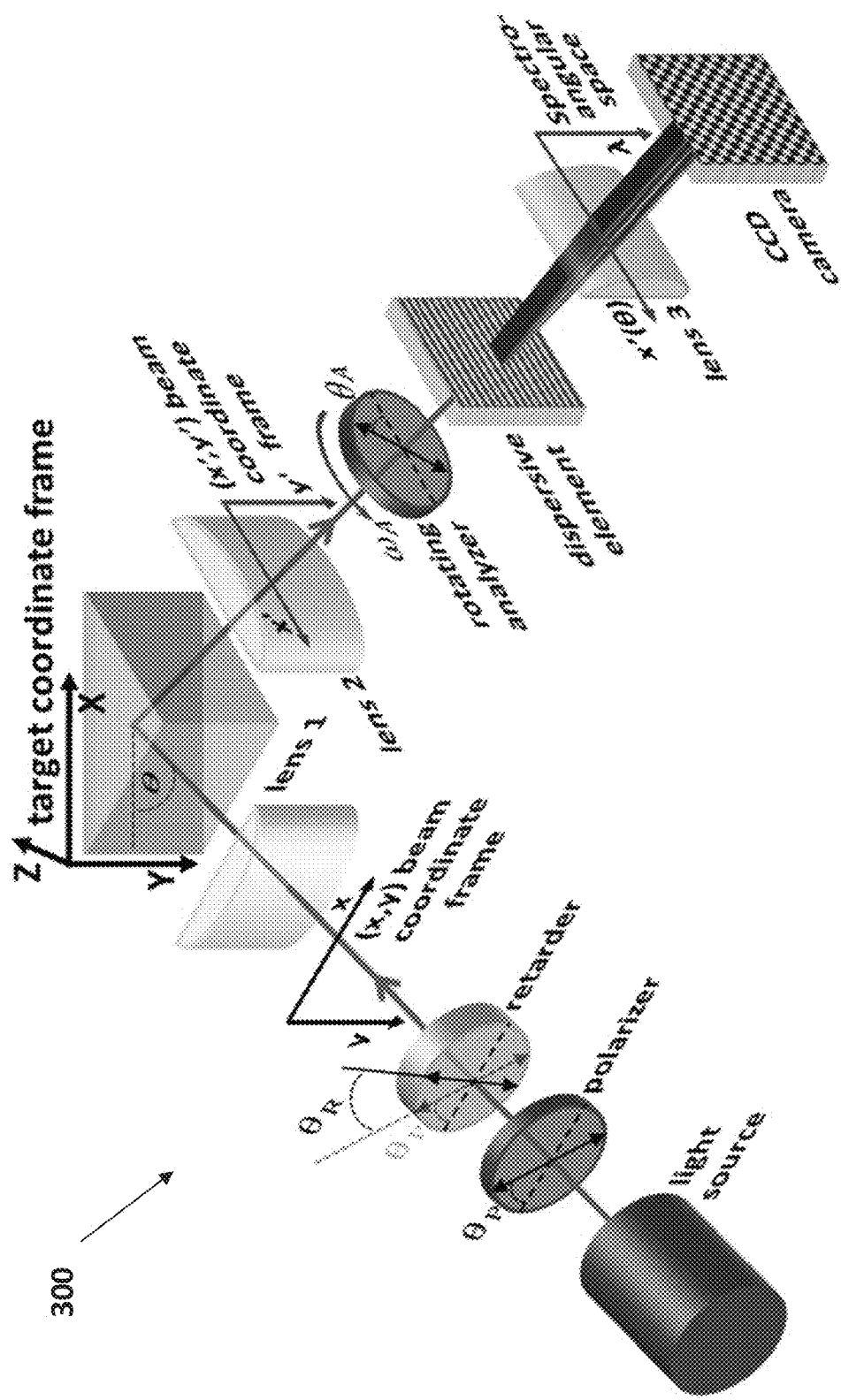
FIG. 9 is a specific example of the configuration of the measurement system used in the analysis of the system operation for extraction of phase singularity signature.

For the purposes of analysis of the operation of the above-described system configuration shown in FIG. 8, in this specific but not limiting example an assumption is made that the focusing lens 218 and the collimating lenses 220 and 226 are cylindrical lenses (optionally, designed to minimize aberrations). Referring to FIG. 9, there is shown an exemplary set (configuration) of the similar optical system, denoted 300, showing more specifically various features/parameters used in the analysis. More specifically, FIG. 9 illustrates the elements of the optical system 300 with coordinate frame and angle definitions used in the analysis. The arrangement of the optical elements and their functions are illustrated in the figure in a self-explanatory manner.

As shown in the figure, the plane of incidence is defined as X-Z plane of the target coordinate frame. In addition, it also contains x and x' axes of the incident and reflected beam coordinate frames, respectively. Lens 1 (or lenses), located in the illumination channel closer to the target, transforms the incident beam profile in x-direction to different interrogation angles, θ. Lens 2 (or lenses) located in the detection channel closer to the target, transforms back the different reflected angles into x'-beam coordinates. The dispersive element (for simplicity exemplified in FIG. 9 as a transmission element) and the following Lens 3, are aligned to, respectively, split spectrally and collimate the information in y'-direction only. Hence, the important interrogation angle (θ) information is not destroyed and additional direction is utilized to split spectrally the target response.

Polarizer in the illumination channel is assumed to be aligned at angle $\theta_p$ with respect to the plane of incidence, clock wise with respect to the beam flow. The Retarder (wave plate) is assumed to function as a perfect compensator (retarder with $\pi/2$ retardation) over the used range of wavelengths. The fast axis angle ($\theta_R$) of the wave plate is assumed to be under automatic control and is defined with respect to the polarizer orientation in the clock wise direction with respect to the beam flow. For simplicity, in the present analysis only two retarder orientations are considered, which provide for full phase extraction. The first retarder orientation leaves the polarization unchanged ($\theta_R=0$) and the second orientation changes the polarization to the circular polarization ($\theta_R=45$).

Rotating Analyzer in the detection channel is assumed to constantly rotate at frequency $\omega_A$ (clock wise with respect to beam flow direction), and its alternating angle $\theta_A$ is defined with respect to the plane of incidence.

In the schematic illustration in the figure, Light source encapsulates a system unit responsible for automatic selection of the required illumination wavelength range. It provides an unpolarized beam with overlapping different wavelengths (not spatially resolved). Going through the Polarizer in the illumination channel, illuminating light is polarized with a preferred plane of polarization oriented at an angle $\theta_p$ with respect to the plane of incidence. In terms of Jones matrix formalism, the polarization state of light after passing through (generally, interacting with) the polarizer is described by:

$$P = \begin{bmatrix} \cos(\theta_P) & -\sin(\theta_P) \\ \sin(\theta_P) & \cos(\theta_P) \end{bmatrix} \begin{bmatrix} 1 \\ 0 \end{bmatrix} \quad (3)$$

With regard to the operation of the Retarder, whose fast axis is at $\theta_R$, it can be described by the following Jones matrix (including rotation to the polarizer's coordinate frame and back):

$$R = \quad (4)$$
$$e^{-i\pi/4} \begin{bmatrix} \cos(\theta_P) & -\sin(\theta_P) \\ \sin(\theta_P) & \cos(\theta_P) \end{bmatrix} \begin{bmatrix} \cos^2(\theta_R) + i\sin^2(\theta_R) & (1-i)\cos(\theta_R)\sin(\theta_R) \\ (1-i)\cos(\theta_R)\sin(\theta_R) & i\cos^2(\theta_R) + \sin^2(\theta_R) \end{bmatrix}$$
$$\begin{bmatrix} \cos(\theta_P) & \sin(\theta_P) \\ -\sin(\theta_P) & \cos(\theta_P) \end{bmatrix}$$

The focusing system (Lens 1) and collimating (Lens 2, as well as the prism and the target, can all be represented as an effective target Jones matrix.

The illuminating beam profile before the focusing Lens 1 has two dimensions, one along the x-axis (which is in the plane of incidence) and the other along the y-axis which is normal to the plane of incidence. In this specific not limiting example, the cylindrical lenses (Lens 1 and Lens 2) transform only the in-plane-of-incidence beam direction, i.e. x-axis direction. The parameters of focusing Lens 1 and the coupling prism relate directly any x-point within the incident beam to a specific interrogation angle θ (by trigonometry and Fresnel formulas).

After reflection from the target, another cylindrical lens, Lens 2, transforms back the information diverging at different angles into the collimated beam with coordinates (x',y').

In this connection, it should be understood that three basic optical effects to be taken into account for transmission through the lenses and the prism, assuming the right-angle prism has refractive index $n_{prism}$ and optical axis normal to its entrance facet, include: Light bending by lens into different interrogation angles, which is represented by x=f tan(θ'), where f is the focus of Lens 2; transformation of interrogation angle before (θ') and after (θ) entering the prism sin(θ'−45)=$n_{prism}$ sin(θ−45); energy normalization for different interrogation angles 1/√cos(θ'−45). Also, a change of polarization by transmission through a lens or prism could also be taken into account. Such polarization corrections become especially important for high NA applications, and for simplicity, these polarization changes by lenses and prism are neglected in the present analysis.

Thus, each x-point within the beam profile before the Lens 1 (i.e. after passage of polarizer and retarder) is transformed into x'-point after the collimation Lens 2 by a single Jones matrix, denoted as T. It mainly represents the target reflection response, expressed as a function of incidence angle (related to x-coordinate) and wavelength (λ):

$$T_{(x,\lambda)} = \begin{bmatrix} r_{pp} & 0 \\ 0 & r_{ss} \end{bmatrix}_{(x,\lambda)}, \quad (4)$$

for an assumption of isotropic target and neglected polarization change due to either lens or prism.

Then, the response beam is going through the Rotating Analyzer (θ$_A$=ω$_A$t):

$$A = \begin{bmatrix} \cos(\theta_A) & -\sin(\theta_A) \\ \sin(\theta_A) & \cos(\theta_A) \end{bmatrix} \begin{bmatrix} 1 & 0 \\ 0 & 0 \end{bmatrix} \begin{bmatrix} \cos(\theta_A) & \sin(\theta_A) \\ -\sin(\theta_A) & \cos(\theta_A) \end{bmatrix}, \quad (5)$$

followed by the spectral beam splitting (by Disperse Element) over y' direction, while conserving the x' direction.

After the beam passage through the Disperse Element and collimating Lens 3, the y' axis transforms λ0 into axis, providing information over different wavelengths. The calibration of λ axis is subject to characteristics of the Disperse Element and collimating Lens 3. The electric field at (x',λ) point before a CCD camera (i.e. imaging plane where pixel matrix is located) is the multiplication of all the above Jones matrices:

$$E_{x',\lambda} = A \cdot T_{(x,\lambda)} \cdot R \cdot P, \quad (6)$$

Each pixel in the CCD camera collects signal with intensity I proportional to:

$$I_{x',\lambda} \propto |E_{x',\lambda}|^2. \quad (7)$$

Turning back to FIG. 3, illustrating the main steps in the method of the invention for monitoring the target status, the measured data from the target is processed, by the control system of the invention, to identify/determine phase singularity points or phase singularity signature and apply thereto a model-based fitting procedure to determine the property of the target or a change in the target property. Such measured data to be processed includes phase map data or phase-and-intensity map data in the accessible spectro-angular range. Such spectro-angular measured data may be obtained by the above-described optical system.

Figure 10:
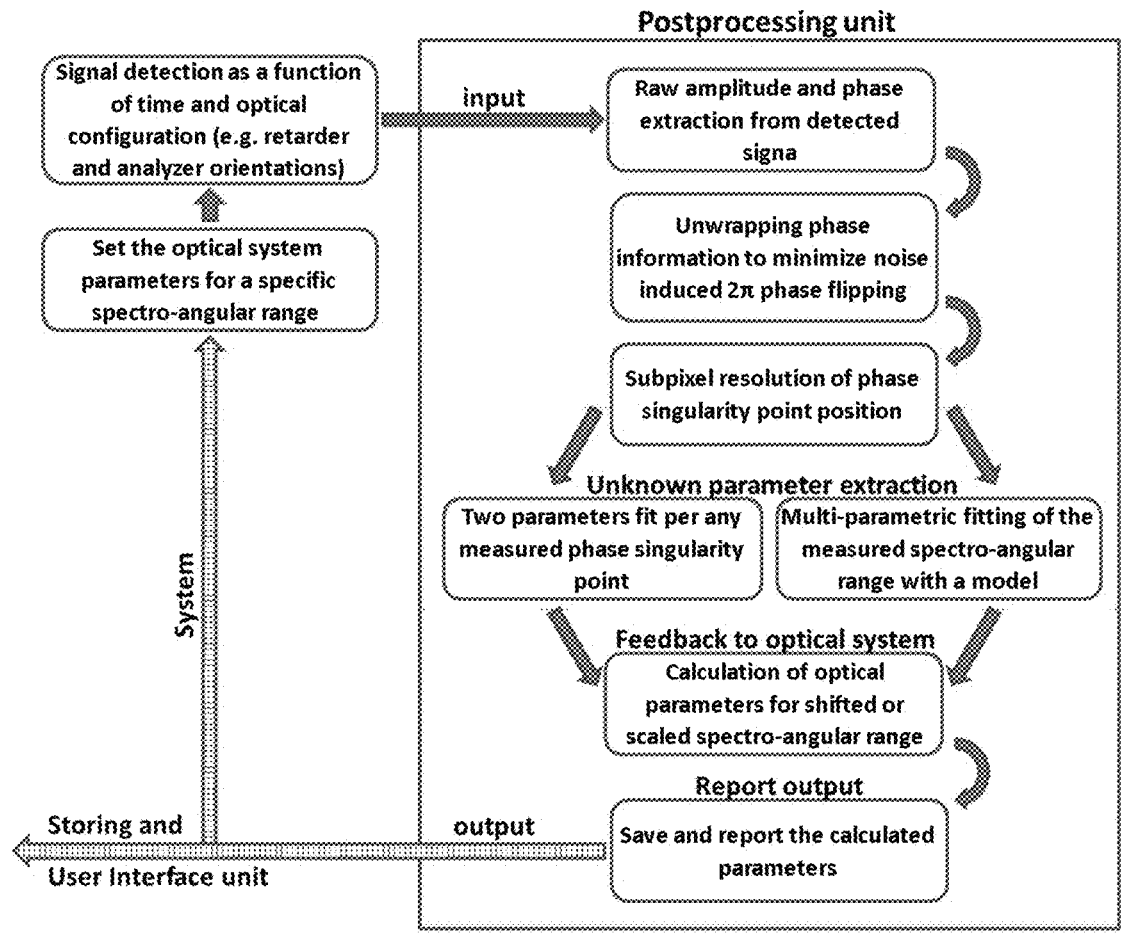
FIG. 10 is a flow diagram exemplifying the method of the invention for determining unknown parameter(s) of the target using the phase singularity approach of the invention.

Reference is now made to FIG. 10 showing a flow diagram of a specific but not limiting example of a method carried out by the control system of the present invention. In the present example, the method includes such steps as extraction of amplitude and phase from the measured (detected) light response of the target within the accessible spectro-angular range; unwrapping the phase data (optionally); phase singularity point/signature recognition (at a subpixel resolution); and extraction therefrom of one or more parameters of the target characterizing its status.

Thus, spectro-angular beam is imaged by a pixel matrix, providing, at each pixel, a time varying signal (indicative of the detected light intensity) as a function of the and optical configuration (i.e. continuously rotating analyzer). Then, this measured data is processed in raw processing stage for extraction of the amplitude and phase from the detected signals.

The intensity detected by every camera pixel can be represented as:

$$I_{x',\lambda}(\theta_A) \propto |E_{x',\lambda}|^2 = 1 + \alpha_{x',\lambda} \cos(2\theta_A) + \beta_{x',\lambda} \sin(2\theta_A). \quad (8)$$

Fourier analyses of the recorded in time intensity provides coefficients $\alpha_{x',\lambda}$ and $\beta_{x',\lambda}$ which are linked to the complex parameter $\rho = \tan(\psi)e^{i\Delta} = r_{pp}/r_{ss}$, by Eqs. (7) and (8) above.

The full phase extraction requires at least two retarder positions. For the retarder aligned at θ$_R$=0, the ρ parameter is extracted from:

$$\tan(\psi_{x',\lambda}) = \sqrt{1 + \alpha_{x',\lambda}/1 - \alpha_{x',\lambda}} \tan(\theta_P) \quad (9)$$

$$\cos(\Delta_{x',\lambda}) = \frac{\beta_{x',\lambda}}{\sqrt{1 - \alpha_{x',\lambda}}} \frac{\tan(\theta_P)}{|\tan(\theta_P)|}.$$

For an additional retarder position, aligned at θ$_R$=45 degrees, the ρ parameter is extracted from:

$$\tan(\psi_{x',\lambda}) = \sqrt{1 + \alpha_{x',\lambda}/1 - \alpha_{x',\lambda}} \quad (10)$$

$$\sin(\Delta_{x',\lambda}) = \frac{\beta_{x',\lambda}}{\sqrt{1 - \alpha_{x',\lambda}}}.$$

The combination of two retarder positions allows full phase $\Delta_{x',\lambda}$ extraction, and therefore complete value of $\rho_{x',\lambda}$ (both Eqs. (9) and (10) required for full phase extraction in the range of [0, 2π]).

Then, optionally, the phase information undergoes unwrapping to minimize noise induced by 2π flipping, as described above. The extraction process allows acquisition of complex function $\rho_{x',\lambda}$ over a spectro-angular range. If this range includes a phase singularity point, the function $\rho_{x',\lambda}$ experiences a smooth amplitude and discontinued phase features. The discontinuities in phase is a result of the effect of 2π phase accumulation(s) around a phase singularity point in spectro-angular space. A line or a line segment across which the phase abruptly changes from zero to 2π defines a branch cut, projecting multivalued phase into [0, 2π] phase range. In the measured phase data, the pixels close to a branch cut experiences high phase noise, due to experimental errors accidentally flipping the measured phase value from zero to 2π and vice versa. This problem is typically solved by an unwrapping algorithm. Generally, unwrapping algorithms are known, e.g. *Phase Unwrapping Algorithms: A Comparison*", Antonio Baldi et al., Department of Mechanical Engineering, University of Cagliari, Italy; Interferometry in Speckle Light; Springer-Verlag Berlin Heidelberg 2000.

The following is an example of such an algorithm developed by the inventors, based on physical understanding of the problem. In this example, the slab geometry of the target configuration is considered. The inventors used Lorentzian fitting of a phase branch cut.

Analytical study of the geometry provides a simple parametric curve, describing the line or line segment of the phase branch cut. For a gold slab geometry, similar to analysis described above with reference to FIGS. 6a-6f, the branch cut for [0, 2π] phase range is fitted well with a modified Lorentzian function having only four parameters [a, b, c, d]:

$$\lambda(k_x) = a\frac{b}{(k_x - c)^2 + b^2} + d \quad (11)$$

It should be understood that the well fit condition means that the curve fits the phase brunch cut with accuracy at least 10 times higher when experimentally sampled spectro-angular space (0.1 of the pixel size).

The region of branch cut in a measured phase data can be recognized by the function looking for difference between the examined point and its nearest neighbors:

$$w(k_x,\lambda) = \Sigma_{n=1}^{8} |\phi(k_x,\lambda) - \phi(k_x,\lambda,n)| \quad (12)$$

wherein n runs over the nearest neighbors of the data point $(k_x,\lambda)$. The points near the branch cut has larger $w(k_x,\lambda)$ values, as the phase jumps there 2π. By setting a threshold (e.g., threshold equals to 2π), which is subject to the system noise level, the points near the branch cut are detected.

The detected near branch cut points are fitted with Eq. (11) above, providing the edge where the phase jumps 2π. Therefore, point with incorrect phase at both sides of the fitted Lorentzian function can be corrected.

Then, the data processing proceeds to locating (in the spectro-angular space) the phase singularity position(s) at the sub-pixel resolution. The precision at which a phase singularity point position is determined defines the basic sensitivity limit of the method. Therefore, its position determination with highest possible precision is required. The following are some examples of possible algorithms for subpixel resolution of a phase singularity point.

One example utilizes/is based on the known algorithm described in the following publication: "*Optical vortex metrology for nanometric speckle displacement measurement*", Wei Wang et al., Optics Express, Vol. 14, Issue 1, pp. 120-127 (2006). This example advantageously does not require preliminary phase unwrapping; however might require more than six fitting parameters for a spectro-angular range, as wide as 2 nm in wavelength, and 0.02° in incident angle θ.

According to this example, first, the complex function $\rho_{x',\lambda}$ near a phase singularity point is split into real $\Re\{\rho_{x',\lambda}\}$ and imaginary $\Im\{\rho_{x',\lambda}\}$ parts. When, each real valued function, $\Re\{\rho_{x',\lambda}\}$ and $\Im\{\rho_{x',\lambda}\}$ is fitted to a plane (6 fitting parameters):

$$\Re\{\rho_{x',\lambda}\} = a_1 x' + a_2 \lambda + a_3$$

$$\Im\{\rho_{x',\lambda}\} = b_1 x' + b_2 \lambda + b_3 \quad (13)$$

The phase singularity point is found from condition of amplitude zero $\rho_{x',\lambda} = 0$:

$$\Re\{\rho_{x',\lambda}\} = 0 = \Im\{\rho_{x',\lambda}\} \quad (14)$$

It should be noted that, if the spectro-angular range is wide (e.g. 2 nm and 0.02°), fitting to higher polynomials with more fitting parameters may be used.

According to another example, approximation of the measured phase $\Delta_{x',\lambda}$ by generalized helicoid function may be utilized. This technique advantageously requires only 5 fitting parameters for the range as wide as 2 nm in wavelength and 0.02° in incident angle θ; however it might require more complex fitting due to nonlinear fitting function with potential multiple local minima. According to this technique, the parametric equations relating the measured phase $\Delta_{x',\lambda}$ near a phase singularity point and the approximate generalized helicoid function $\vec{H}(r,\theta)$ are:

$$\vec{H}(r,\theta) = \begin{pmatrix} x' - x'_0 \\ \lambda - \lambda_0 \\ \Delta_{x',\lambda}^{model} \end{pmatrix}(r,\theta) = \quad (15)$$

$$\begin{pmatrix} r \cdot a \cdot \cos(\varphi)\sin(\theta - \theta_0) - r \cdot b \cdot \sin(\varphi)\cos(\theta - \theta_0) \\ r \cdot a \cdot \sin(\varphi)\sin(\theta - \theta_0) + r \cdot b \cdot \cos(\phi)\cos(\theta - \theta_0) \\ n\theta \end{pmatrix}$$

wherein n is the charge of the phase singularity point, φ is the rotation of the elliptical squeezing, a and b are the elliptical squeezing parameters, $\theta_0$ is the phase shift defining the branch cut starting orientation, the coordinates $\lambda_0$ and $x'_0$ describing the position of the phase singularity point.

Therefore, a possible fitting is between the measured phase $\Delta_{x',\lambda}$ and the parameter dependent function $\Delta_{x',\lambda}^{model}$:

$$\Delta_{x',\lambda}^{model} = n\tan^{-1}\left(\frac{(x' - x'_0)\cos(\varphi) + (\lambda - \lambda_0)\sin(\varphi)}{-(x' - x'_0)\sin(\varphi) + (\lambda - \lambda_0)\cos(\varphi)} c\right) + \theta_0 n \quad (16)$$

where the parameters c (equal to the ratio b/a), $\theta_0$, φ, $\lambda_0$ and $x'_0$ are the typical five fitting parameters and n is usually known in advance.

The fitting is performed by any known suitable regression methods, e.g. Levenberg-Marquardt algorithm.

Upon recognizing the phase singularity point(s)/signature, this data is used to extract one or more unknown parameters characterizing the target status. This process of extracting unknown parameter from a measured signal is based on their mutual relation.

More specifically, let us consider the use of the invention in an SPR-biosensing application, where typically only few parameters are unknown. In such a case, phase singularity point location(s) are beneficial as measurable(s) used for fitting. Every such location provides enough information for fitting of up to two independent parameters. Therefore, in an example of determination of unknown concentration of a known analyte interacting with the target (i.e. a change in the environmental condition), a single phase singularity point measurement with highest possible sensitivity is selected.

As described above, for the process of phase singularity point position determination the output of those algorithms is used as the input to the unknown parameter fitting. The fitting procedure utilizes both the theoretical target model and system model to fit the measured phase singularity point position(s). In some cases, like simple slab geometry target configuration (as shown in the example of FIG. 6), an analytical expression can be used for unknown parameters extraction. Following Eq. (1) above, the relation between the measured phase singularity point position $(x'_0,\lambda_0)$ in TM polarization and the unknown effective refractive index $\varepsilon_3(\lambda_0)$ is:

$$\varepsilon_3(\lambda_0) = 0.5\left(Qk_0^2 \pm \sqrt{Q^2 k_0^4 - 4k_x^2 Q}\right), \tag{17}$$

$$Q(x_0', \lambda_0) = \left[\frac{\varepsilon_2(\lambda_0)}{2k_{z,2}(x_0', \lambda_0)}\left(1 - e^{-2ik_{z,2}(x_0', \lambda_0)d}\right)\right]^2,$$

wherein $k_x = k_0\sqrt{\varepsilon_1}\cos(\theta(x'))$ (FIG. 9 described above) is the wave vector component in the X direction, $k_{z,2}(x_0', \lambda_0) = \sqrt{k_0^2 \varepsilon_2(\lambda_0) - k_x^2(x_0')}$ is the wave vector component normal to the waveguide in gold layer, and the relation holds between the incident angle $\theta$ and the coordinate $x'$ $$\theta(x') = \sin^{-1}\left[\varepsilon_1^{-\frac{1}{2}}\sin\left(\tan^{-1}\left(\frac{x'}{f}\right) - \frac{\pi}{4}\right)\right] + \frac{\pi}{4}.$$

The value of the effective index $\varepsilon_3$ is close to the clean liquid permittivity (FIG. 6), providing a convenient selection rule for the correct root value in Eq. (17). The measured permittivity $\varepsilon_3$ value is subject to fitting with a model representing total refraction index of the solution as a function of a specific analyte concentration $\rho_A[\text{gr/L}]$. Typically, linear or quadratic polynomial fitting functions are suitable models for the total solution refractive index:

$$n_3(\rho_A) = n_{3,0} + A_1 \rho_A + A_2 \rho_A^2, \tag{18}$$

where $n_3(\rho_A) = \sqrt{\varepsilon_3(\rho_A)}$ and $n_{3,0} = \sqrt{\varepsilon_3(\rho_A = 0)}$ are the refractive indexes with and without analyte, $A_1$ and $A_1$ are parameters of the model known a priori. Therefore, determining the value of $\varepsilon_3$ provides the concentration of an analyte. If optical losses are present, an additional unknown parameter could be fitted with the single phase singularity point, such as temperature, utilizing polynomial model like in Eq. (18).

Another example of extraction of the unknown parameters from the measured spectro-angular data is to fit the entire measured region. The model for fitting encapsulates the system and target models, while some of the target parameters are floating parameters of the fitting process. Due to multiple data point, the fit can be done to more parameters, however their determination is expected to be limited as only the phase singularity point has extraordinary sensitivity.

Also, both of the above exemplified extraction procedures can be combined, which advantageously provides for using both sensitive multi-parameter fit and ultra-sensitive fit over limited set of parameters (up to two per phase singularity point).

As further shown in the figure, the so-detected phase singularity point(s) coordinate(s) can be used for optimization of spectro-angular sampling region, mainly relevant for systems allowing automatic spectro-angular sampling range selection. Not limiting examples of such optimization include shift and scaling (e.g. zoom-in or zoom-out) of the sampling spectro-angular range.

The technique of the invention thus provides for detecting and tracking directly excitable phase singularities, enabling to provide a measurable quantity which allows exceptionally high sensitivity and resolution. The invention can be used in a variety of applications requiring optical target characterization to obtain information about the target as well as use such optical target characterization to obtain information about a process/field applied to the target and/or environmental condition(s) in the vicinity of the target. Among others, these applications include optical metrology (patterned wafers), fast ellipsometry, real-time optical target monitoring, and SPR biosensing.

Considering optical metrology, or generally inspection/measurement techniques, the system of the present invention, including the measurement device and the monitoring system, may be used as an automatic optical inspection station for applying the phase singularity measurements to targets (samples) progressing on a production line, as well as a stand-alone inspection tool/station. Such an inspection/measurement system can be used for detecting, via identification of a change in the local refractive index, fluctuation of target parameters/properties, including both geometrical and material composition relating parameters.

As described above, one of the attractive applications of the technique of the present invention is in the field of bio-chemical sensors to detect one or more substances/analytes in a media being inspected. For this purpose, the target (its surface) is appropriately configured for interacting (chemically and/or physically binding) with a substance to be detected, and is subjected to the measurements described above. The target may be configured as a layered sensor chip. The measurement technique tracks a spectro-angular singularity in the phase of the light reflected from the target with ultra-high intrinsic optical sensitivity allowing, among other things, ligand-free biosensing. The sensor device may include multiple such targets (sensor chips), each configured for different binding interactions, thus allowing simultaneous detection of various foreign substances. The phase singularity tracking using the present invention provides exceptional sensitivity and resolution. It also facilitates to resolve specific and non-specific interactions, and neutralize temperature fluctuations, humidity changes, and other types of environmental noise. The technique of the invention can be used for real-time monitoring of analyte concentration at unique sensitivity (e.g., in protein expression levels in incubators).

As also described above, the present invention can be used in various applications, not limited to biosensing, and including among others ultra-sensitive thickness monitoring during layer deposited processes (e.g., in wafer fabrication), gas sensing for environmental safety, and far field fast ultra-sensitive ellipsometry for overlay measurements in optical metrology.

Figure 11:
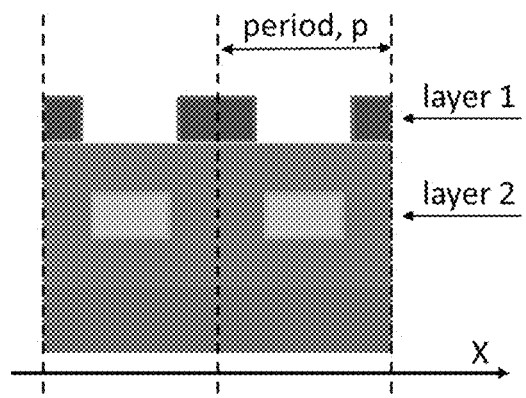
FIG. 11 exemplifies an overlay measurements target suitable to be subjected to the measurement technique of the invention in the overlay measurements.

Regarding the overlay measurement example, reference is made to FIG. 11, schematically illustrating an overlay target. The effect of having spectro-angular phase singularity points in some field component scattered from a target is common to planar waveguides and patterned planar waveguides. Such patterned structures (test structures) are widely used as overlay measurement targets in wafer optical metrology. The materials, order and number of layers in such targets are given by a manufacturer. The period and critical dimensions (CDs) of the patterns in both layers of interest (layer 1 and layer 2 in FIG. 11) are flexible and subject to appropriate design. Therefore, the flexibility of the patterning design allows to adjust the location of phase singularity points.

The period of patterning is playing a critical role as its momentum $2\pi/p$ in combination with incident wavevector is to match the wavevector of a Brewster mode, the field solution contributing to occurrence of phase singularity points. The grating momentum could be added or subtracted by integer multiples to the incident wavevector component in x-direction, though the efficiency of coupling to first diffraction orders is higher and preferable in an optimized design. The additional patterning critical parameters affecting the location of the phase singularity point without changing the grating momentum. Therefore, the design of the both period and other critical parameters provides sufficient degrees of freedom to adjust phase singularity point position and coupling to it, pending the available spectro-angular range of the measurement system is wide enough.

As a function of overlay between the layers of interest, layer 1 and layer 2 in FIG. 11, the entire waveguide structure is modified. The position of phase singularity point moves in the spectro-angular space accordingly, allowing ultra-sensitive overlay measurement by a proper modeling and fitting procedure. Due to unique coupling between the waveguide geometry and the position of phase singularity point, a single overlay target patterned in one direction provides one dimensional overlay information.

Additional sampling points and phase singularity points can be utilized for noise reduction, like symmetric and asymmetric process variations. The target is designed to make the diffraction order exhibiting spectro-angular phase singularity point available for measurement. It should be understood that such diffraction order could be zero and higher diffraction order. A non-limiting examples of making such diffraction orders available for measurement is by coupling prism contacted to wafer from the un-patterned back side.

The following is a specific not limiting example of the technique of the invention for spectro-angular phase singularity tracking (PST) in the critical dimension measurements. This example shows overlay critical dimension measurement with a one-dimensional overlay target.

The spectro-angular PST technique of the present invention can be utilized for critical dimension (CD) measurements in photolithography, as well as in other fabrication processes, and is advantageous especially when nanoscale precision and accuracy are required. The technique of the invention meets the increasingly stringent demands of current fabrication processes, which already deal with devices that reach nanoscale dimensions (e.g., memory, logic). In particular, the ability to monitor a device CD with nanoscale precision and accuracy is critical for production yield management.

An important example of such a CD is overlay, i.e. a lateral shift between patterned features within a single layer or between nearby layers, usually fabricated iteratively in a multi-step photolithography process. Generally, in order to infer the overlay between different layers, or between subsequently patterned features within the same layer (in multi-patterning photolithography), overlay targets are printed over the same structure (wafer). These overlay targets are designed to allow optimal extraction of the overlay between subsequent fabrication steps, and are divided into two main groups: imaging targets, and scatterometry targets.

In the present example, the PST is used for overlay measurements, and the target is a scatterometry target typical to front-end-of-line (FEOL) fabrication steps, where individual devices are patterned (as opposed to interconnects). These steps are especially demanding as they involve the smallest feature size.

Figure 12:
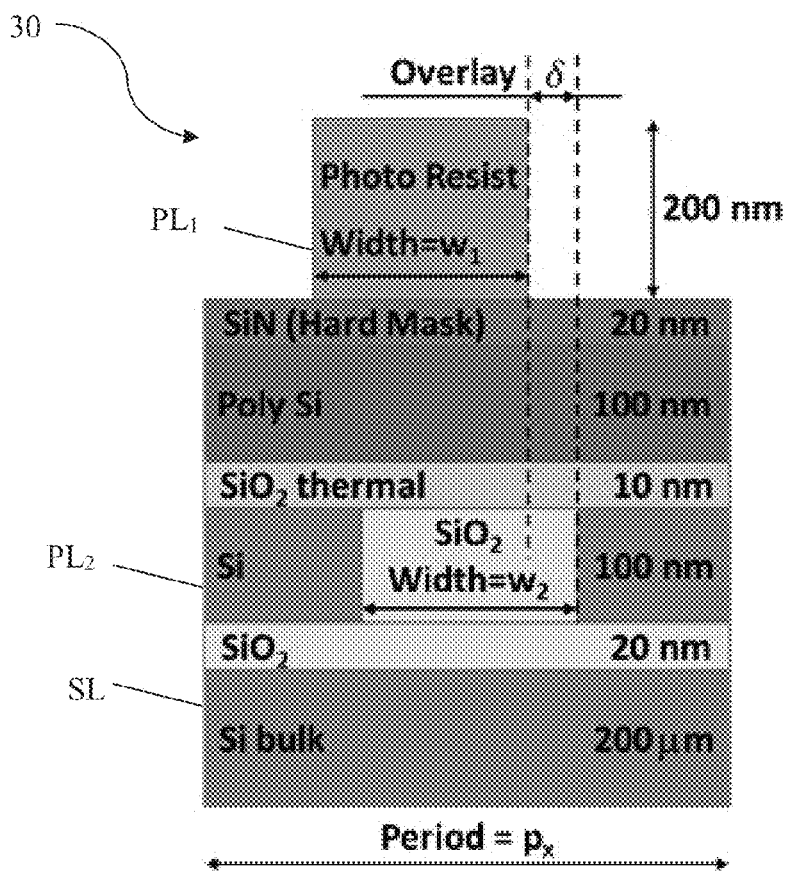
FIG. 12 schematically illustrates a unit cell of an exemplary grating-over-grating FEOL overlay target suitable to be used in the present invention.

FIG. 12 schematically illustrates a unit cell of an exemplary grating-over-grating FEOL overlay target 30. The target 30 has a substrate layer SL (silicon bulk) carrying a multi-layer structure on top thereof. The multi-layer structure includes a first patterned layer $PL_1$ being the top layer (photoresist) and a second patterned layer $PL_2$ (silicon) spaced from the substrate layer SL by $SiO_2$ layer. The patterned top layer $PL_1$ is in the form of an array of spaced-apart regions of photoresist material. The pattern in the second patterned layer $PL_2$ is in the form of spaced-apart Si-regions spaced by $SiO_2$-spacers. The materials and corresponding layer thicknesses in this specific example are indicated in the figure; the refractive indices of such materials are known. As shown, the patterns in the layers $PL_1$ and $PL_2$ have a certain overlay δ, i.e. a lateral shift between the features in the two patterns.

While in this specific not limiting example it is assumed a grating target that is periodic in one dimension, overlay scatterometry targets can also be periodic in two dimensions (typically with orthogonal unit cells). Scatterometry target design rules typically incorporate such parameters as a period ($p_x$), total size, designed overlay (δ), and feature widths ($w_1$ and $w_2$). It should be noted that in this example an infinite periodic target is assumed and therefore finite target effects are not considered. The target parameters are all subject to optimization based on the performance of the measurement technique.

Figure 13:
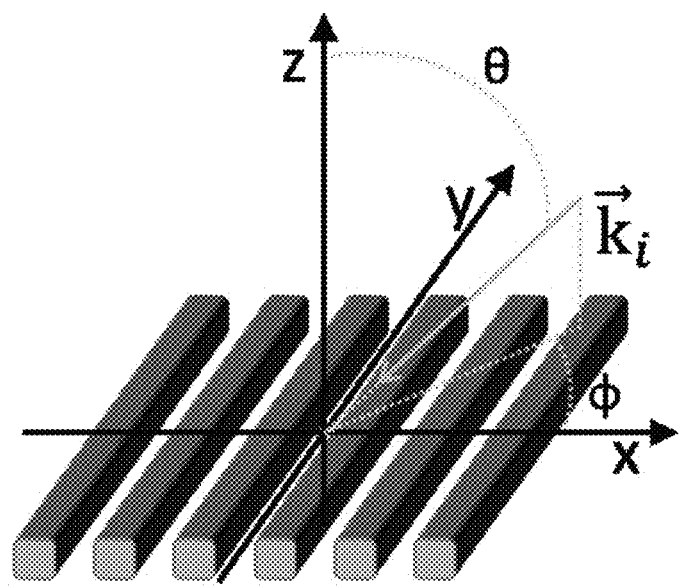
FIG. 13 schematically illustrates the principles underlying a measurement scheme for measuring on the target of FIG. 12.

Without loss of generality, a coordinate system is chosen such that the x-axis is aligned with one of the periodicity directions, whereas the layers comprising the target lie in the x-y plane. This is illustrated in FIG. 13. It is assumed that an incident plane wave with a wavevector $\vec{k}_i$ impinges upon the periodic overlay target 30. The incident wave is parameterized by the triplet (θ,φ,λ), where the azimuth angle φ and elevation angle θ describe the wavevector direction $\vec{k}_i$ in space, and the wavelength λ is related to the wavevector amplitude $|\vec{k}_i|=k=2\pi/\lambda$. The wave vectors of the plane waves refracted from the target are identified by two additional numbers, n and m, denoting the order of diffraction in each of the directions of target periodicity.

$$\vec{k}_{(\theta,\phi,\lambda,n,m)} = \hat{x}\left(k_i\sin(\theta)\cos(\phi)+n\frac{2\pi}{p_x}\right)+\hat{y}\left(k_i\sin(\theta)\sin(\phi)+m\frac{2\pi}{p_y}\right)+\hat{z}k_i\cos(\theta), \quad (199)$$

where $p_x$ and $p_y$ are the target periods in the x and y directions.

Generally, overlay measurements by scatterometry targets rely on light that is reflected into different diffraction orders (see Eq. 19). Usually, only the 0-th and/or 1-st diffraction orders are collected, as higher orders typically contain less light and become evanescent in free space. Nevertheless, the phase singularity phenomenon can be designed to occur in any diffraction order, including cases in which different diffraction orders are mixed and detected together. The phase singularity detection can be performed for both the reflected and transmitted orders. It should, however, be noted that detection using transmitted diffraction orders might require a measurement scheme with wavelengths larger than one micron to penetrate the substrate, which complicates the optical design and detection. Therefore, in the present example, phase singularity based overlay measurements using reflected diffraction orders are considered, which can be easily executed in the visible spectrum.

Although there are many possible configurations for phase singularity overlay measurements, in the present example the following two main schemes are considered: the measurement scheme based on collection/detection of only the 0-th reflected diffraction order, and the measurement scheme based on collection/detection of only the 1-st reflected diffraction order (i.e. orders +1 or −1 or both). The target periodicity and illumination pattern can be designed such that the 0-th and 1-st orders do not overlap in space, so that their collection can be done separately.

Figure 14:
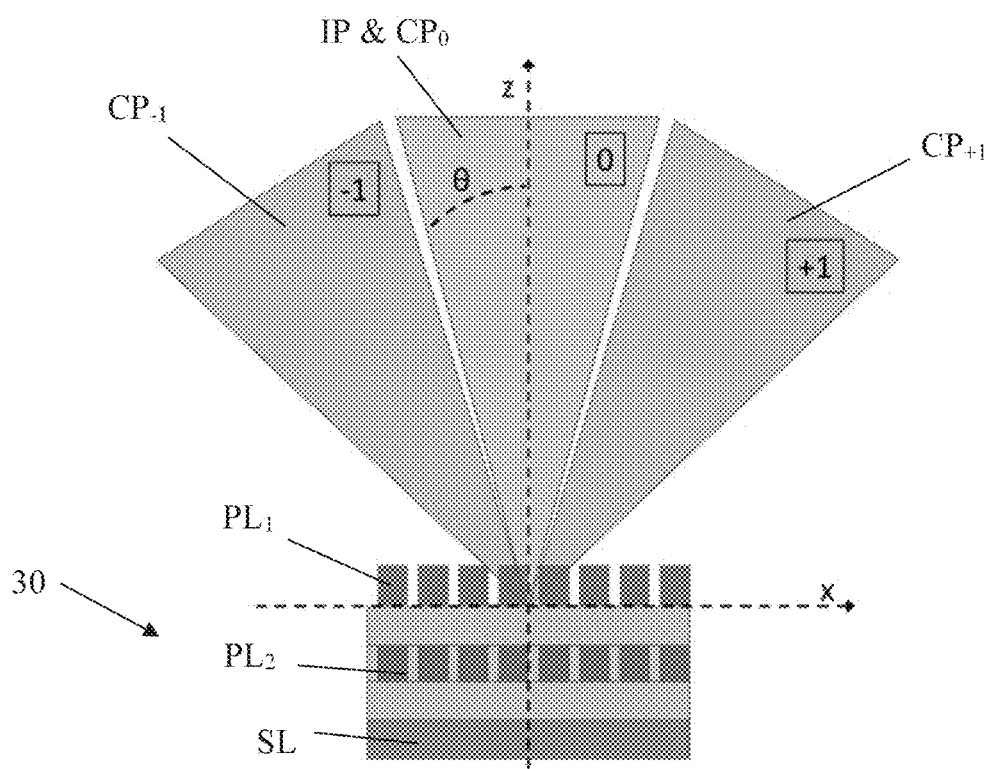
FIG. 14 schematically illustrates two possible measurement schemes suitable for phase singularity measurements in a one-dimensional (overlay) target having one direction of periodicity, based on collection/detection of the 0-th reflected diffraction order, and based on collection/detection of the 1-st reflected diffraction order (i.e. order +1 or −1 or both)

The measurement schemes are shown schematically in FIG. 14, illustrating the illumination and collection paths/channels of the one-dimensional overlay target 30 (having one direction of periodicity of the feature of a pattern) configured as shown in FIG. 12 (i.e. having two patterned layers $PL_1$ and $PL_2$, with a period of about 1 μm in the x-direction. The central cone indicates the target illumination path IP for incidence angles $0° \leq \theta \leq 15°$ and $\phi=0°$, 180°, as well as the reflected 0-th diffraction order collection path $CP_0$. Also shown are collection paths $CP_{+1}$ and $CP_{-1}$ of the two 1-st reflected diffraction orders, respectively, at a wavelength near 0.6 μm. The illumination and collection paths are designed to avoid overlapping of all three diffraction orders in space.

As noted above, the occurrence of the phase singularity phenomenon in the required diffraction order and spectro-angular range can be designed by properly optimizing the target parameters. It should also be noted that phase singularity detection can also be done in a similar fashion when multiple diffraction orders overlap in space and are measured together, as the total field exhibits a phase singularity if any of its constituent fields exhibits a phase singularity. The detection procedure of such a phase singularity is described below.

The illumination path IP shown in FIG. 14 samples the target 30 both spectrally and angularly. The angular range includes mainly a range of incident elevation angles (θ). The spectral interrogation can be done either in a scan mode by performing sequential measurements with different wavelengths, or in a 'single-shot' mode by simultaneous illumination with incident light including a pre-selected range of wavelengths. In order to obtain the spectro-angular information in the 'single shot' mode, the reflected/scattered orders are spectrally decomposed using a diffractive element (not shown here) to provide a two-dimensional spectro-angular map that can then be imaged on the sensing matrix of a detector for the phase singularity detection and tracking. In addition to the target optimization related to designing a phase singularity at a specific spectro-angular range, the illumination wavelengths and angles may also be optimized with respect to the best phase singularity tracking performance.

Generally, patterned targets (e.g., the target illustrated in FIG. 12) behave as anisotropic media. Hence, their response to plane wave illumination can be mathematically represented by a corresponding Jones matrix for any diffraction order (neglecting depolarization), which generally has non-zero diagonal and off-diagonal terms $$J_{(\theta,\phi,\lambda,n)} = \begin{bmatrix} r_{pp} & r_{sp} \\ r_{ps} & r_{ss} \end{bmatrix}, \quad (20)$$

For simplicity, it is assumed that the target is periodic only in the x direction (as illustrated in FIG. 13), otherwise the additional m index should appear.

When normalized by one of its components (typically $r_{ss}$), a Jones matrix remains with six independent parameters: three pairs of amplitude and phase values. The observation of phase singularity in an anisotropic target can be related to any of its Jones matrix elements, as well as to combination of them.

For example, considering a typical polarizer-compensator-sample-analyzer (PCSA) setup for a rotating analyzer ellipsometer, the measured signal (optical response) is proportional to $$I_{\theta,\phi,\lambda,n}(\theta_P,\theta_R,\theta_A) \propto 1 + \alpha_{\theta,\phi,\lambda,n}(\theta_P,\theta_R)\cos(2\theta_A) + \beta_{\theta,\phi,\lambda,n}(\theta_P,\theta_R)\sin(2\theta_A) \quad (21)$$

where $\theta_P$, $\theta_A$ are the corresponding orientation angles of the polarizer and analyzer with respect to the plane of incidence, and $\theta_R$ is the fast axis orientation angle of the compensator with respect to the polarizer orientation angle. It is assumed that the compensator has a constant retardation.

The coefficients α and β can be represented as:

$$\alpha_{\theta,\phi,\lambda,n} = \frac{\rho_g \rho_g^* - 1}{\rho_g \rho_g^* + 1}, \quad \beta_{\theta,\phi,\lambda,n} = \frac{\rho_g + \rho_g^*}{\rho_g \rho_g^* + 1}, \quad (22)$$

where $\rho_g$ is a generalized ellipsometry parameter corresponding to the complex number combining the target reflection response and the illumination-path optics configuration $$\rho_g(\theta_P, \theta_R) = \frac{a}{b} = \frac{f(\theta_P, \theta_R) \cdot r_{pp} + h(\theta_P, \theta_R) \cdot r_{sp}}{f(\theta_P, \theta_R) \cdot r_{ps} + h(\theta_P, \theta_R) \cdot r_{ss}}, \quad (23)$$

$$\begin{pmatrix} a \\ b \end{pmatrix} = J_{(\theta,\phi,\lambda,n)} \cdot \begin{pmatrix} f(\theta_P, \theta_R) \\ h(\theta_P, \theta_R) \end{pmatrix}$$

where $f(\theta_P,\theta_R)$ and $h(\theta_P,\theta_R)$ describe the light impinging on the target, which depends on the light source, and the orientation of the polarizer and compensator, a and b represent the state of light after reflection from the target, where such reflection is described by the appropriate Jones matrix $I_{(\theta,\phi,\lambda,n)}$. For a quarter-wave compensator the functions $f(\theta_P,\theta_R)$ and $h(\theta_P,\theta_R)$ are given by $$\begin{pmatrix} f(\theta_P, \theta_R) \\ h(\theta_P, \theta_R) \end{pmatrix} = R \cdot P, \quad (24)$$

where R and P are defined in Eqs. (3) and (4) as the Jones matrices of the compensator and polarizer, respectively.

In the simple case of an isotropic target, the generalized ellipsometry parameter $\rho_g$ is proportional to the above-described parameter ρ (describing a ratio between TM and TE reflection coefficients), and their relation becomes further simplified when the compensator is oriented in the direction of the polarizer ($\theta_R=0$):

$$\rho_g(\theta_P, \theta_R) = \rho \cdot \frac{f(\theta_P, \theta_R)}{h(\theta_P, \theta_R)} \bigg|_{\theta_R=0} = \rho \cdot \cot(\theta_P) = \tan(\Psi) \cdot e^{i\Delta} \cdot \cot(\theta_P). \quad (25)$$

where Ψ and Δ are the standard amplitude and phase ellipsometry parameters, respectively.

In principle, in this example in the general case relating to Eq. (23), PST can be performed over the phase extracted from many possible variations of the parameter $\rho_g(\theta_P,\theta_R)$, each measured at different polarizer and compensator orientations, including but not limited to those combinations required to extract any one or all of the Jones matrix elements. It should be noted that the combination of Jones matrix elements in $\rho_g(\theta_P,\theta_R)$ needs not be the same across the interrogated spectro-angular range. Preferably, measurements are performed for evaluation of a single complex number $\rho_g(\theta_P,\theta_R)$ with its full phase, as it would require to perform measurements for less orientations of the polarizer and compensator, provided that $\rho_g$ exhibits a phase singularity at those settings in the spectro-angular range being interrogated. More complex measurement schemes may require multiple successive measurements at different compensator and polarizer orientations.

In a simple configuration of the example of FIGS. 12-14, the off-diagonal terms of the Jones matrix in all diffraction orders are zero for two azimuth angles φ=0°, 180° because of translation invariance of the target in the y-direction. Hence, it is sufficient to analyze the diagonal elements $r_{pp}$ and $r_{ss}$ whose ratio is measured in a standard ellipsometry measurement of ρ.

The corresponding simulation results are shown in FIGS. 15a-f for $r_{pp}$ in the FEOL target of FIG. 12, designed to exhibit a pair of phase singularity points/signatures in the +1 and −1 reflected diffraction orders in the spectro-angular range for which those diffraction orders do not spatially overlap. In this example, the overlay feature describes the process variation overlay δ, and not a pre-designed overlay of the target. Hence, the overlay δ between the patterns in the two patterned layers $PL_1$ an $PL_2$ of the target 30 is determined by tracking the location of the phase singularity signatures in the spectro-angular domain.

Figure 15A:
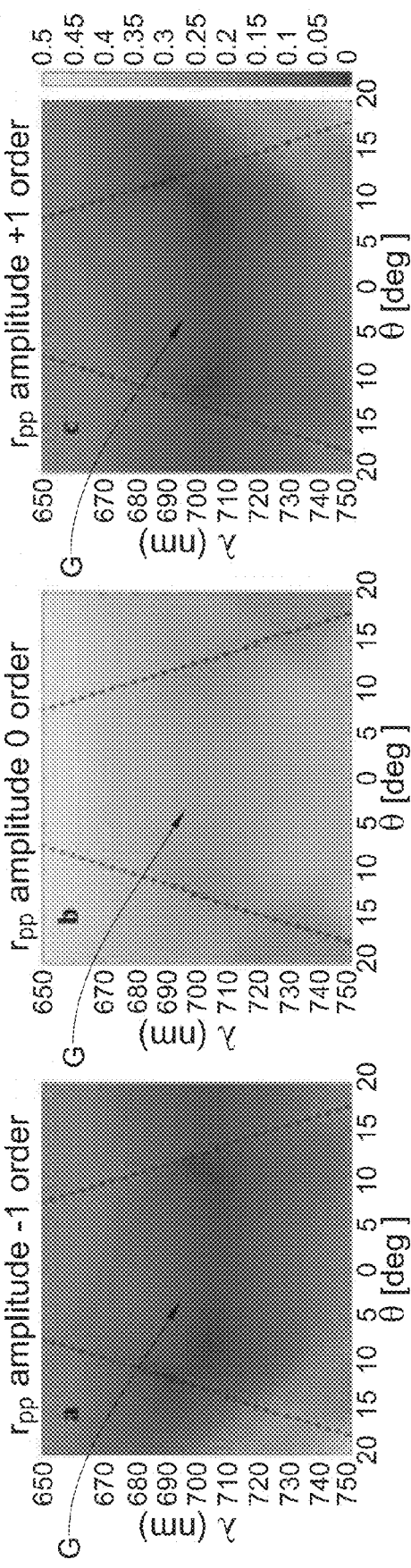
Figure 15B:
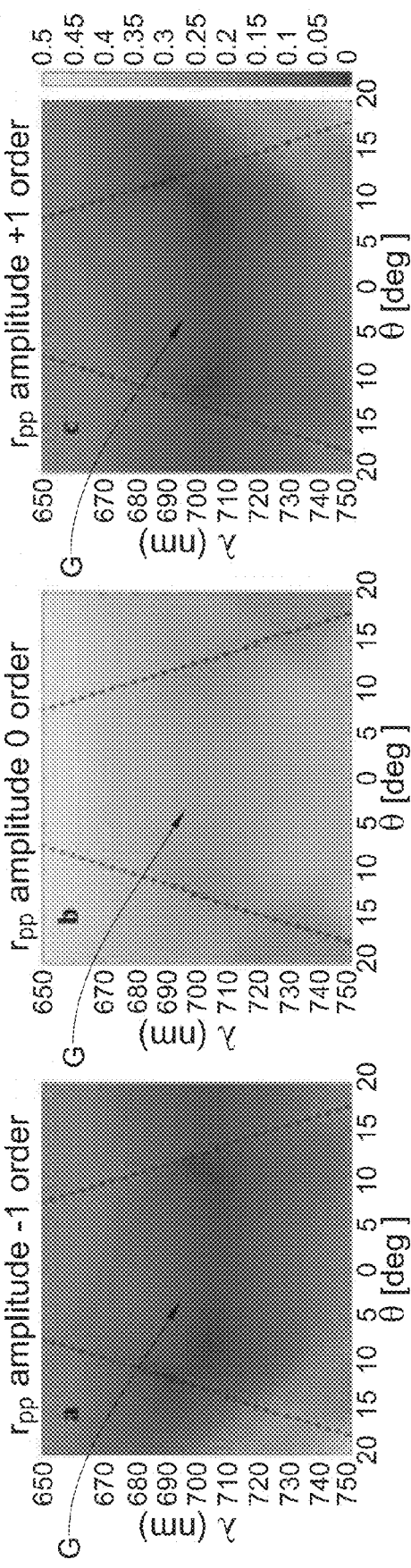
Figure 15C:
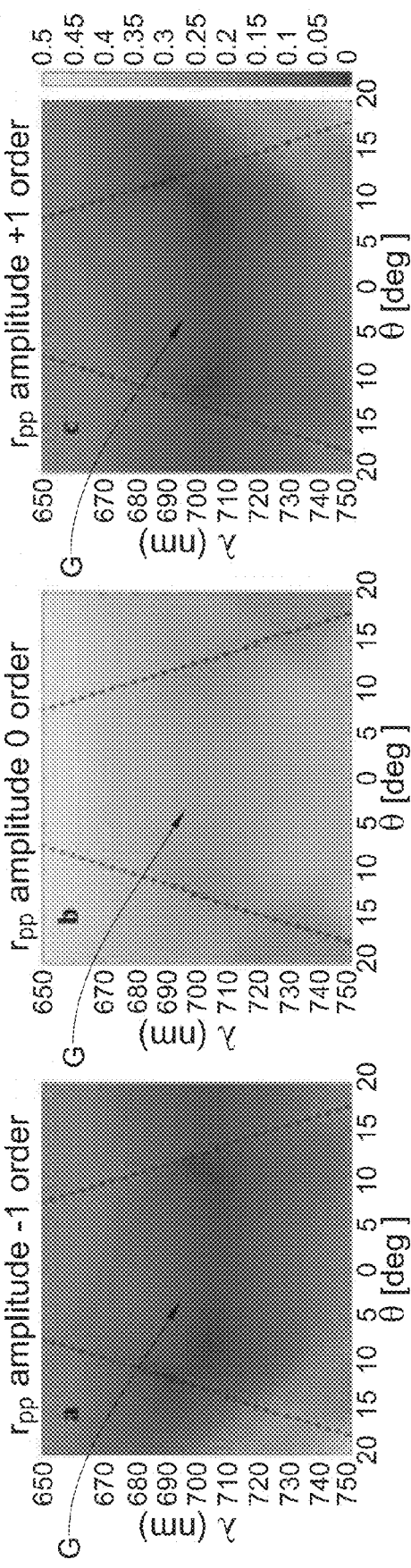
Figure 15D:
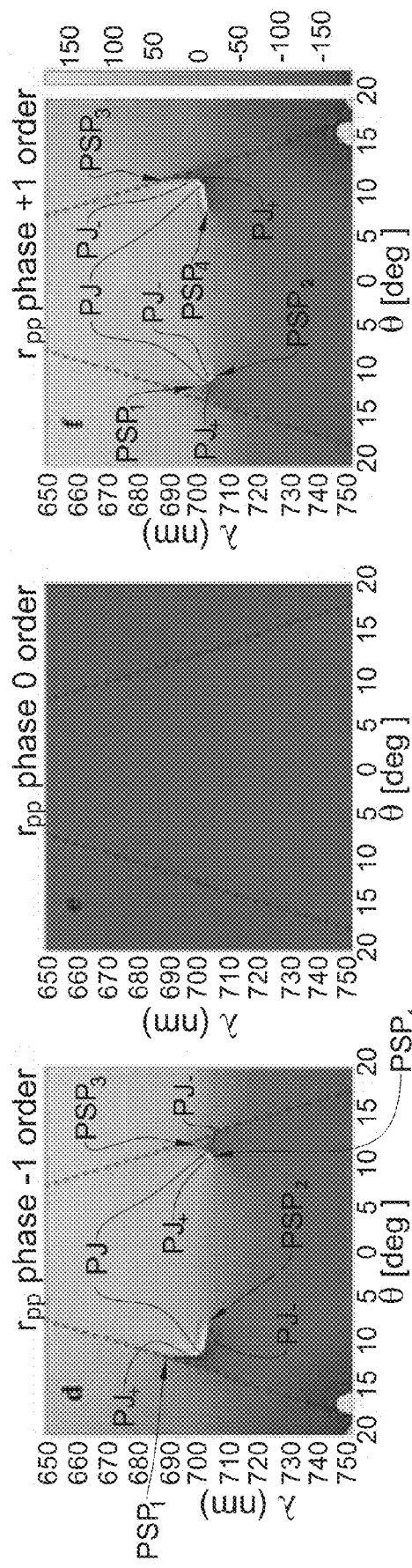
Figure 15E:
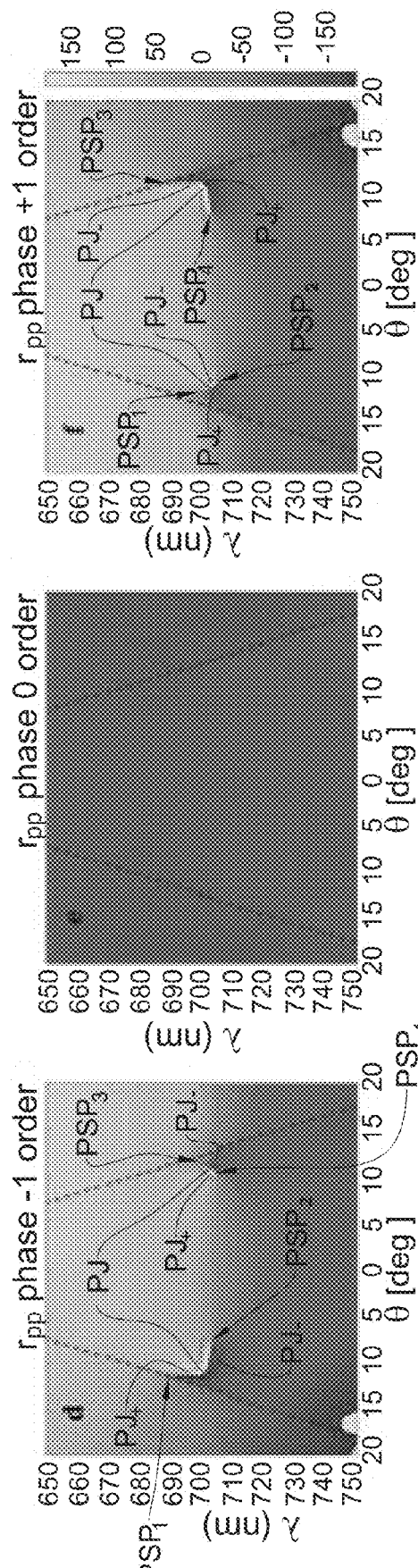
Figure 15F:
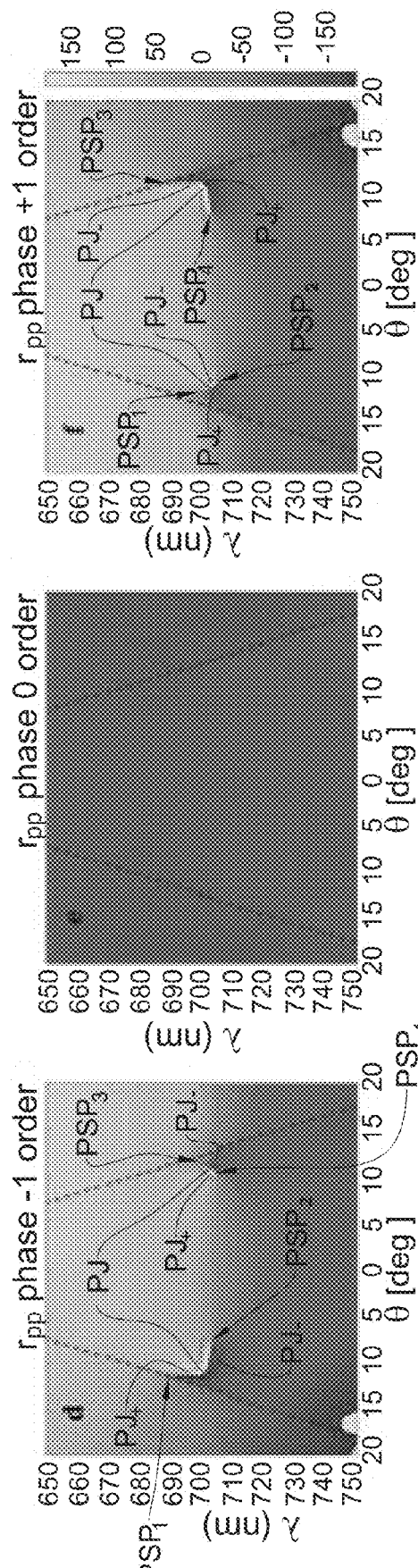
Figure 18A:
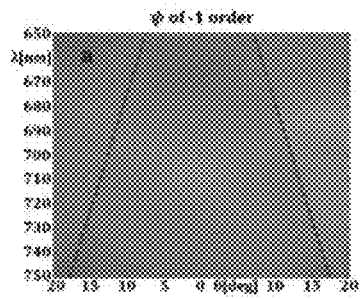
Figure 18B:
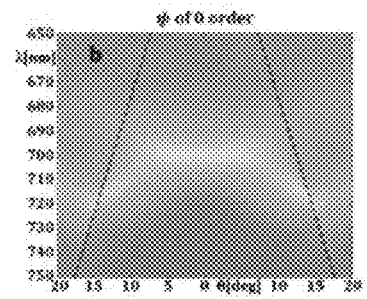
Figure 18C:
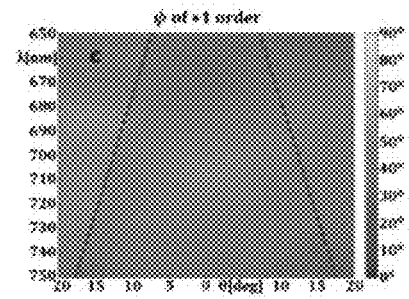
Figure 18D:
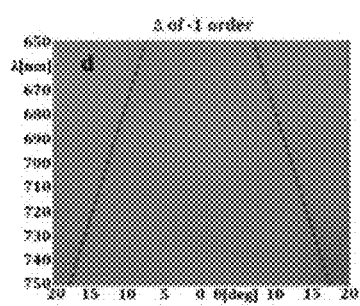
Figure 18E:
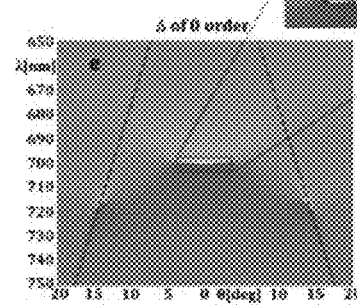
Figure 18F:
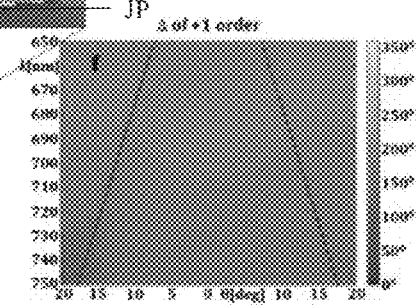

FIGS. 15a-c show the simulated amplitude, and FIGS. 15d-f show simulated phase of the Jones matrix element $r_{pp}$ of the target for the reflected diffraction orders −1 (FIGS. 15a,d), 0 (FIGS. 15b,e), and +1 (FIGS. 15c,f). In the figures, the horizontal axis is the elevation angle θ of the incident wave at the two azimuth angles φ=0°, 180°, and the vertical axis is the illumination wavelength. The phase plots of FIGS. 15d,f show the existence of two pairs of spectro-angular phase singularity points $PSP_1$-$PSP_2$ and $PSP_3$-$PSP_4$ designed to occur in each of the ±1 diffraction orders. These phase singularity pairs are accessible to measurement with standard far-field optics. The dashed lines define the regions (cones), generally designated G, within which the illumination and collection paths entirely avoid spatial overlapping between the different diffraction orders. As shown in FIGS. 15d,f, the phase singularity points of each pair are connected by a curve, generally designated PJ, of an abrupt 2π phase jump, that represents a branch cut in the phase. As a function of overlay, the pairs of phase singularity points move in the spectro-angular domain, and the change in their location is visually indicated by the change in the location of this branch cut PJ, designated in dotted curves $PJ_+$ for δ=+10 nm and $PJ_-$ for δ=−10 nm. The simulated intrinsic spectral and angular sensitivities derived from tracking the location of any one of these four phase singularity points $PSP_1$ to $PSP_4$ as a function of overlay δ (lateral shift between the pattern features in the two patterned layers) is up to $$\frac{\Delta\lambda}{\delta} = \frac{0.3\ nm}{1\ nm} \text{ and } \frac{\Delta\theta}{\delta} = \frac{0.08°}{1\ nm},$$

respectively.

Thus, the simulations presented in FIGS. 15(a-f) demonstrate overlay detection with spectral and angular sensitivities of $$\frac{\Delta\lambda}{\delta} = \frac{0.3\ nm}{1\ nm} \text{ and } \frac{\Delta\theta}{\delta} = \frac{0.08°}{1\ nm},$$

respectively. This high sensitivity can be further increased by tracking the positions of any two phase singularity points relative to one another (relative measurement mainly refers to the same phase singularity point in +1 and −1 orders). Considering a mechanical angular step size of 0.01°, which is commonly achieved in high-end ellipsometers, the expected mechanically-limited overlay resolution of this overlay target is roughly 0.1 nm. An additional increase in resolution can be attained by using algorithmic sub-pixel (super-resolution) phase singularity detection methods on the measured spectro-angular phase maps.

The use of the PST technology of the invention for overlay measurement advantageously provides for saving precious wafer space. This is because the PST of the present invention can obtain the overlay from just one target, rather than requiring multiple targets with varying pre-designed overlays as commonly used today. For example, this can be done by tracking the phase singularity signatures in the first diffraction order for the target exemplified in FIG. 12.

More specifically, in FIGS. 15(d,f) the phase maps are plotted for zero overlay (i.e. curve PJ of the abrupt 2π phase jump corresponds to δ=0 case), and therefore the phase singularity signature locations are symmetric in the +1 and −1 diffraction orders. For a non-zero overlay, e.g. overlay of +10 nm, the phase singularity signatures move and develop an asymmetry in their locations in the phase maps, as illustrated by the dotted curves $PJ_+$ in FIGS. 15 (d,f). The phase singularity movement in both ±1 diffraction orders ($PJ_+$ and/or $PJ_-$) can therefore be used not only to derive the magnitude of overlay but also the sign (direction of lateral shift). Hence, through modelling of the phase singularity location as a function of overlay, a single target can be used to detect the overlay (including its sign) with high sensitivity.

Referring to FIGS. 16a-f, there is shown, in a self-explanatory manner, the simulated output of an experimental measurement of the standard ellipsometry parameter ρ for the exact same case of FIGS. 15a-f. FIGS. 16a-f show amplitude and phase plots similar to those of FIGS. 15a-f, but plotted for the measurable amplitude (Ψ) and phase (Δ) ellipsometry parameters, instead of the Jones matrix element $r_{pp}$, which are related by $\rho = \tan(\Psi) \cdot e^{i\Delta} = r_{pp}/r_{ss}$.

In an additional case, the overlay can be detected by tracking phase singularity signatures in the 0-th diffraction order. PST in the zero-th order has the advantage of higher signal around the phase singularity points, and more convenient measurement scheme (e.g. illumination and collection path configurations). Nevertheless, the sensitivity of phase singularity signatures in the zero diffraction order is typically lower than in higher orders.

Reference is made to FIGS. 17a-f which exemplify simulation results for a target exhibiting multiple phase singularity points in the zero reflected order of the $r_{ss}$ Jones matrix element. The angular sensitivity is about $$\frac{\Delta\theta}{\delta} = \frac{0.005°}{1\ nm},$$

obtained by optimizing the parameter set $w_1$, $w_2$, $p_x$, and δ, in the FEOL target 30 exemplified in FIG. 12. Such an overlay detection can be easily inferred from a standard ellipsometry measurement of ρ (ratio between TM and TE reflection coefficients $\rho = r_{pp}/r_{ss}$). Nevertheless, tracking the overlay including its sign with the phase singularity signatures in the zero-th diffraction order might need multiple targets with pre-designed overlay.

More specifically, FIGS. 17a-f illustrate phase singularity based overlay tracking using the zero-th diffraction order in an FEOL overlay target having the unit cell configured as exemplified in FIG. 12. FIGS. 17a-c show the simulated amplitude, and FIGS. 17d-f show the simulated phase of the Jones matrix element $r_{ss}$ of the target for the reflected diffraction orders −1 (FIGS. 17a,d), 0 (FIGS. 17b,e), and +1 (FIGS. 17c,f). In the figures, the horizontal axis is the elevation angle θ of the incident wave at the two azimuth angles φ=0°, 180°, and the vertical axis is the illumination wavelength. The phase plot of FIG. 17e shows the existence of multiple spectro-angular phase singularity points, designed to occur in the zero-th diffraction order. These phase singularity points are accessible to measurement with standard far-field optics. The illumination and collection range that entirely avoid spatial overlapping between different diffraction orders is located within the cones indicated by dashed lines. As shown in the inset of FIG. 17e, a pair of phase singularity points $PSP_1$ and $PSP_2$ is connected by a line/curve C of an abrupt 2π phase jump, that represents a branch cut in the phase. As a function of overlay, this pair of phase singularity points moves in the spectro-angular domain, and the change in their location is visually indicated by the change in the location of this branch cut, highlighted in curve C for δ=+10 nm. The simulated intrinsic angular sensitivity derived from tracking the location of any one of those two phase singularity points as a function of overlay is up $$\frac{\Delta\theta}{\delta} = \frac{0.005°}{1 \text{ nm}}.$$

FIGS. 18a-f show amplitude and phase plots similar to those of FIGS. 17a-f, but plotted for the measurable amplitude (Ψ) and phase (Δ) ellipsometry parameters, instead of the Jones matrix element $r_{pp}$, which are related by ρ=tan (Ψ)·$e^{i\Delta}$=$r_{pp}/r_{ss}$.

Considering inspection/measurements in such complex patterned structures as semiconductor wafers, it should be noted that a wafer space is a highly valuable resource, and any reduction in wafer space spent on overlay targets is extremely cost effective as it could be otherwise utilized for patterned devices and interconnects. This aspect is very important in the modern semiconductor devices, not only because feature density increases, but because the higher the feature density the higher is the number of additional steps in a multi-patterning photolithography process, which would in turn necessitate additional overlay targets, wasting even more wafer space. Therefore, an improvement in accuracy and precision of overlay monitoring is needed in parallel to a reduction in the number of overlay targets and wafer area consumed by them. In that regard, the PST technology of the present invention provides for significant wafer space savings, as this technique not only performs well for nanoscale feature sizes but also requires less overlay targets for monitoring.

The above-described examples of FIGS. 12-18 illustrate performance of the technique of the invention relate for the overlay critical dimension measurement with a one-dimensional overlay target (having one direction of periodicity). The phase singularity tracking technique of the invention can be used for overlay critical dimension measurement not only in one direction, using one-dimensional scatterometry targets of FIG. 14, but also in two directions using two-dimensional targets (having two directions of periodicity).

Figure 19:
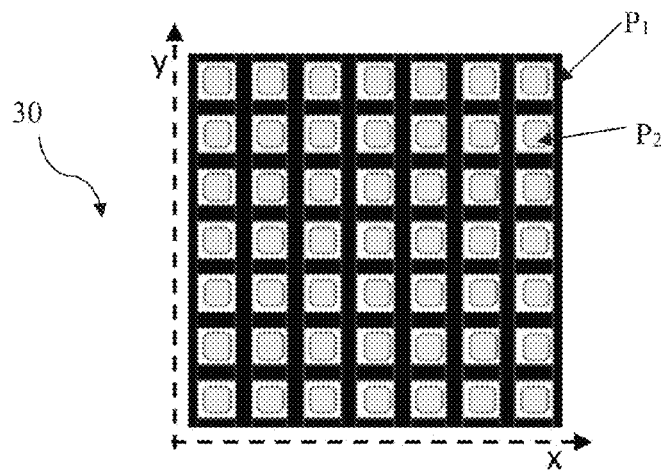
FIGS. 19 and 20 exemplify a measurement scheme (FIG. 20) for spectro-angular phase singularity tracking for critical dimension measurement with a two-dimensional overlay target having two directions of periodicity (FIG. 19)
Figure 20:
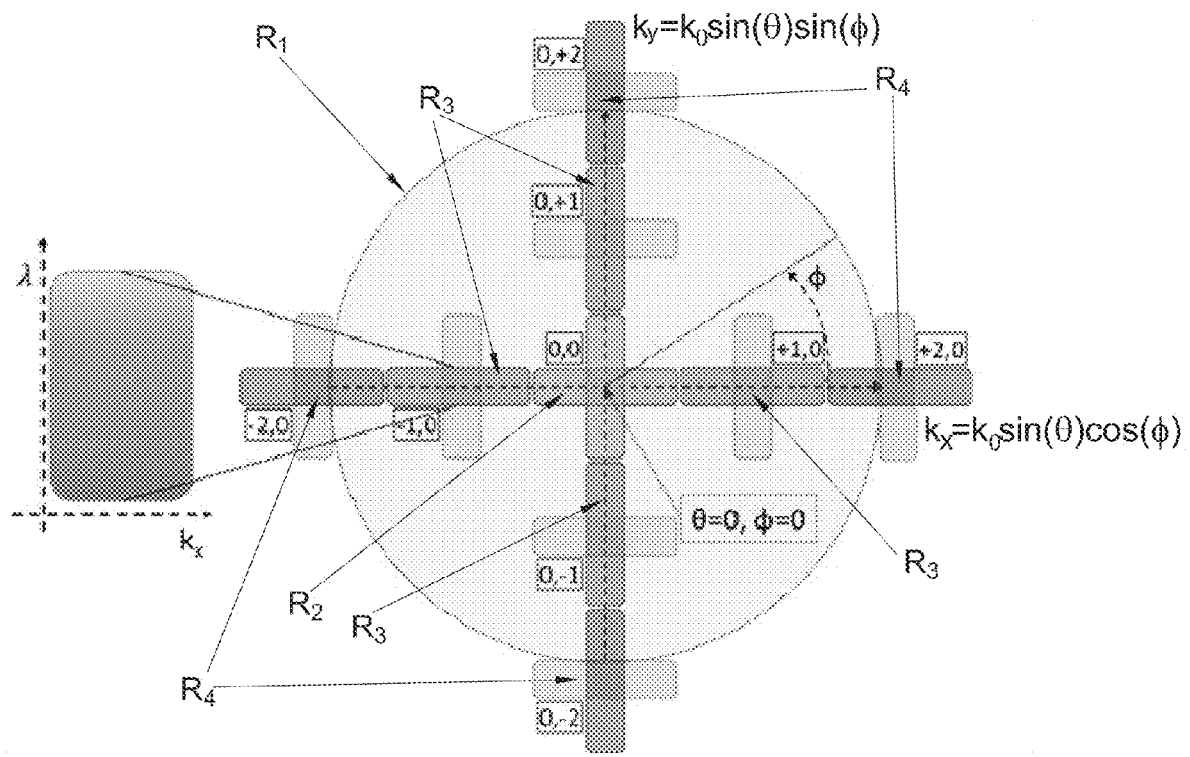

In this connection, reference is now made to FIGS. 19 and 20 exemplifying spectro-angular phase singularity tracking for critical dimension measurement with a two-dimensional overlay target. FIG. 19 schematically illustrates a target 30 for overlay monitoring in two directions, i.e. a two-dimensional overlay target. The target 30 has a complex patterned structure in which features of the pattern extend along x and y axes. The pattern is formed by a first fishnet pattern $P_1$ and a second rectangular pattern $P_2$ corresponding to, respectively, first and second separate steps in the fabrication process between which overlay monitoring is required. The features of the first and second patterns may or may not be within the same layer, and require overlay monitoring. It should be understood that patterns $P_1$ and $P_2$ in FIG. 19 are subject to optimization and can have various shapes, while shown $P_1$ and $P_2$ patterns are only simple non-limiting examples.

Generally, the phase singularity tracking technique with two-dimensional targets is similar to that with one-dimensional targets exemplified above. Indeed, in both case, a target should first be designed to exhibit phase singularity signature(s) (i.e. one or more phase singularity points) within an accessible spectro-angular range, sensitive to a CD variation such as overlay. Then, measurements are applied to the target with a measurement scheme using an illumination pattern that optimizes the phase singularity extraction and collection of the diffracted light to generate at least a spectro-angular phase-map that possesses the pre-designed phase singularity signatures. Finally, the measured phase map is processed to detect and track the phase singularity signatures and deduce the monitored CD.

In FIG. 20, an example of a measurement scheme is shown, considering the illumination and collection paths for a two-dimensional target 30.

In the figure, an area/region of the pupil plane is denoted $R_1$; this area is defined by $k_x$-$k_y$ wavevector components of freely propagating plane waves that are accessible using standard far-field optics and are therefore located within the circle defined by $$k_x^2 + k_y^2 = \left(\frac{2\pi}{\lambda}\right)^2,$$

where λ is the wavelength in air. The pupil plane is the Fourier transform plane of the image plane. Further, in the figure, region $R_2$ shows the cross-like illumination pattern, as well as light pattern reflected in the zero-th diffraction order. The illumination pattern probes the two-dimensional target over a range of elevation angles (θ) at four azimuth angles φ=0, 90°, 180°, 270°. This cross-like illumination pattern is replicated in the pupil plane by the various diffraction orders, noted by their order indices (n,m) in the x and y directions. The crosses (region) denoted $R_3$ correspond to the light patterns reflected in the first diffraction orders, (±1,0) and (0,±1), shifted in the x and y directions according to the grating periods in those directions; and the crosses/regions $R_4$ denote higher diffraction orders, (±2,0) and (0,+2). The two intersecting light stripes of each of the cross regions $R_3$ and $R_4$ correspond to angularly probing of the target in two different directions. The inset schematically represents how the reflected (−1,0) diffraction order, pre-filtered in the pupil plane to discard information related to sampling in the y direction, can be expanded by some additional diffractive element into two-dimensional spectro-angular data, with one axis representing different incidence angles and the other different illumination wavelengths.

Let us consider PST using reflected light in the first diffraction orders in the x and y directions (±1,0) and (0,±1), designated by regions $R_3$ in the figure. As indicated above, the two light stripes comprising the cross angularly probe the target in two different directions. To separate between x-related and y-related information, each first-order cross can be filtered in the pupil plane to get rid of information associated with the other axis. Repeating over the four first-order crosses, this procedure provides for extracting separately x and y related information. Each filtered pattern can then be spectrally decomposed by a diffraction element (not shown here) to extract an image with its spectral and angular information separated in different directions for a 'single-shot' spectro-angular image, as illustrated in the inset of FIG. 20.

Measuring the phase-map of two-dimensional targets is more complex than their one-dimensional analogue, because they have non-zero off-diagonal Jones matrix elements related to cross-polarization effects. The process of measuring a phase-map in this case means to measure any combination of the following: a generalized ellipsometry parameter $\rho_g$ defined in Eq. (23) above, any combination of all 6 independent elements of the Jones matrix, a linear combination of Jones matrix elements divided by another linear combination thus generalizing Eq. (23). Even more generally, if depolarization effects are important, Mueller matrix elements can be measured instead of Jones matrix elements as is done in generalized ellipsometry (also known as Mueller matrix ellipsometry). The main criteria for any such measured spectro-angular phase-map is to possess phase singularity signatures in the spectro-angular domain of interest. Like in the one-dimensional case, the exact combination of Jones/Mueller matrix elements that is measured at each spectro-angular point to extract the phase can be different, depending on optimization of various experimental and modelling considerations.

The inventors have shown (in the above-described one-dimensional target pattern configuration) that a single one-dimensional scatterometry target can suffice for overlay complete determination in one direction, including the sign of the overlay. Similarly, a single properly designed two-dimensional target with an appropriate illumination pattern and collection paths can provide spectro-angular phase-maps that exhibit phase singularity signatures whose movements as a function of overlay are indicative of the entire two-dimensional overlay, including the signs (direction of lateral shift) in each of the x and y direction.

The sensitivity of a phase singularity signature can be enhanced by a specialized target design. The following is the description of an experiment (test case) conducted by the inventors for the target design rule. One such design is based on the phenomenon of the coalescence of modes, also known as an exceptional point. A coalescence is the 'coming together' of two or more modes (degrees of freedom) in momentum-energy space (related to the spectro-angular domain). The modes under consideration here are resonances in the target reflection response. Coalescence is physically and mathematically distinct from standard mode degeneracy. In a degeneracy, two or more modes attain the same momentum and energy values at some point in the momentum-energy parameter space, but otherwise remain separate degrees of freedom associated with different electromagnetic field distributions (two or more different eigen functions that share the same eigenvalue). On the other hand, in an exceptional point, two or more modes coalesce at the same momentum and energy values and become indistinguishable, corresponding to the same field distribution, meaning that the total number of degrees of freedom is reduced (i.e. what was different eigen functions and eigenvalues away from the exceptional point, becomes a single eigen function with a single eigenvalue at the exceptional point).

This phenomenon has been widely related in the literature to enhanced sensitivity. For the purposes of the present invention, a phase singularity point in the spectro-angular domain is to be associated with such an exceptional point through specialized target design, in order to gain higher intrinsic sensitivity. By locating a phase singularity point near such an exceptional point in the spectro-angular parameter space, its movement due to parameter changes (such as overlay) can be enhanced as well. This means an increase in the intrinsic sensitivity when tracking this phase singularity point, as it 'moves more rapidly'.

The inventors have experimentally demonstrated the existence of a spectro-angular phase singularity point near such a coalescence of modes, using a specially designed layered target. Such targets enable phase singularity tracking at extreme sensitivities. One way to design such a target is based on maintaining the condition of zero average permittivity for the target at some point in the spectro-angular range (or at least for its real part as loss may prohibit to nullify the imaginary part). Generally, a zero average permittivity structure can be modularly designed from smaller structures that individually obey the zero effective permittivity condition, as exemplified in FIG. 21.

One such structure could be a flat layered target, patterned in one or more directions with effective building blocks that satisfy a zero effective permittivity condition, meaning that each such block comprises/is formed by material inclusions (e.g. metals and dielectrics) whose dimensions are designed such that block acts as an effective medium whose real part of the effective (averaged) permittivity is zero for electromagnetic waves propagating in one or more directions. The effective building blocks could be replicated in any direction of the target with different scaling factors at each repetition. The designed targets could be enclosed by layers or padding blocks that do not conserve the zero permittivity condition. The number of such effective layers or building blocks forming the target depends on an optimization process, aimed at bringing a phase singularity signature to an accessible spectro-angular range located near a coalescence of at least two modes. Another example could be a flat target that is patterned in two dimensions, such as to fabricate effective target layers that include/are formed by of building blocks with zero effective permittivity in one or more directions.

Figure 21:
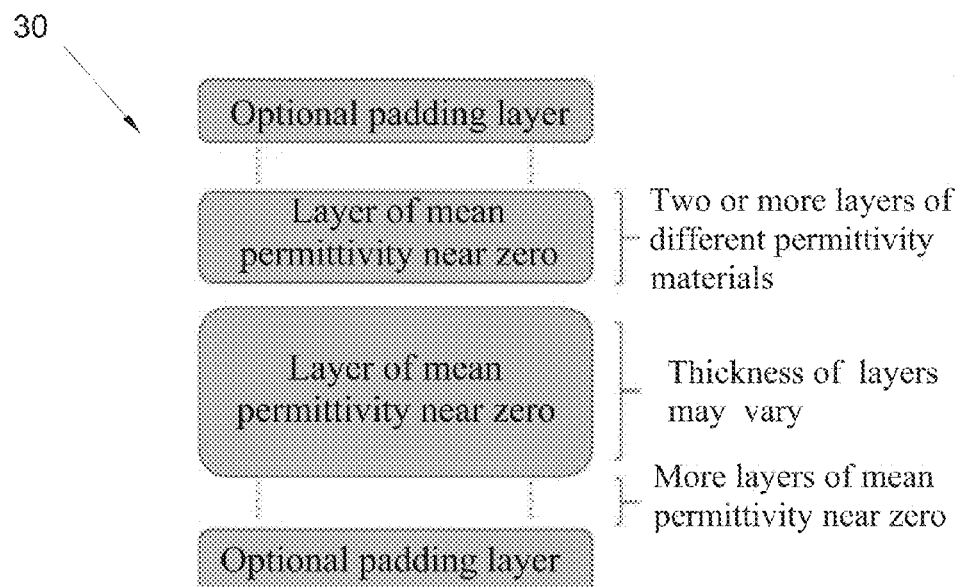
FIG. 21 schematically illustrates yet another example of a layered target structure designed for spectro-angular phase singularity tracking near a coalescence of modes, based on the zero effective permittivity design rule.

FIG. 21 schematically illustrates a layered target structure 30 designed for spectro-angular phase singularity tracking near a coalescence of modes, based on the zero effective permittivity design rule. As shown, the target structure can generally include one or more layers of a mean permittivity substantially/near zero, which may be enclosed between padding layers. If the target includes more than one layer of near zero permittivity, they may include layers made of materials with different permittivity, and having different thicknesses.

It should be understood that, the target structure exemplified in FIG. 19, as well the principles of the layered arrangement in the target structure shown in FIG. 21, may be used in any application for phase singularity signature tracking to determine the target status. Overlay monitoring is one specific but non limiting example. Another possible non-limiting example is a sensing technology for monitoring changes in target's parameter(s) caused by a change in its environment, e.g. for controlling the target condition or obtaining information about environment via measurements on the target, e.g. to detect foreign substance(s) via their interaction with the target. The latter may for example be used in biosensing applications.

Thus, the principles of the spectro-angular PST technique of the present invention, as described above, can be used in a sensing device. The following is the description of the experiments conducted by the inventors in fabrication and characterization of optical sensor chip exhibiting multiple controllable phase singularity points, one of which is located near a coalescence of modes, and fabrication and measurement of sensor chips operating at liquid environments.

The inventors have designed and implemented a fabrication process for chips that exhibit a single phase singularity point and sensor chips that exhibit multiple phase singularities. Each such phase singularity provides a separate optical degree of freedom that reacts independently to variations in the target environment of the sensor chip, thereby providing superior performance.

The inventors have experimentally demonstrated several sensor chips that exhibit multiple phase singularities in an accessible spectro-angular range, a phenomenon which has never been demonstrated before. One of these experiments is illustrated in FIGS. 22a-b and FIGS. 23a-d demonstrating, respectively, control of three separate phase singularities for a single sensor chip over just a 200 nm spectral band, which are spread over the entire accessible angular range, and the layers structure of the sensor chip.

More specifically, FIGS. 22a-b show, respectively, amplitude $\psi$ and phase $\delta$ of the ellipsometry parameter $\rho=\tan(\psi)e^{i\delta}$ of a monochromatic beam reflected from a multi-phase singularity tracking (PST) sensor chip of the present invention via a coupling prism (inset), as a function of illumination wavelength $\lambda$ and incident angle $\theta$. Three separate phase singularity points, designated 1, 2, 3 are observed, confirming the multi-PST sensor chip design of the invention. One of the phase singularities, marked as number 2, is designed to occur near a coalescence of modes.

FIGS. 23a-d show TEM characterization of the multi-PST sensor chip. More specifically, FIG. 23a shows TEM lamella of the multi-PST sensor chip; FIG. 23b shows a zoom-in section of a rectangle $T_1$ in FIG. 23a, and FIG. 23c shows a zoom-in section of region $T_2$ in FIG. 23b, demonstrating good homogeneity and flatness of the layers comprising the sensor chip; FIG. 23d shows layered structure (layer material composition) of the sensor chip. As shown, the sensor chip includes dielectric and metal layers DL and ML, corresponding to, respectively, layers/lines $L_1$ (black) in FIG. 23b and layers/lines $L_2$ (white) in FIG. 23c. Thus, this experimental multi-PST sensor chips comprises several interchanging metal and dielectric thin films ML and DL of various thicknesses. A typical process for fabricating an optical sensor chip for a water-based environment includes treating both a high index prism (NSF11) and a flat cover glass substrate, going first through the coating by a self-assembled monolayer (SAM) process followed by sputtering of gold films. While the prism sample is used as the actual sensor in experiments, the flat sample is used for cross-reference ellipsometry measurements to derive the optical properties of those specific gold films. With this method, the inventors have reached a high-degree of agreement between measured and simulated ellipsometry data.

The optical measurements were performed using the ellipsometry-based optical system described above with reference to FIG. 5A. The system design is based on retrieving a 2D phase map of the beam reflected from the target in a scanning mode. This full-phase retrieval requires control of the polarizer angle, analyzer angle, and retarder orientation. As described above, model-based algorithmic post-processing is used in order to retrieve the phase from those parameters (stage 1), find the wavelength and angle at which phase singularities are observed (stage 2), and finally extract target concentration levels out of the phase singularities (stage 3). The inventors have developed optimized models and algorithms for such 3-stage data post-processing to extract concentration levels from measured data, and verified them on both simulated and experimental data, reaching subpixel resolution in actual measurements.

The following is the description of some experiments conducted by the inventors to demonstrate spectro-angular phase singularities in liquids detected at sub-pixel resolution. The inventors have constructed liquid-enabled ellipsometry setups, utilizing the ellipsometer system, generally similar to that described above with reference to FIG. 5A allowing spectro-angular interrogation at high precision ($\Delta\lambda\approx0.1$ nm, $\Delta\theta\approx0.01°$), further modified/adjusted to integrate a specialized heating unit which adds thermal stability and control of the target at a $\Delta T\approx0.1°$ C. precision, and to further integrate a specialized liquid cell. Such integrated system performed spectro-angular full-phase interrogation of thermally stable liquid solution targets for use in sensing applications.

The experimental results of the PST technique of the invention obtained using the above described liquid cell setup, as compared to standard Surface Plasmon Resonance (SPR) type detection are shown in FIGS. 24a-b. The figures show the measured $\psi$ (FIG. 24a) and $\delta$ (FIG. 24b) of the ellipsometry parameter $\rho=\tan(\psi)e^{i\delta}$ for a gold film sensor chip as a function of illumination wavelength $\lambda$ and incident angle $\theta$, measured simultaneously over an extremely narrow spectro-angular window at high resolution ($\Delta\theta=0.05°$, $\Delta\lambda=0.1$ nm). The phase singularity point PSP in FIG. 24b used for PST-type detection is clearly observed, while the location of the reflected intensity minimum point in FIG. 24a used for SPR type detection is indistinguishable. This experiment demonstrates the superiority of the PST-based detection over standard SPR-based detection. Indeed, in the extremely narrow spectro-angular window (1 nm×0.2°), under the same conditions, the intensity-only measurements used for SPR-type detection are too noisy to reliably detect the minimum intensity point location (FIG. 24b), while the corresponding phase measurements used for PST-type detection enable a clear determination of the phase singularity point (FIG. 24a).

The overall performance analysis for the liquid cell system is shown in FIGS. 25a-b, showing subpixel resolution for phase singularity detection using the above-described liquid cell setup. Here, the same measurement is repeated over time to extract the noise characteristics. FIG. 25a shows a set of 16 repeated phase measurements performed sequentially for the same gold sensor chip (35.9 nm thick) operating at a water ambient held at room temperature (25° C.). FIG. 25b shows a zoomed-in section S of FIG. 25a showing the phase singularity points PSP algorithmically detected (as described above) from all 16 measurements, falling within angular and spectral standard deviations of $\sigma_\theta\approx0.002°$ and $\sigma_\lambda\approx0.04$ nm, respectively. The smallest achievable angular and spectral pixel step sizes in the spectroscopic ellipsometer system are $\Delta\theta=0.01°$ and $\Delta\lambda=0.1$ nm, respectively. Thus, the experimental results clearly demonstrate stable sub-pixel resolution, with angular and spectral standard deviations of $\sigma_\theta$=0.002° and $\sigma_\lambda$=0.04 nm, respectively.

The liquid cell system, however, suffers from thermal stability and bubble formation on the surface of the sensor chip over time, both of which can deteriorate measurements performed over a long duration. For instance, the spread in the set of 16 repeated measurements performed over a 12-hour period (FIG. 25b) is mainly attributed to temperature fluctuations in the clean room facilities combined with poor thermal isolation of the liquid cell.

The inventors then further modified the flow-cell set to enable sub-pixel detection of phase singularities for concentration measurements.

In order to perform sub-pixel detection of phase singularities for concentration measurements in liquid solutions, and to overcome the above problems of the liquid cell setup, the inventors constructed a flow cell with passive thermal isolation that integrates with the active thermal control module attached to the ellipsometer.

The overall performance analysis for the flow cell system is shown in FIGS. 26a-b, where the same measurement is repeated over time to extract the noise characteristics in a flowing water ambient. FIGS. 26a-b demonstrate subpixel resolution for phase singularity detection using the flow cell setup. FIG. 26a shows a set of 8 repeated phase measurements performed sequentially for the same gold sensor chip (37.2 nm thick) operating at a water ambient held at room temperature (25° C.). FIG. 26b shows a zoomed-in section S of FIG. 26a illustrating the algorithmically detected phase singularity points PSP from all measurements, falling within angular and spectral standard deviations of $\sigma_\theta \approx 0.003°$ and $\sigma_\lambda \approx 0.05$ nm. The smallest achievable angular and spectral pixel step sizes in the spectroscopic ellipsometer system are $\Delta\theta$=0.01° and $\Delta\lambda$=0.1 nm, respectively. The experimental results clearly demonstrate stable sub-pixel resolution, with angular and spectral standard deviations of $\sigma_\theta$=0.003° and $\sigma_\lambda$=0.05 nm, respectively.

The results of the experiment shown in FIGS. 26a-b were attained under a controlled flow. In the liquid cell setup experiment described above with reference to FIGS. 25a-b, the metal walls of the cell allow enough thermal isolation for the stagnate liquid ambient they come in contact with. However, under flow condition the ambient are not stagnate and therefore require additional thermal isolation to achieve similar performance levels. Additionally, the flow significantly reduces bubble formation at the sensor chip surface. Consequently, with the flow cell setup the inventors performed repeated concentration measurement experiments over long durations at a thermally controlled environment with thermal stability of $\Delta T \approx 0.1°$ C.

The inventors have also experimentally shown how the PST technique of the present invention can be used for concentration measurements in samples without using to ligands and providing the results by an order of magnitude better than the standard SPR technique requiring ligands. In this experiment, successful PST detection of trace amounts (as low as 0.5 mg/L) of D-glucose in a water solution was performed. In this connection, reference is made to FIGS. 27a-c FIG. 28a-b.

FIGS. 27a-c show a set of repeated phase measurement as a function of incidence angle ($\theta$) and illumination wavelength ($\lambda$) performed sequentially for the same gold sensor chip (37.2 nm thick) with a water ambient held at room temperature (25° C.). FIG. 27a show the phase measurements for pure deionized water and FIG. 27b show the same for a D-glucose solution with a concentration of 1 mg/L.

FIG. 27c shows a zoomed section S illustrating the algorithmically detected phase singularity points PSP$_w$ and PSP$_g$, respectively, for all measurements of the water and glucose solutions. Highlighted by rectangles are the statistical margins of confidence, defined by three standard deviations from the mean extracted from the spread of detected points. Thus, the inventors have performed experimentally successful PST detection of trace amounts of D-glucose in a water solution. FIGS. 27a-c show the shift in the location of the phase singularity point from pure deionized water (FIG. 27a) to a D-glucose solution at a 1 mg/L concentration (FIG. 27b), and the statistics of that shift as measurements are being repeated (FIG. 27c). The statistical spread of the measurements clearly shows that the measured shift is far beyond the three standard deviation margins required to assert successful detection.

Figure 28A:
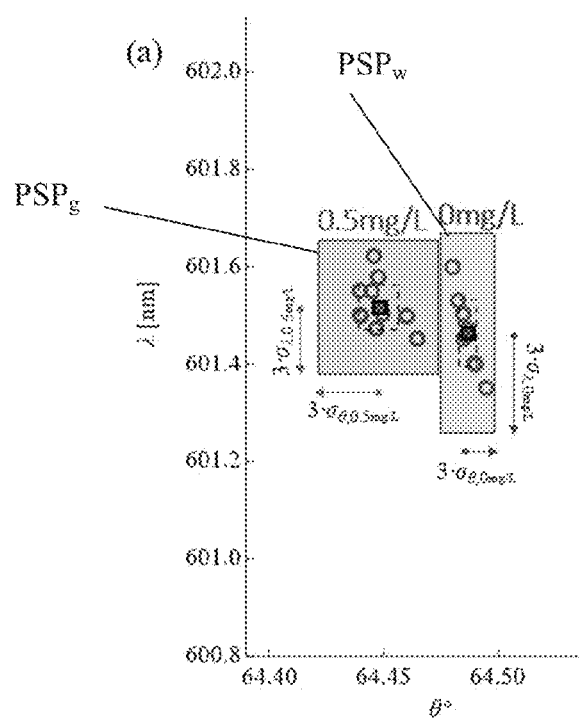
Figure 28B:
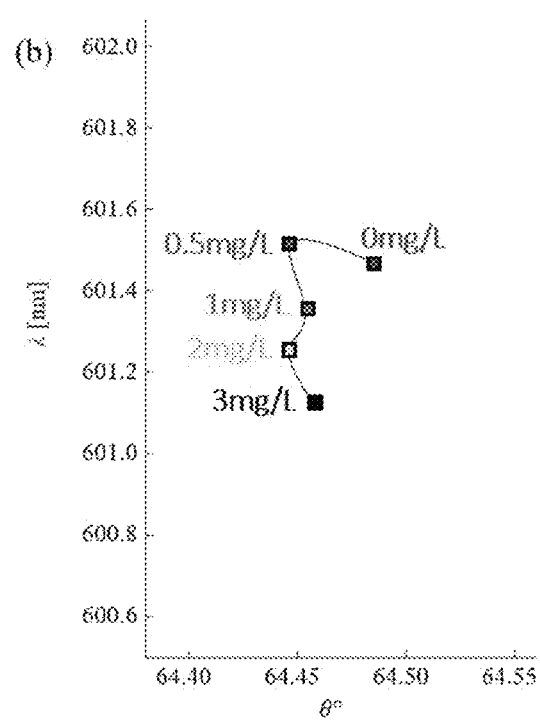

In fact, the standard deviations obtained from the measured spread of phase singularities in pure deionized water ($\sigma_{\theta,0mg/L} \approx 0.003°$ and $\sigma_{\lambda,0mg/L} \approx 0.05$ nm) and the D-glucose solution ($\sigma_{\theta,1mg/L} \approx 0.003°$ and $\sigma_{\lambda,1mg/L} \approx 0.04$ nm) indicate that the three-sigma concentration detection limit was about 0.53 mg/L. The inventors successfully tested this detection limit in a dedicated batch of concentration experiments. This is illustrated in FIGS. 28a-b. FIG. 28a shows the detected phase singularity point locations extracted from repeated spectro-angular phase measurement of deionized water and a D-glucose solution at a concentration of 0.5 mg/L. Highlighted by rectangles are the statistical margins of confidence, defined by three standard deviations from the mean extracted from the spread of detected points—demonstrating a 3$\sigma$ detection threshold of 0.5 mg/L D-glucose (a 1$\sigma$ resolution of 2.54×10$^{-7}$ RIU). FIG. 28b shows the means of detected phase singularity points for additional measurement sets, spanning a wider range of concentrations: 0 mg/L, 0.5 mg/L, 1 mg/L, g/L, 2 mg/L, 3 mg/L. All measurements were performed over the same gold sensor chip, which was designed for maximum sensitivity at around 0.5 mg/L (accounting for the nonlinear trend around that concentration value in FIG. 28b), with the water ambient held at room temperature (25° C.).

The inventors performed several sets of concentration measurements for D-glucose solutions, with concentrations ranging from 0.5 mg/L to 3 mg/L. The experiments clearly demonstrated a capability for ultra-low concentration detection of 0.5 mg/L, which translates to a benchmark resolution of 2.54×10$^{-7}$ in refractive index change—an order of magnitude better than commercially available SPR sensors (which are typically in the 10$^{-6}$ RIU range).

Thus, the phase singularity tracking (PST) technique of the present invention can be used as advantageous sensing technique in various industrial applications. The PST can be used to provide valuable information indicative of different critical dimensions (CD) of a target, fabricated by photolithography or any other nano-fabrication process. The information can be inferred by PS tracking technology in different production steps, including masking, etching, CVD, light exposure, stepper steps, and others. Such information is critical for yield management. Examples of nano-fabrication processes in all the above include etching, masking, deposition (e.g., chemical vapor deposition), polishing (e.g., chemical mechanical polishing), sputtering, ion implantation, etc.

The tool that performs PS tracking can be a standalone machine or integrated into production line devices. For example, it can be integrated into a stepper machine. PS tracking can provide accurate information with high sensitivity that is indicative of the overlay between fabricated features. For example, the overlay between gratings fabricated in different layers or fabricated by separate steps of a multi-patterning photolithography process within the same layer. By a proper design of a scatterometry target, multiple PS points can be designed in an accessible range of 2D parametric space and be jointly used for CD monitoring. Both reflected and transmitted diffraction orders of patterned targets can be made to possess PS signatures that can be utilized for CD target monitoring. The zero-th and first diffraction orders are more advantageous for PS tracking due to the stronger signal and better accessibility for both light illumination and collection paths. By utilizing the diffraction orders of patterned targets, and the first diffraction order in particular, PS tracking is capable of monitoring overlay information in one and two directions from a single target. It can be realized by a specialized design of a scatterometry overlay target or on-site (using the fabricated device as the target), provided that the target exhibits PS signatures in the 2D parametric space range accessible with detection tool.

PS tracking with anisotropic targets can be based on acquisition of a phase map derived from the phase difference between an electric field component that possesses a PS signature and another reference field.

Using only a single scatterometry target, PS tracking technology can be used to monitor CD parameters such as overlay between features fabricated in a multi-patterning process. A single scatterometry target is able to provide overlay information after each multi-patterning step, or provide all the overlay information at the end of a multi-patterning process, if it is also being patterned at each such multi-patterning step. At each such step, another grating is added to the top layer of the scatterometry target, which redistributes the PS signatures in the accessible range for measurement. The sensitivity and movement of each PS as a function of the various target parameters is generally unique. Therefore, by observing and tracking multiple PS signatures in the target, one can measure multiple target parameters. Additionally, a sequential measurement of the scatterometry target after each multi-patterning step would allow to minimize the number of unknown parameters, thereby reducing the complexity of the PS tracking process.

The following are some additional examples of the implementation of the technique of the present invention.

In some of these examples, the 2D parametric space is angular-angular space, and the target is designed for phase singularity tracking for critical dimension measurements, which can be used for overlay metrology. In these examples, the PST technique is conducted in the Fourier space (sometimes called "Pupil plane") of the target image, namely in angular-angular domain (e.g. two-dimensional parametric space of varying angles of incidence in a pupil plane).

Angular-angular domain might be beneficial over spectro-angular domain, as it is consistent with conventional optics. For example, infinity corrected high numerical aperture (NA) objectives could provide high quality pupil images. As shown in the example below, the sensitivity using the angular-angular domain could be higher than that of the spectro-angular domain measurements. Therefore, angular-angular PST is of high value and importance, possibly allowing for an easier realization (with standard optics combined with an ellipsometry technique) and extraordinary sensitivity.

The example is some modification of the case based on the front-end-of-the-line (FEOL) target presented in FIG. 12 described above. The target periodicity and angular convention are as presented in FIG. 13 described above. The main difference of angular-angular PST with grating based targets (or other anisotropic targets) is that the Jones matrix can no longer be assumed diagonal. The benefit is that more components of Jones matrix could experience PS points, but the extraction procedure detailed in the above described example of FIGS. 12-18 (assuming diagonal Jones matrices) does not hold. Nevertheless, the extraction of Jones matrix elements and/or Muller matrix elements is known to a person skilled in the art of polarimetry or ellipsometry. In the following examples, the viability of the proposed angular-angular PST is presented, assuming one of the known techniques for Jones and/or Muller matrix elements extraction.

One of the crucial components of angular-angular PST is to design a target, which exhibits PS points in the far-field. A strategy to design such a target is to start the simulation search from a target with a spectro-angular PS and then fine-tune the target parameters to bring the PS into angular-angular space.

Figure 29A:
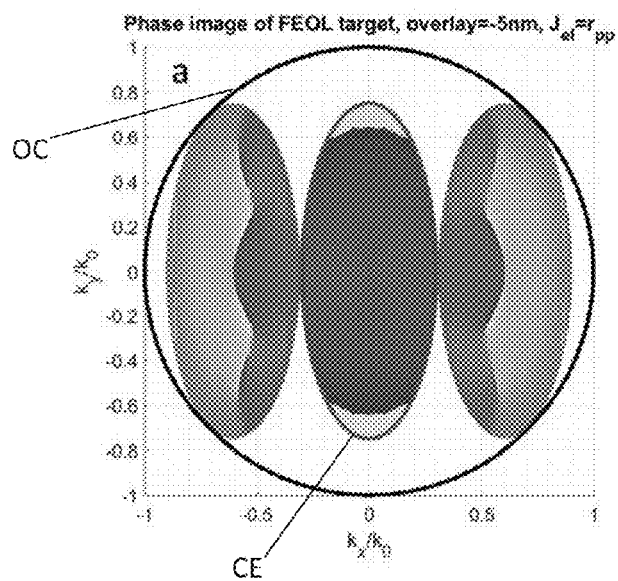
FIGS. 29a-d show simulation results of the PST technique of the invention for a FEOL type target with 5 nm overlay (FIGS. 29a-b) and target with 0 nm overlay (FIGS. 29c-d) between the gratings, where
Figure 29B:
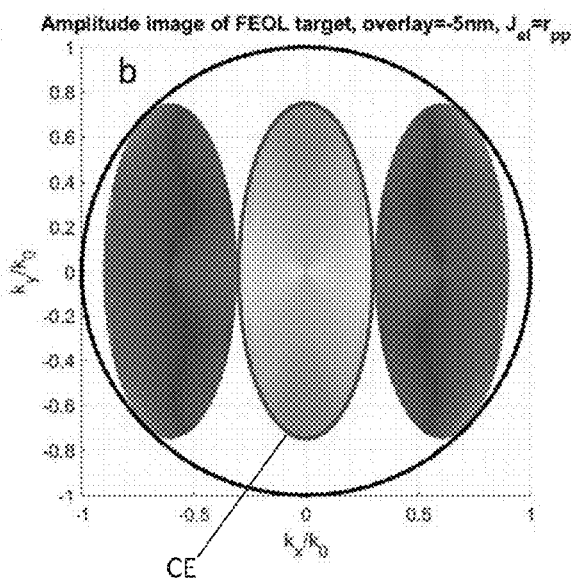
Figure 29C:
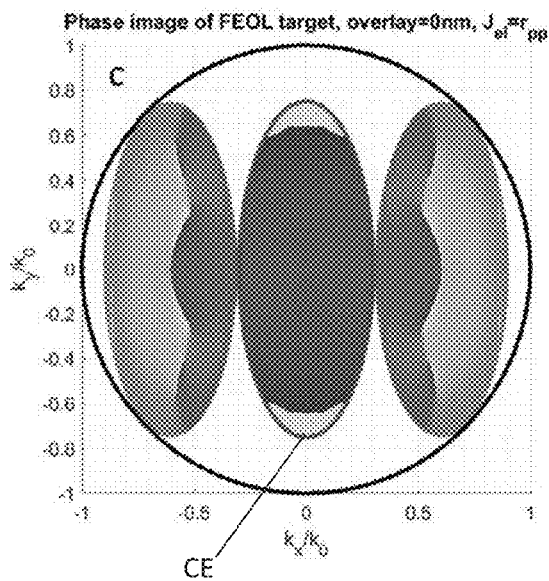
Figure 29D:
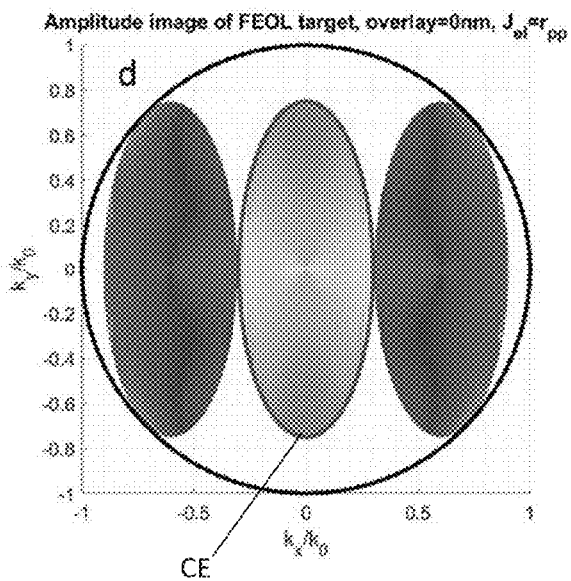

In this connection, reference is made to FIGS. 29a-d, which show simulation results of a FEOL type target. FIGS. 29a and 29c show the phase and FIGS. 29b and 29d show the amplitude of the $r_{pp}$ element of Jones matrices, presented as a function of incidence angle. More specifically, FIGS. 29a and 29b represent the optical response of FEOL target with 5 nm overlay between the gratings, and FIGS. 29c and 29d represent response of the target with 0 nm overlay. The outermost circle represents the far-field accessible light, equivalent to numerical aperture NA=1. Here, $k_x$ and $k_y$ are wavevector components of light normal to the propagation direction (z-axis), and $k_0$ is the amplitude of the light wavevector. The central ellipse CE shows the wavevector range spanned by the illumination beam (assumed of uniform intensity). The zero-order reflected light is within the center ellipse CE, the −1 diffraction order is within the left ellipse, and the +1 diffraction order is within the right ellipse.

These are the simulation results of a FEOL target, with an overlay (FIGS. 29a-b) and without overlay (FIGS. 29c-d) between the FEOL target gratings of FIG. 12. Each figure in FIGS. 29a-d presents a pupil plane (Fourier transform of the target image plane) where far-field light is contained within the outermost circle OC of radius 1 in NA (numerical aperture) units. Inside the NA=1 circle (e.g. in FIG. 29b) there are three ellipses, while the central one represents reflection (amplitude or phase) of the zero-order diffraction, in response to uniform illumination at one specific wavelength in the form of the central ellipse CE. The side ellipses in each figure of FIGS. 29a-d represent the plus (right) and minus (left) first order diffraction optical response of the target. Without overlay (overlay 0 nm, FIG. 29c), the phase image and corresponding phase singularity points are symmetric with respect to the image center (normal incidence, where the x and y wavevector components $k_x$ and $k_y$ are zero). While the symmetry with respect to $k_y=0$ axis is preserved regardless of the overlay by the target symmetry, the symmetry with respect to $k_x=0$ axis only exists for 0 nm overlay between the gratings (shift of half a period between the gratings still preserves the symmetry). Therefore, when a 5 nm overlay is introduced between the gratings, shown in FIG. 29a, the phase image and phase singularity points move asymmetrically with respect to the $k_x=0$ axis.

Figure 30:
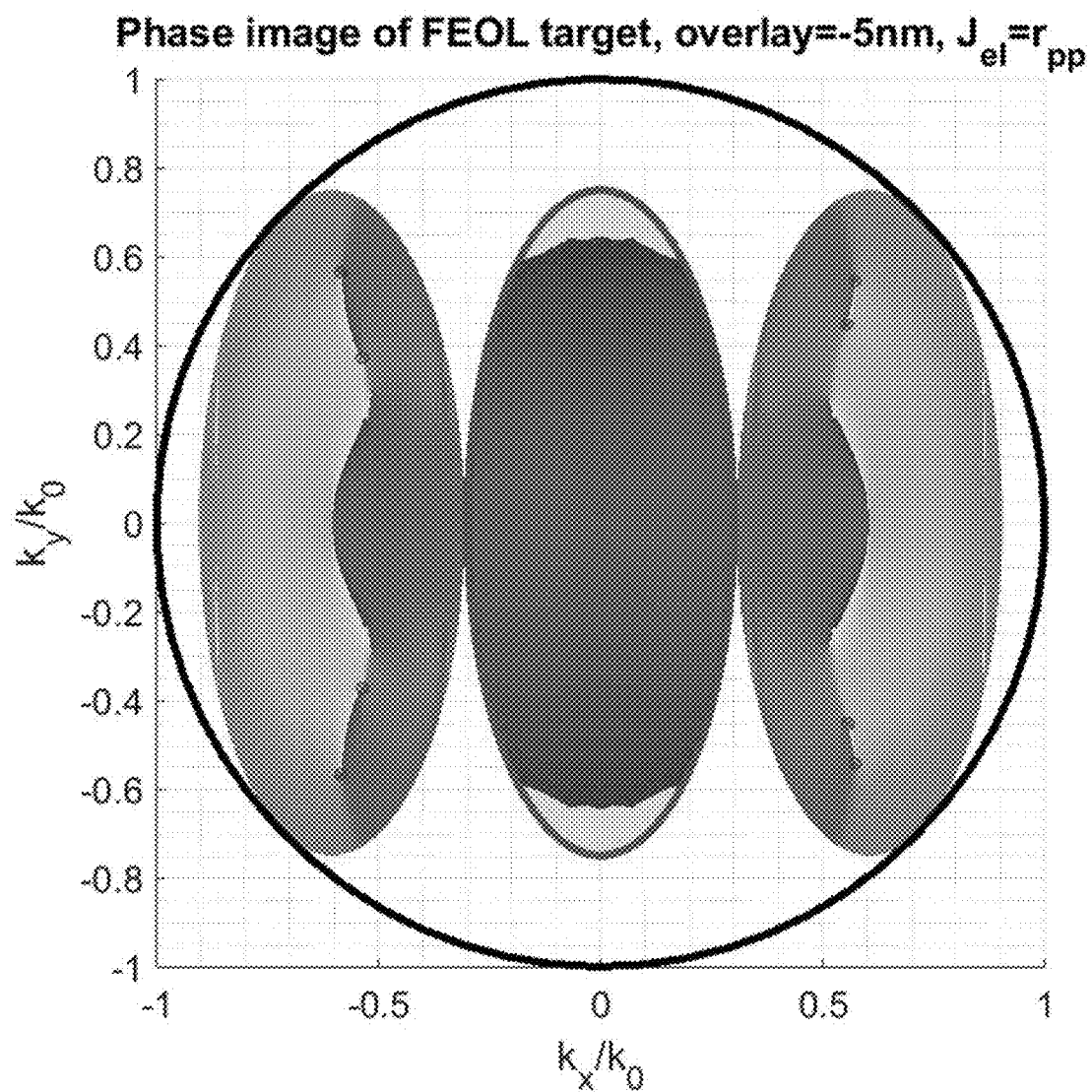
FIG. 30 shows an enlarged version of FIG. 29a with relevant PS points marked by circled crosses.

To see the movement of PS points in angular-angular space, FIG. 30 presents an enlarged version of FIG. 29a with relevant PS points marked by circled crosses.

FIG. 30 shows that multiple PS points exist. Let us, however, focus on the four marked pairs of PS points. Two pairs of PS points on the left hand side ellipse appear as more distant from one another than the two pairs of PS points on the right hand side ellipse. This change in the position of PS point is a function of overlay between the gratings.

Up and down replicas are identical due to the target symmetry and could assist in further noise reduction (e.g. by averaging). The distance change of each PS point, as well as their relative positions, are all measures of the target parameter change (overlay). Once the PS movement is calibrated versus a parameter of interest in the target, it serves as a ruler, providing measurement of the parameter by PS measurement.

In this example, the distance between nearby PS points changes from the initial 0.157 NA (in FIG. 29c expressed in NA units) to 0.198 NA for the upper right hand side PS pair and to 0.0825 NA for the left hand side PS pair (FIG. 30). The resulting change in relative PS positions is around 0.1 NA for a 5 nm overlay, assuming objective lens with NA≈1 whose pupil is imaged by a CCD camera with 4096×4096 pixels. A direct pixel to pixel detection capability of $5 \times 10^{-4}$ NA results in a 0.025 nm overlay detection limit—an extraordinary sensitivity for a standard optical system.

Moreover, one target is enough for overlay detection as the left and right hand sides experience asymmetric PS movement as a function of overlay, the sign of the overlay and its amount can be inferred from a single target by means of PST. Typically, the detection of overlay in each direction requires up to four targets. Hence, reduction in the number of targets to just a single target per direction is highly advantageous.

The above-explained concept was exemplified on the $r_{pp}$ element of the Jones matrix. However, it can be generalized to any element of the Jones matrix. For example, FIGS. 29 and 30 exemplify that FEOL target experience PS points suitable for PST in other elements of the Jones matrix as well.

Reference is made to FIGS. 31a-d which show $r_{ss}$ Jones matrix element response with PS points in the phase maps, and to FIGS. 32a-d which shows $r_{ps}$ Jones matrix element response with PS points in the phase maps.

More specifically, FIGS. 31a-d (as well as FIGS. 32a-d) illustrate the FEOL type target simulation results for the phase (FIGS. 31a and 31c) and amplitude (FIGS. 31b and 31d) of the $r_{ss}$ element of the Jones matrices, shown as a function of incidence angle. FIGS. 31a and 31b (and similarly FIGS. 32a and 32b) depict the optical response of a FEOL target with a 5 nm overlay between the gratings, and FIGS. 31c and 31d (and similarly FIGS. 32c and 32d) represent the target response with 0 nm overlay. The outermost circle represents the far-field accessible light, equivalent to numerical aperture NA=1, $k_x$ and $k_y$ are wavevector components of light normal to the propagation direction (z-axis), and $k_0$ is the amplitude of the light wavevector. The central ellipse shows the wavevector range spanned by the illumination beam (assumed of uniform intensity). The zero-order reflected light is within the center ellipse, the −1 diffraction order is within the left ellipse, and the +1 diffraction order is within the right ellipse. Arrows point to the most visible and easily detectable PS points in the phase maps.

The above-described PST technique in angular-angular space is also possible in terms of Muller matrix elements, which is another (and in many cases an equivalent) way to represent the optical response of targets.

It should be noted that there are multiple non-intuitive ways to obtain PS point(s)s in a measured two-dimensional parametric space. In the above-described examples, spectro-angular and angular-angular options are considered as domains of measurement. These examples are non-limiting and can be extended to various domains combined from: angle, wavelength, one special dimension of the target, variation in one of the target parameters, variation in one of the environment parameters, etc.

The following are some examples of the PST technique of the present invention for monitoring the target status, where the phase singularity signatures are determined in spectro-thickness and angular-thickness domains (thickness corresponds to one of the target thickness parameters).

Figure 33:
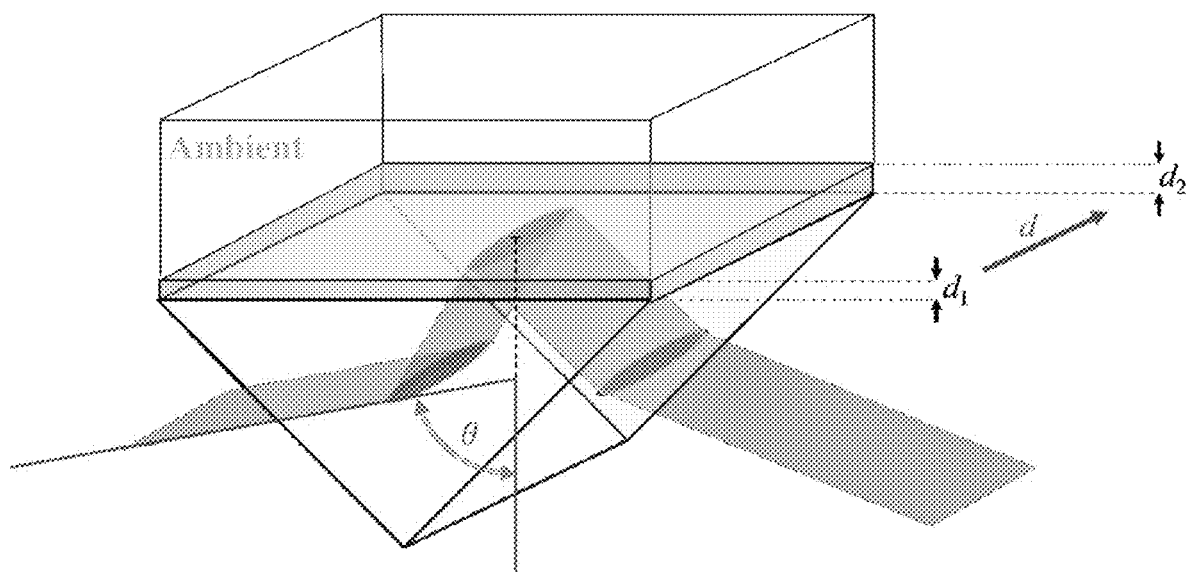
FIG. 33 is a schematic representation of an example of measurement in a spectro-thickness parametric space, using a target with thickness variation in one dimension, sampled by a beam of light at an incidence angle and sampling different thicknesses of the target.

Reference is made to FIG. 33 which is a schematic representation of a target with thickness variation in one dimension (shown by arrow d), sampled by a beam of light at an incidence angle θ and sampling different thicknesses of the target. Incidence angle and/or wavelength of the light beam provide additional dimension for the measurement. In the case of spectro-thickness measurement a dispersive element and appropriate optics are used to split various wavelengths and sample the spectro-thickness measurement domain. In case of angular-thickness measurement, different incidence angles are used to generate the angular-thickness measurement domain. The measurement consist of at least a phase indicative of the phase response of the target.

As show in the figure, the thickness change is preferably in one of the critical target dimensions (e.g. gold layer thickness gradually increasing from $d_1$ to $d_2$). The target can be interrogated with a beam sampling the target with a band of wavelengths and/or bundle of angles (θ) in one dimension, and sampling the target at different thicknesses in the other dimension (in the direction of the d arrow). After separation of wavelengths (by a dispersive element) or angles, the resulting two-dimensional beam (optical response) provides the required measurement domain. By further analyses (e.g. by ellipsometry, interferometry) a phase map representative of the phase response of the target can be obtained and used for PST.

FIGS. 34a-d and FIGS. 35a-d show two numerical examples for PST in thickness-spectral and thickness-angular domains, respectively. In each example, a target with varying thickness of gold layer deposited on a prism (FIG. 33) is chosen as a sensor of ambient refractive index.

More specifically, the simulation results for thickness-spectral PST are presented in the form of expected ellipsometry parameters ψ (FIGS. 34a-b and 35a-b) and Δ (FIGS. 34c-d and 35c-d), extracted from the sensor like in FIG. 33. The variation in the thickness parameter d corresponds to gold layer thickness change; the other dimension is the variation in illumination wavelength λ. The PS points marked by circles and enumerated as 1 and 2 represent the initial (FIGS. 34c and 35c) and final (FIGS. 34d and 45d) positions in the thickness-spectral space and thickness-angular space, as a function of change in the refractive index of the ambient.

Figure 34A:
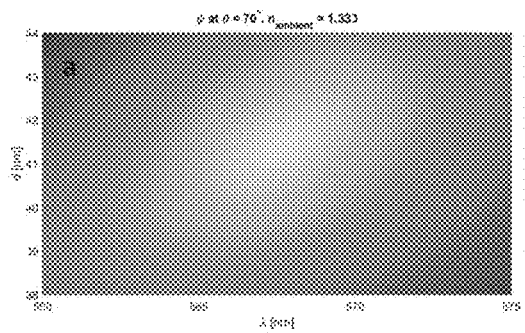
FIGS. 34a-d and FIGS. 35a-d show two numerical examples for PST in thickness-spectral and thickness-angular domains, respectively.
Figure 34B:
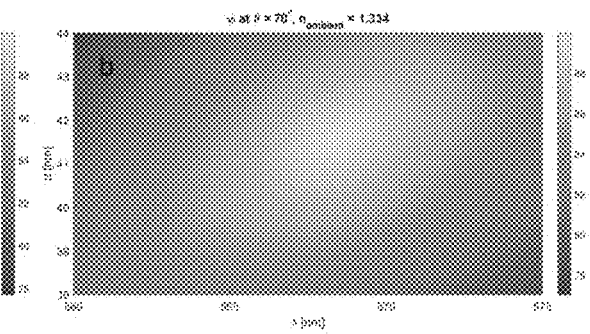
Figure 34C:
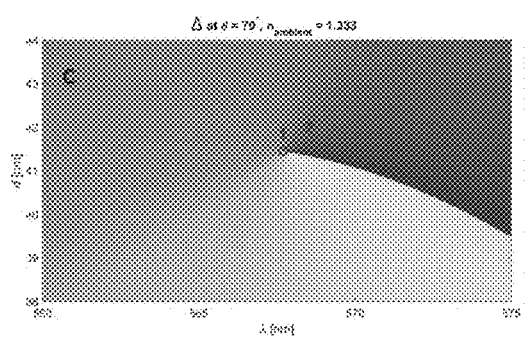
Figure 34D:
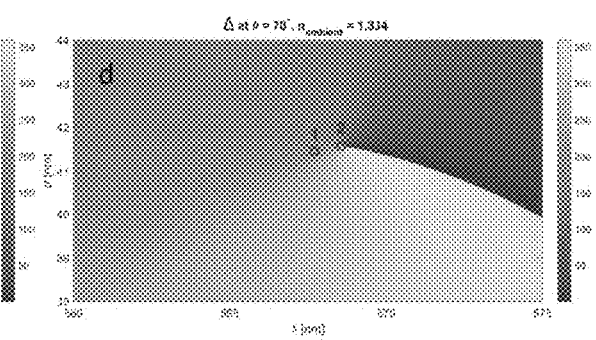
Figure 35A:
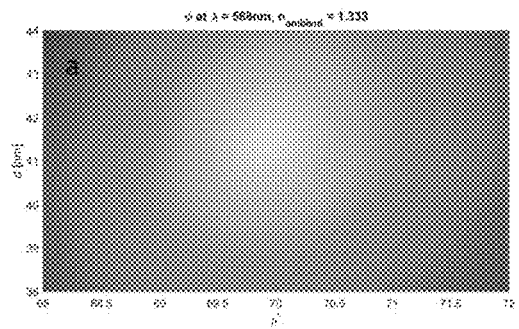
Figure 35B:
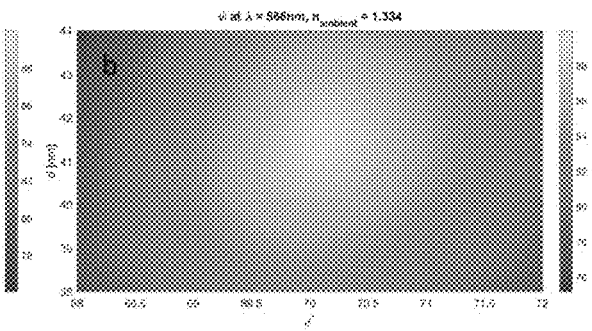
Figure 35C:
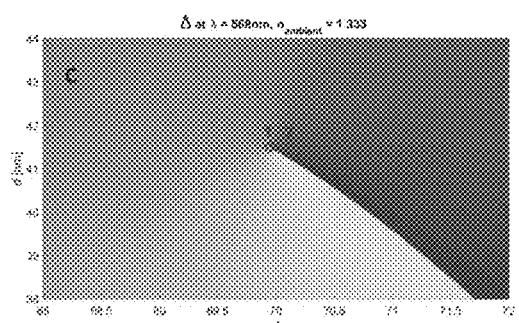
Figure 35D:
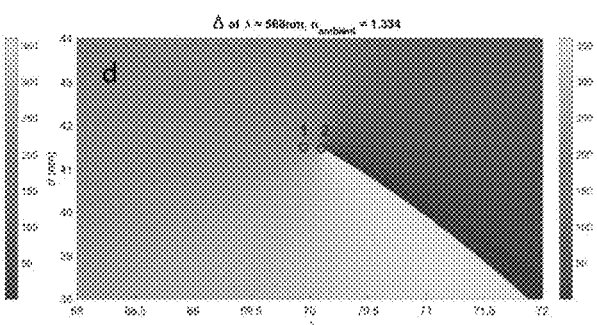

In FIGS. 34c and 34d, the PS signature is observed in two-dimensional phase map acquired in thickness-spectral domain, and tracked as a function of ambient refractive index. The PS point 1 indicates the initial position and point 2 indicates the position after refractive index change. In FIGS. 35c and 35d, the PS signature is observed in two-dimensional phase map acquired in thickness-angular domain, and tracked as a function of ambient refractive index. PS point 1 indicates the initial position and point 2 the position after refractive index change. (PS points 1 and 2 in FIG. 16).

The given two examples prove the viability of PST technique of the present invention in various two-dimensional domains, where each dimension encodes the measured phase as a function of one of the parameters: angle, wavelength, one special dimension of the target, variation in one of the target parameters, variation in one of the environment parameters, etc.

The following are some more example of the phase singularities of the optical response parameters. This is based on the following:

The general representation of the polarization state of light is given by a vector of four real valued Stokes parameters. These four parameters can be translated to the following four degrees of freedom: intensity (I), degree of polarization (p), and two parameters describing the polarization state of the polarized component, denoted as the angles $2\psi$ and $2\chi$. Specifically, $2\psi$ is the azimuth angle of the Stokes vector on the Poincare sphere, $2\chi$ is the elevation angle of the Stokes vector on the Poincare sphere, $\psi$ is the rotation angle of the semi-major axis of the polarization ellipse (defined in the range 0 to 180 degrees), and $\chi$ is the ellipticity angle of that same ellipse (in the range −45 to 45 degrees). The parameters $2\psi$ and $2\chi$ correspond to one of the possible parametrizations for the polarization state of light.

The concept of PST can be equally applied to any parametrization provided it has a "phase" parameter that exhibits a nontrivial topological structure—meaning branch points (phase singularity points). These are points around which the phase parameter accumulates its full range when encircles in the 2D parameter space.

Once a PS signature is designed and found in a specific target (e.g. in the azimuth parameter $2\psi$ or ellipsometric phase Δ), the observation of the PS signature is possible with a polarized, partially polarized or even unpolarized light. Such a generalization is important in order to optimize the cost of a light source, which typically much cheaper in poor maintained polarization versions. The unpolarized part of light can be successfully decomposed by standard polarimetry or ellipsometry techniques.

As a specific example of PST using the azimuth $2\psi$ parameter, a FEOL type target similar to the one presented in FIG. 12 can be considered. The illumination is by unpolarized light at a single wavelength and various incidence angles (angular-angular domain).

Reference is made to FIGS. 36*a-d* showing simulation results of reflected −1 and +1 diffraction orders, reflected from a FEOL type target for the azimuth parameter $2\psi$, measured as a function of incidence angle (the possible aliasing between different diffraction orders is omitted here). This phase map is acquired at angular-angular domain (pupil plane) for illumination with unpolarized light. The most sensitive and convenient for tracking PS points in the azimuth $2\psi$ are marked by arrows. The simulation is conducted for overlay 0 nm (FIGS. 36*a-b*) and overlay 10 nm (FIGS. 36*c-d*) between the gratings. As can be seen from the highlighted by arrows PS points, their location changes as a function of overlay in asymmetric way. The relative change in the distances of PS pairs leads to accumulated 0.3 movement (in NA units) for 10 nm overlay. Imaged by a standard CDD camera with 4096×4096 pixels for entire pupil plane the simulated sensitivity leads to 0.017 nm basic pixel resolution of overlay movement.

Figure 36A:
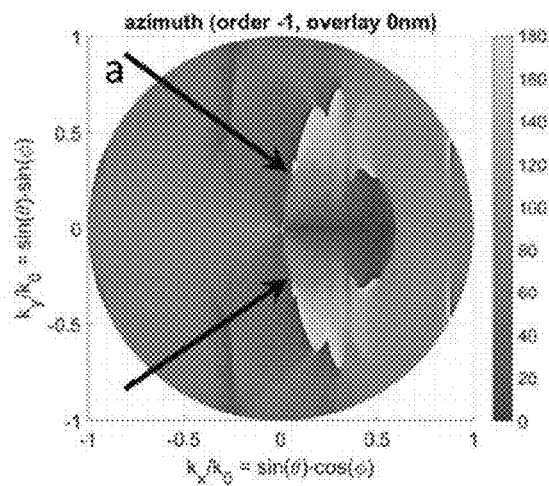
FIGS. 36a-d show simulation results for an FEOL type target, where the phase map is acquired at angular-angular domain for illumination with unpolarized light.
Figure 36B:
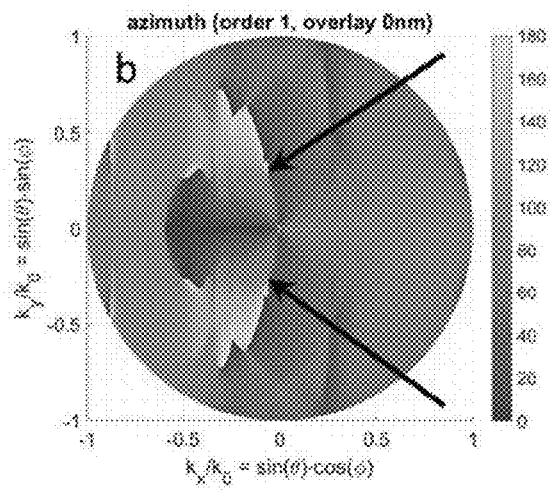
Figure 36C:
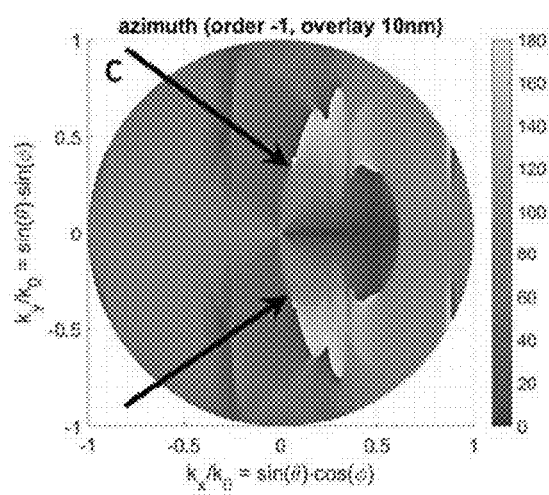
Figure 36D:
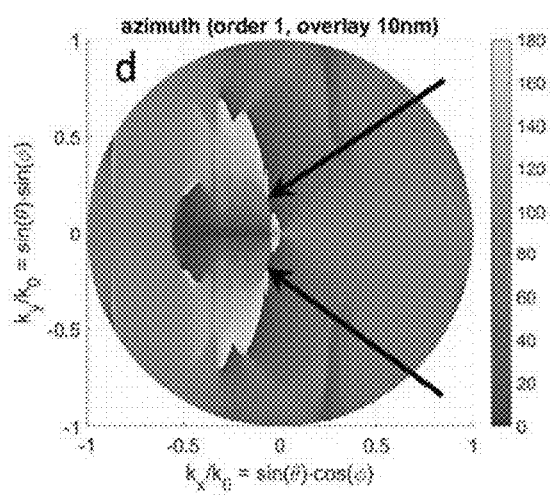
Figure 37B:
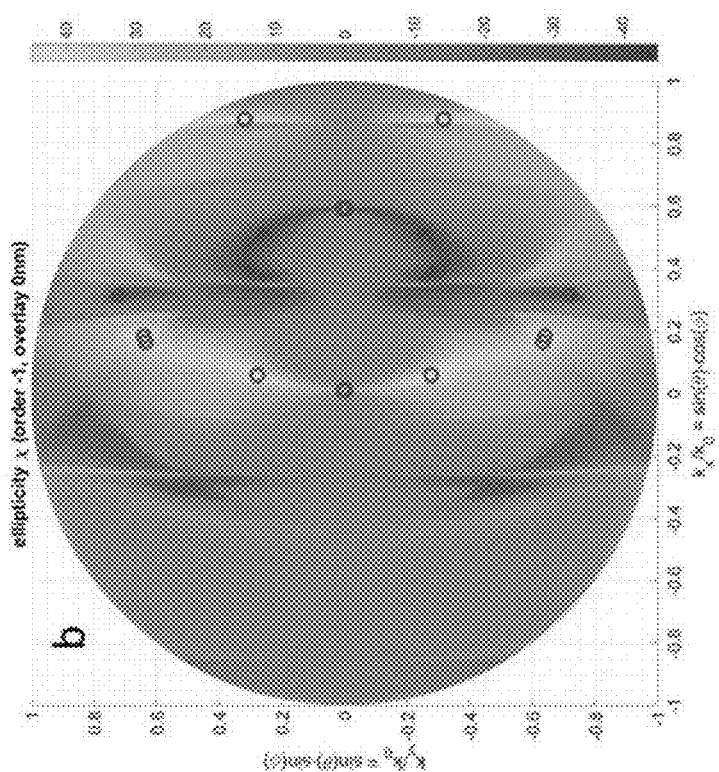
FIGS. 37a-b show replication of FIG. 36a data along with the simulation results for the ellipticity parameter $\chi$, illustrating simulation results of reflected −1 diffraction order, reflected from a FEOL type target, acquired at angular-angular domain for illumination with unpolarized light.
Figure 37A:
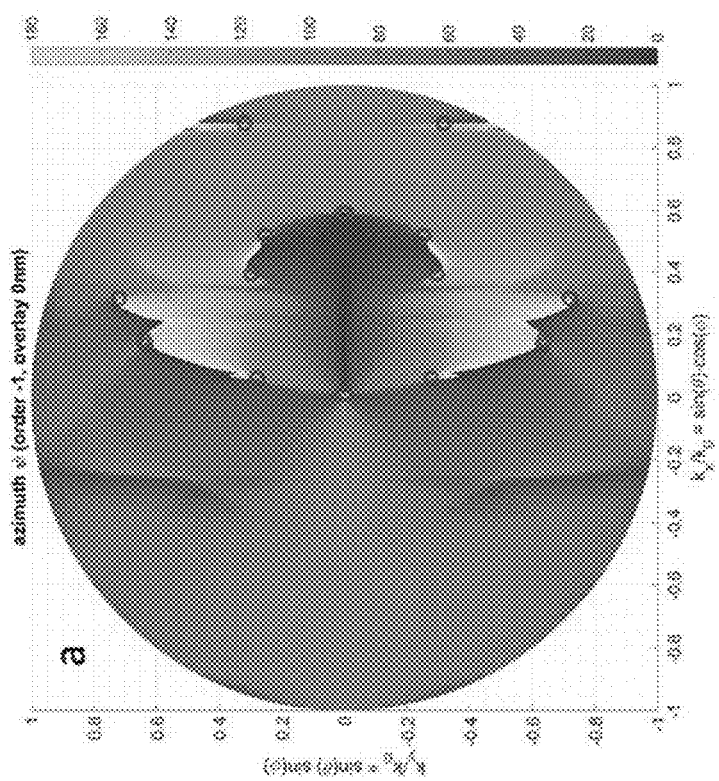

FIGS. 37*a-b* show replication of FIG. 36*a* data along with the simulation results for the ellipticity parameter x. The figures show simulation results of reflected −1 diffraction order, reflected from a FEOL type target, acquired at angular-angular domain for illumination with unpolarized light. The PS points in azimuth $2\psi$ marked by circles in FIG. 37*a* are replicated to the ellipticity $\chi$ map in FIG. 37*b*. The position of the PS points coincides with ellipticity ±45°, describing the polarized reflected component of light as purely circularly polarized. Therefore, the PS points of this type are positioned at non-zero reflected intensity in the polarized component—they do not correspond to zero reflection points (unlike PS points in the ellipsometry phase Δ).

The invention claimed is:

1. A monitoring system for use in monitoring a target, said monitoring system being configured for data communication with a measured data provider and comprising:
   an input utility for receiving input data comprising measured data indicative of optical response of the target measured under predetermined conditions, the measured data comprising phase data indicative of a two-dimensional profile of full phase of the optical response of the target in a predetermined two-dimensional parametric space including a two-dimensional range in which said target exhibits phase singularity;
   an analyzer module configured and operable for processing said measured data and extracting at least one phase singularity signature of the target characterizing the target status, the phase singularity signature being formed by a number N of phase singularity points, each corresponding to a condition that the physical phase continuously accumulates a nonzero integer multiple m of $2\pi$ around said point; and
   an output utility configured and operable to generate output data indicative of said at least one phase singularity signature of the target characterizing the status of the target.

2. The system according to claim 1, comprising a mapping module configured and operable to receive the measured data and generate map data comprising phase data indicative of the profile of said full phase of the optical response of the target in said two-dimensional parametric space.

3. The system according to claim 1, further comprising a modeling module configured and operable for applying a model based processing to said data indicative of the at least one phase singularity signature and generating data indicative of the status of the target, thereby providing a direct measure of one or more parameters associated with at least one of the target and environment in a vicinity of the target.

4. The system according to claim 1, wherein said measurements in the two-dimensional range of the two-dimensional parametric space and detection of the optical response of the target include at least one of the following: measurements using spectro-angular space of multiple wavelengths and angles of incidence of illumination; measurements using spectro-thickness space of multiple wavelengths of illumination and varying thickness of the target; measurements using angular-thickness space of multiple angles of incidence of illumination and varying thickness of the target; measurements using angular-angular space for a single wavelength or a wavelength band of illumination and detection of the optical response in a pupil plane.

5. The system according to claim 2, wherein the mapping module is configured and operable to generate the full phase profile of the optical response of the target within a $2\pi$ range.

6. The system according to claim 1, wherein the analyzer module is configured and operable to process numeric phase representation of the measured physical phase over the angular-spectral parametric space, to identify first order (☐m☐=1) and higher order (☐m☐≥2) phase singularity points.

7. The system according to claim 6, wherein the analyzer module determines said condition that the physical phase continuously accumulates the nonzero integer multiple of $2\pi$.

8. The system according to claim 1, wherein data indicative of the status of the target comprises at least one of the following: effective refractive index data associated with at least one property of at least one of the target and environment in a vicinity of the target; data indicative of a change in one or more structural parameters of the target caused by one or more processes being applied to the target; data indicative of a change in one or more properties of the target caused by one or more environmental conditions in the vicinity of the target; data indicative of a change in one or more conditions of the target caused by interaction of the target with foreign substances.

9. The system according to claim 1, wherein data indicative of the status of the target comprises effective refractive index data associated with at least one property of at least one of the target and environment in a vicinity of the target, said effective refractive index data being indicative of at least one of the following: refractive index; refractive index change; one or more properties of the target and/or environment in the vicinity of the target being in a relation with the refractive index or refractive index change.

10. The system according to claim 1, configured for data communication with at least one of the following: a measurement system performing one or more measurement sessions on the target and providing said measured data; a storage device where said measured data is stored.

11. The system according to claim 10, wherein the measurement system comprises an optical system configured and operable for illuminating the target under predetermined conditions defined by the two-dimensional parametric space, and a detector device for detecting the optical response of the target, and generating said measured data.

12. The system according to claim 10, wherein said measurement system is configured and operable in at least one of a scan mode and a snapshot mode.

13. A measurement system for use in monitoring status of a target, the measurement system comprising: an optical system configured for performing one or more measurements on the target of the type including at least one of ellipsometric, polarimetric, and interferometric measurements using illumination with multiple different wavelengths of incident light and multiple different angles of incidence, a detection system for detecting one or more optical responses of the target to said illumination and generating measured data indicative of a profile of a full phase of the optical response of the target in an angular-wavelength parametric space; and a control system configured as the monitoring system according to claim 1.

14. The measurement system according to claim 13, wherein said optical system is configured and operable to perform measurements in the two-dimensional range of the two-dimensional parametric space and detection of the optical response of the target including at least one of the following: measurements using spectro-angular space of multiple wavelengths and angles of incidence of illumination; measurements using spectro-thickness space of multiple wavelengths of illumination and varying thickness of the target; measurements using angular-thickness space of multiple angles of incidence of illumination and varying thickness of the target; measurements using angular-angular space for a single wavelength or a wavelength band of illumination and detection of the optical response in a pupil plane.

15. A sensing system for identifying one or more predetermined substances, said sensing system comprising a sensing unit comprising one or more targets, each target being configured to exhibit phase singularity at a predetermined two-dimensional range of a respective two-dimensional parametric space and having a surface configured for interacting with said one or more substances; and the measurement system of claim 13.

16. The sensing system according to claim 15, wherein the optical system of the measurement system is configured and operable to perform measurements in the two-dimensional range of the two-dimensional parametric space and detection of the optical response of the target including at least one of the following: measurements using spectro-angular space of multiple wavelengths and angles of incidence of illumination; measurements using spectro-thickness space of multiple wavelengths of illumination and varying thickness of the target; measurements using angular-thickness space of multiple angles of incidence of illumination and varying thickness of the target; measurements using angular-angular space for a single wavelength or a wavelength band of illumination and detection of the optical response in a pupil plane.

17. An automatic optical inspection system for monitoring one or more properties of patterned structures, the inspection system comprising the monitoring system of claim 1 operable with a two-dimensional range of the two-dimensional parametric space at which the targets exhibit phase singularity, and a processor unit for processing the status data, and generating data indicative of one or more structural parameters of the target being inspected.

18. The automatic optical inspection system according to claim 17, configured and operable to perform measurements in the two-dimensional range of the two-dimensional parametric space and detection of the optical response of the target including at least one of the following: measurements using spectro-angular space of multiple wavelengths and angles of incidence of illumination; measurements using spectro-thickness space of multiple wavelengths of illumination and varying thickness of the target; measurements using angular-thickness space of multiple angles of incidence of illumination and varying thickness of the target; measurements using angular-angular space for a single wavelength or a wavelength band of illumination and detection of the optical response in a pupil plane.

19. A method for use in monitoring a target to determine a status of the target, the method comprising:
providing measured data indicative of optical response of the target measured under predetermined conditions, the measured data comprising phase data indicative of a two-dimensional profile of full phase of the optical response of the target in a predetermined two-dimensional parametric space including a two-dimensional range in which said target exhibits phase singularity including at least one of the following: spectro-angular space of multiple wavelengths and angles of incidence of illumination to cause said optical response; spectro-thickness space of multiple wavelengths of illumination and varying thickness of the target; angular-thickness space of multiple angles of incidence of illumination and varying thickness of the target; angular-angular space for a single wavelength or a wavelength band of illumination for the optical response detection in a pupil plane;
processing said measured data and extracting at least one phase singularity signature of the target characterizing the target status, the phase singularity signature being formed by a number N of phase singularity points, each corresponding to a condition that the physical phase continuously accumulates a nonzero integer multiple m of 2π around said point;

applying model-based processing to the phase singularity signature and determining data indicative of a status of the target.

20. The method according to claim 19, wherein said determining of the phase singularity signature from the phase map comprising identifying each phase singularity point in the angular-spectral parametric space as a point characterized by that a physical phase of the optical response substantially satisfies a condition that the physical phase continuously changes by a nonzero integer multiple m of 2π around the singularity point.

21. The method according to claim 20, wherein said determining of the phase singularity signature comprises processing the phase map data by applying thereto at least one of the following: an unwrapping algorithm to eliminate an error of falsely adding 2π to the phase being extracted; a sub-pixel reconstruction process for sub-pixel allocation of the phase singularity point location.

22. The method according to claim 19, wherein the target has one of the following configurations: the target comprises planar layered waveguides; the target comprises a patterned structure; the target comprises waveguides of cylindrical symmetry; the target comprises waveguides coupled to a resonant elements including at least one of molecules and nanoparticles; the target is configured as a slab of lossy dielectric on a glass substrate.

23. The method according to claim 22, wherein the measured data is indicative of the optical response of the target to the predetermined illumination having certain polarization.

24. The method according to claim 23, wherein said determining of the phase singularity signature from the phase map comprising identifying movement of each phase singularity point along a curved trajectory in the spectro-angular space as a function of said polarization of the illumination.

25. The method according to claim 24, wherein said determining of the phase singularity signature comprises utilizing data indicative of said polarization for optimizing allocation of each of the phase singularity points.

26. The method according to claim 24, wherein the phase singularity signature comprises a sequence of closely packed phase singularity points as a function of said polarization.

* * * * *